US011820269B2

(12) United States Patent
Sakota et al.

(10) Patent No.: US 11,820,269 B2
(45) Date of Patent: Nov. 21, 2023

(54) VEHICLE SEAT

(71) Applicant: TS TECH CO., LTD., Saitama (JP)

(72) Inventors: Masahiro Sakota, Tochigi (JP);
Takayoshi Ito, Tochigi (JP); Kohei Kowata, Tochigi (JP); Jinichi Tanabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/284,024

(22) PCT Filed: Oct. 3, 2019

(86) PCT No.: PCT/JP2019/039158
§ 371 (c)(1),
(2) Date: Aug. 10, 2022

(87) PCT Pub. No.: WO2020/075625
PCT Pub. Date: Apr. 16, 2020

(65) Prior Publication Data
US 2021/0331612 A1    Oct. 28, 2021

(30) Foreign Application Priority Data

Oct. 9, 2018  (JP) ................................ 2018-190786
Dec. 10, 2018 (JP) ................................ 2018-230762
Dec. 10, 2018 (JP) ................................ 2018-231097

(51) Int. Cl.
*B60N 2/885* (2018.01)
*B60N 2/879* (2018.01)
(Continued)

(52) U.S. Cl.
CPC ............... *B60N 2/885* (2018.02); *B60N 2/79* (2018.02); *B60N 2/853* (2018.02); *B60N 2/879* (2018.02)

(58) Field of Classification Search
CPC ........ B60N 2/885; B60N 2/879; B60N 2/853; B60N 2/79
See application file for complete search history.

(56) References Cited

U.S. PATENT DOCUMENTS 6,513,871 B2 *  2/2003  Bartels ................... B60N 2/885
                                                      297/216.12
8,857,904 B2 * 10/2014  Gaeng ................ B60N 2/42709
                                                      297/216.12
(Continued)

FOREIGN PATENT DOCUMENTS

JP       S62128626      8/1987
JP       S63183015      7/1988
(Continued)

OTHER PUBLICATIONS

Machine translations to English of JP 63-183015, 2018-144758, 2008-49837, and 2016-49853.*
(Continued)

*Primary Examiner* — Philip F Gabler
(74) *Attorney, Agent, or Firm* — Dority & Manning, PA

(57) ABSTRACT

To provide a vehicle seat in which the posture of the head of the occupant is controlled with a simpler configuration to reduce motion sickness of the occupant, the vehicle seat includes: a seat cushion; a seat back; a headrest including a main part configured to support the back of the head of the occupant, a left side part connected to a left edge of the main part to be rotatable about a vertical axis, a right side part connected to a right edge of the main part to be rotatable about a vertical axis, a left drive device for rotating the left side part forward relative to the main part, and a right drive device for rotating the right side part forward relative to the main part; an acceleration acquisition device; and a control device which, when a rightward acceleration is acquired by the acceleration acquisition device, makes the right drive
(Continued)

device rotate the right side part forward until the right side part is positioned on a right side of the head of the occupant, and when a leftward acceleration is acquired by the acceleration acquisition device, makes the left drive device rotate the left side part forward until the left side part is positioned on a left side of the head of the occupant.

10 Claims, 41 Drawing Sheets

(51) Int. Cl.
*B60N 2/853* (2018.01)
*B60N 2/75* (2018.01)

(56) References Cited

U.S. PATENT DOCUMENTS

| | | | |
|---|---|---|---|
| 9,738,188 | B2 | 8/2017 | Honda et al. |
| 9,862,312 | B2 | 1/2018 | Sivak et al. |
| 11,077,780 | B2 * | 8/2021 | Akaike ................ B60N 2/885 |
| 11,091,060 | B2 * | 8/2021 | Pinkelman ............. F03G 7/065 |
| 2015/0130237 | A1 | 5/2015 | Takeuchi et al. |
| 2016/0311349 | A1 * | 10/2016 | Honda ................... B60N 2/767 |
| 2020/0369188 | A1 * | 11/2020 | Samain ................. B60N 2/853 |
| 2022/0017005 | A1 * | 1/2022 | Rowe .................... B60N 2/879 |

FOREIGN PATENT DOCUMENTS

| | | |
|---|---|---|
| JP | S6433439 U | 3/1989 |
| JP | H10229930 | 9/1998 |
| JP | 2005253867 | 9/2005 |
| JP | 2008049837 | 3/2008 |
| JP | 2016049853 | 4/2016 |
| JP | 2017132364 | 8/2017 |
| JP | 2018122832 A | 8/2018 |
| JP | 2018144758 | 9/2018 |
| JP | 2018183332 A | 11/2018 |

OTHER PUBLICATIONS

International Search Report for PCT/JP2019/039158 dated Nov. 26, 2019, 2 pages.
Japanese office action (with English translation) for corresponding Application No. JP 2018-231097, dated Jan. 24. 2023. 10 pages.

* cited by examiner

Fig.14
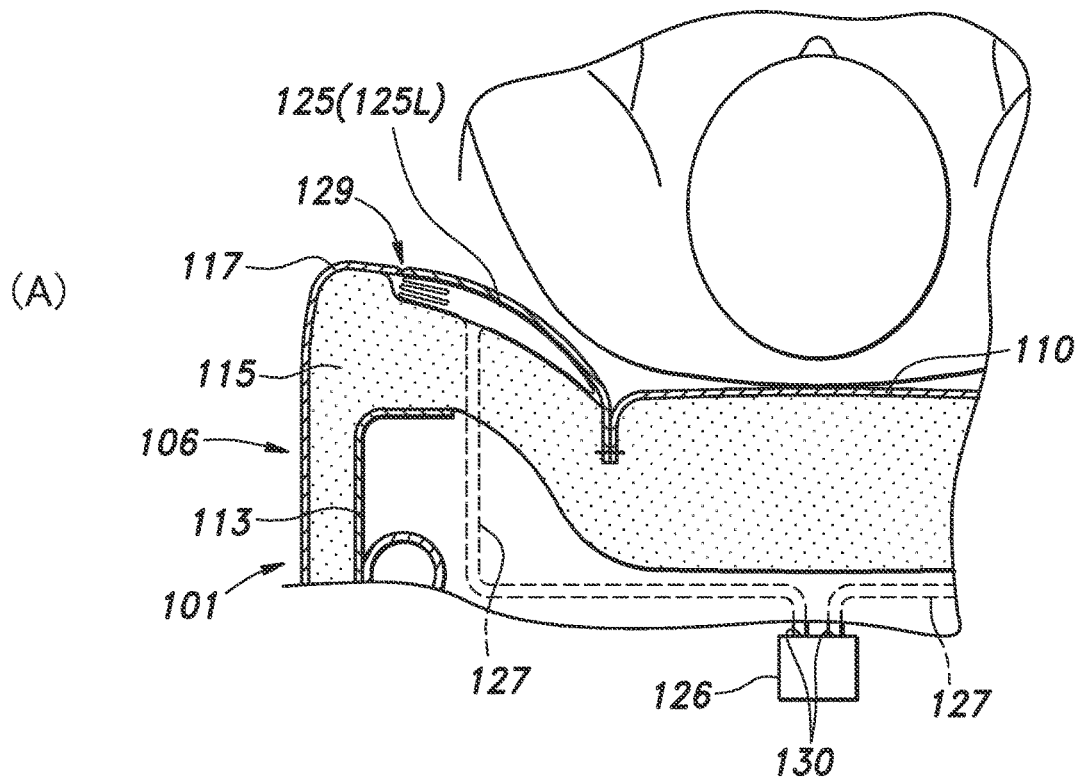
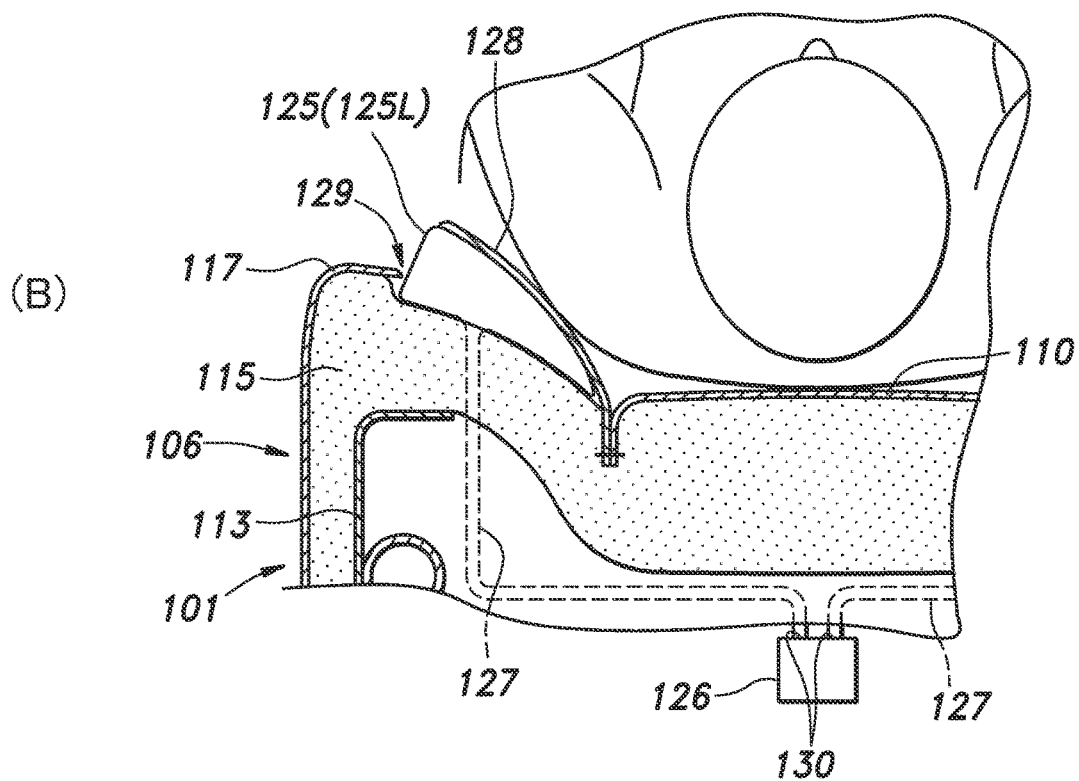

Fig.17
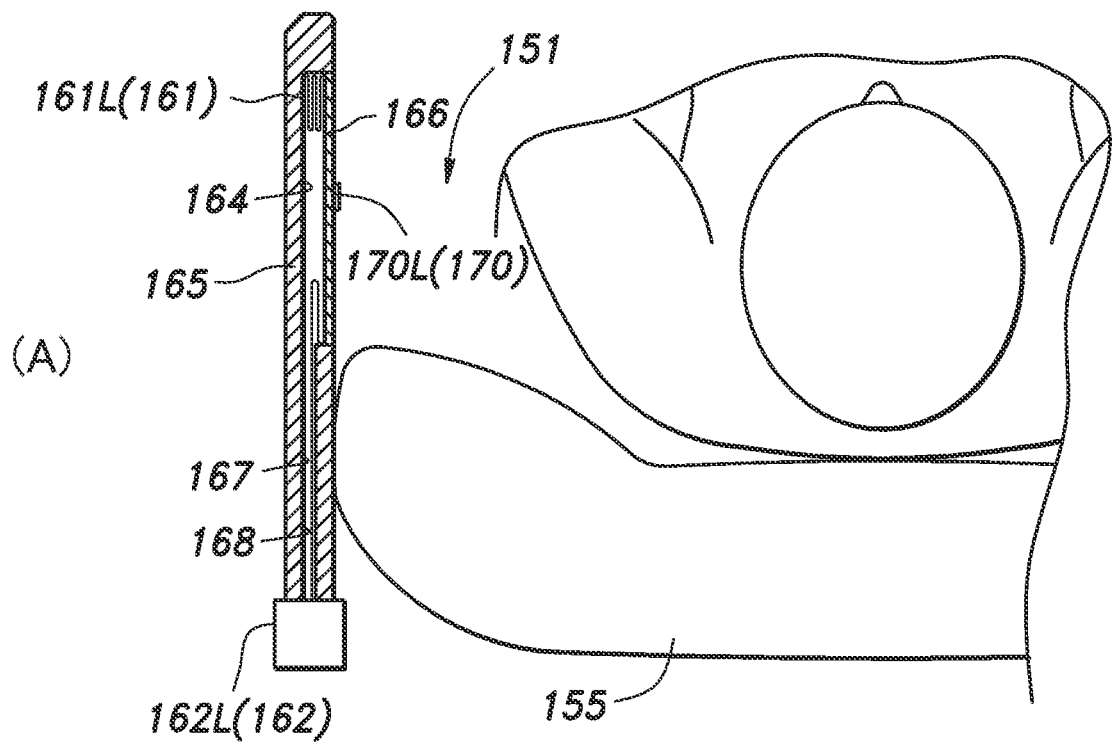
(A)
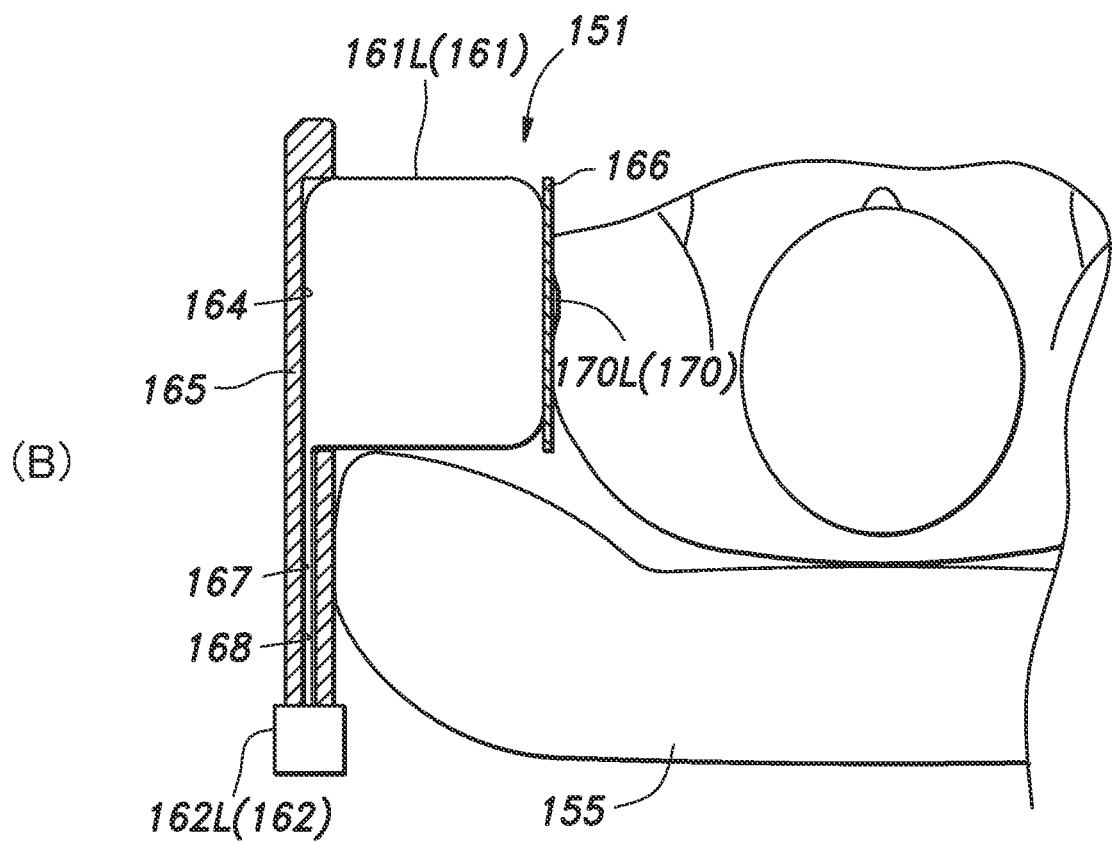
(B)

VEHICLE SEAT

CROSS REFERENCE TO RELATED APPLICATIONS

This application is the U.S. National Stage entry of International Application No. PCT/JP2019/039158 filed under the Patent Cooperation Treaty having a filing date of Oct. 3, 2019, which claims priority to Japanese Patent Application No. 2018-190786 having a filing date of Oct. 9, 2018, Japanese Patent Application No. 2018-231097 having a filing date of Dec. 10, 2018, and Japanese Patent Application No. 2018-230762 having a filing date of Dec. 10, 2018, all of which are incorporated herein by reference.

TECHNICAL FIELD

The present invention relates to a vehicle seat for preventing motion sickness of an occupant.

BACKGROUND ART

A vehicle seat capable of preventing rolling of an upper body of an occupant is known (for example, Patent Document 1). In the vehicle seat of Patent Document 1, an upper portion of a seat back is configured to have a higher support resistance against lateral movement of the upper body of the occupant than a lower portion of the seat back. With such a configuration, when the vehicle is turned and centrifugal force is applied to the upper part of the upper body of the occupant, a sufficiently large reaction force against the centrifugal force can be applied to the upper body of the occupant from the upper portion of the seat back. Thereby, the rolling of the upper body of the occupant is prevented, whereby the occupant is less likely to suffer from motion sickness.

Also, it is known that motion sickness can be prevented by tilting the head inward in the turning direction when the vehicle is turned. For example, the vehicle seat described in Patent Document 2 is provided with an elevating unit for elevating a left side part and a right side part of the seat cushion independently and an air cell control unit for controlling the elevating unit such that when turning of the vehicle is detected, the air cell control unit elevates one of the left side part and the right side part that corresponds to the inner side in the turning direction. With such a configuration, when the vehicle is turned, the part of the pelvis of the occupant seated in the vehicle seat that is on the inner side in the turning direction is pushed up. This allows the occupant to take a posture to move the upper body oppositely to the movement of the pelvis, or a posture to tilt the head inward in the turning direction, whereby motion sickness of the occupant can be prevented.

PRIOR ART DOCUMENT(S)

Patent Document(s)

[Patent Document 1] WO2013/160990A1
[Patent Document 2] JP2017-132364A

SUMMARY OF THE INVENTION

Task to be Accomplished by the Invention

The occupant detects the acceleration and angular velocity acting on his/her body with the vestibular system in the ear. Therefore, to reduce motion sickness, the posture of the head of the occupant should be controlled. On the other hand, in the vehicle seats of Patent Document 1 and Patent Document 2, since the movement or tilt of the upper body of the occupant is controlled, there is a problem that the mechanism becomes bulky.

In view of the foregoing background, an object of the present invention is to provide a vehicle seat in which the posture of the head of the occupant is controlled with a simpler configuration to reduce motion sickness of the occupant.

Means to Accomplish the Task

To achieve the above object, there is provided a vehicle seat (1, 41, 51, 61, 71, 81) configured to be installed in a vehicle (S), comprising: a seat cushion (8); a seat back (9, 62) provided at a rear portion of the seat cushion; a headrest (10) including a main part (15) connected to an upper end of the seat back to support a back of a head of an occupant, a left side part (16L) connected to a left edge of the main part to be rotatable about a vertical axis, a right side part (16R) connected to a right edge of the main part to be rotatable about a vertical axis, a left drive device (20L) for rotating the left side part forward relative to the main part, and a right drive device (20R) for rotating the right side part forward relative to the main part; an acceleration acquisition device (22, 54) configured to acquire an acceleration applied in a lateral direction; and a control device (23) which, when a rightward acceleration is acquired by the acceleration acquisition device, makes the right drive device rotate the right side part forward until the right side part is positioned on a right side of the head of the occupant, and when a leftward acceleration is acquired by the acceleration acquisition device, makes the left drive device rotate the left side part forward until the left side part is positioned on a left side of the head of the occupant.

According to this configuration, when an acceleration is applied to the occupant rightward, the right side part is rotated until it is positioned to the right of the head of the occupant. Thereby, the rightward movement of the head of the occupant due to centrifugal force is restricted by the right side part. When an acceleration is applied to the occupant leftward, the left side part is rotated until it is positioned to the left of the head of the occupant. Thereby, the leftward movement of the head of the occupant due to centrifugal force is restricted by the left side part. In this way, the movement of the head of the occupant is restricted, so that the posture of the head of the occupant is controlled. Thereby, the posture of the head of the occupant is stabilized and motion sickness of the occupant can be reduced.

In the above aspect, preferably, the right side part has a right contact surface (19R) that opposes the head of the occupant when the right side part is rotated forward, the left side part has a left contact surface (19L) that opposes the head of the occupant when the left side part is rotated forward, and the control device rotates the right side part until the right contact surface contacts a right side surface of the head when a rightward acceleration is acquired by the acceleration acquisition device and rotates the left side part until the left contact surface contacts a left side surface of the head when a leftward acceleration is acquired by the acceleration acquisition device.

According to this configuration, when an acceleration is applied to the occupant rightward, the right side part contacts the right side surface of the head with the right contact surface thereof and supports the head of the occupant from the right side. Similarly, when an acceleration is applied to the occupant leftward, the left side part contacts the left side surface of the head with the left contact surface thereof and supports the head of the occupant from the left side. In this way, when an acceleration is applied to the occupant in the lateral direction, the right side part and the left side part support the head of the occupant with the respective contact surfaces, whereby the posture of the head of the occupant is more stabilized.

In the above aspect, preferably, the right contact surface and the left contact surface are provided with respective light emitting devices (43L, 43R), each light emitting device includes multiple light emitting elements (44L, 44R) arranged substantially horizontally, the light emitting device (43R) provided on the right side part emits light to correspond to optical flow of a view from a right side window (5) of the vehicle when the right side part is positioned on the right side of the head, and the light emitting device (44L) provided on the left side part emits light to correspond to optical flow of a view from a left side window of the vehicle when the left side part is positioned on the left side of the head.

According to this configuration, when an acceleration is applied to the occupant in the lateral direction, the light emitting device that emits light to correspond to the optical flow of the view from the side window is disposed to the side of the occupant. Thereby, the occupant can acquire information related to the acceleration of the vehicle through vision. As a result, the difference between the acceleration detected by the vestibular system in the ear and the visually perceived acceleration becomes small, whereby motion sickness of the occupant can be reduced.

In the above aspect, preferably, the right contact surface and the left contact surface are provided with respective displays (21L, 21R), the display (21R) of the right side part displays optical flow of a view from a side window of the vehicle when the right side part is positioned on the right side of the head, and the display (21L) of the left side part displays optical flow of a view from a side window of the vehicle when the left side part is positioned on the left side of the head.

According to this configuration, the occupant can visually acquire the information related to the acceleration of the vehicle. Thereby, the difference between the acceleration detected by the vestibular system and the visually perceived acceleration becomes small, whereby motion sickness of the occupant can be reduced.

In the above aspect, preferably, the acceleration acquisition device is an acceleration sensor supported by one of the seat cushion, the seat back, and the headrest.

According to this configuration, the acceleration applied to the body of the occupant can be acquired more accurately and in a simple manner.

In the above aspect, preferably, a car navigation system (52) capable of acquiring map information and a position of the vehicle is installed in the vehicle (53), and the acceleration acquisition device (54) is configured to receive the map information and the position of the vehicle from the car navigation system and to calculate the acceleration.

According to this configuration, the acceleration applied to the occupant can be predicted based on the map information and the position of the vehicle, and the left side part and the right side part can be displaced based on the predicted acceleration. This makes it possible to displace the left side part and the right side part in accordance with the instant at which the centrifugal force is applied and thereby to restrict the movement of the head of the occupant more reliably. Therefore, motion sickness of the occupant can be reduced.

In the above aspect, preferably, the seat back is constituted of a frame (63) forming a skeleton, a bag-shaped skin member (64) covering the frame, and beads (65) contained in the skin member such that when the occupant is seated, the seat back is depressed rearward under a load from the occupant to form a recess (66) corresponding to an upper body of the occupant and a shape of the recess is held for a prescribed time.

According to this configuration, when the occupant is seated, a recess having a shape corresponding to the upper body of the occupant is formed in the seat back and the shape is held. Therefore, when the occupant is seated, the upper body of the occupant is received in the recess, so that the lateral movement of the upper body of the occupant is restricted. Thus, motion sickness of the occupant can be reduced.

In the above aspect, preferably, the vehicle seat comprises a pair of left and right armrests (72L, 72R) respectively joined to a left side surface and a right side surface of the seat back and extending forward, wherein the armrests are provided with respective swelling parts (73L, 73R) configured to selectively swell in mutually opposing directions, and the control device causes the swelling parts to swell to sandwich the upper body of the occupant therebetween when a lateral direction acceleration is acquired by the acceleration acquisition device.

According to this configuration, when the lateral direction acceleration is applied to the occupant, the swelling parts swell and restrict the lateral movement of the upper body of the occupant. Thereby, the posture of the occupant is stabilized and motion sickness of the occupant can be reduced.

In the above aspect, preferably, at least one of a left side surface and a right side surface of the seat back is provided with an armrest (82L) that extends forward, wherein the armrest is provided with an upward protruding grip (83) at a front end portion thereof.

According to this configuration, since the front end portion of the armrest is provided with the upward protruding grip, when an acceleration is applied in the lateral direction, the occupant can stabilize his/her posture by grasping the grip, whereby motion sickness of the occupant can be reduced.

A vehicle seat that can reduce motion sickness by preventing the rolling of the upper body of the occupant is known (for example, WO2013/160990A1). In this vehicle seat, an upper portion of the seat back has a high support resistance against the lateral movement of the upper body of the occupant compared to a lower portion thereof. Thereby, the lateral movement and rolling of the upper body of the occupant can be effectively prevented.

However, when the lateral acceleration applied to the occupant increases to such an extent that the inertial force acting on the occupant becomes larger than the support resistance, the occupant may become unable to suppress the rolling of the upper body sufficiently. Therefore, in the vehicle seat, it is desired to suppress the rolling of the upper body of the occupant.

To achieve the above object, there is provided a vehicle seat (101, 151, 181, 201, 251, 301, 401, 501) including a seat cushion (105) and a seat back (106, 152) and configured to be installed in a vehicle (S), the vehicle seat comprising a drive unit (121, 153, 183) for deforming the seat back to selectively restrain at least a part of an upper body of a seated occupant from left and right sides.

According to this configuration, the upper body of the occupant is restrained from the left and right sides, and therefore, the rolling of the upper body of the occupant can be prevented more reliably.

In the above aspect, preferably, the vehicle seat comprises: a lateral acceleration acquisition unit (132, 202, 253) configured to acquire a lateral acceleration applied to the occupant; and a control unit (122) which, based on the lateral acceleration acquired by the lateral acceleration acquisition unit, makes the drive unit deform the seat back to oppose the inertial force acting on the upper body of the occupant.

According to this configuration, application of inertial force to the occupant, which may cause rolling, can be detected from the lateral acceleration applied to the vehicle. Thereby, it is possible to support the upper body of the occupant in accordance with the timing at which the upper body of the occupant may roll, whereby the rolling of the upper body of the occupant can be prevented more effectively.

In the above aspect, preferably, the drive unit includes a pair of left and right air cells (125) that are provided inside the seat back and, when supplied with air, make a front surface of the seat back protrude forward at positions on left and right outer sides of shoulders of the occupant or on left and right outer sides of a hip of the occupant, and an air supply and discharge device (126) for supplying air to and discharging air from each of the left and right air cells, wherein the control unit makes the air supply and discharge device supply air to the left air cell when the lateral acceleration is rightward and makes the air supply and discharge device supply air to the right air cell when the lateral acceleration is leftward.

According to this configuration, the air cells and the piping for supplying air to and discharging air from the air cells are provided in the seat back so that the seat back can be deformed, and thus, the configuration of the drive unit is simple.

In the above aspect, preferably, the seat back includes a seat back body (155) configured to support a back of the occupant and a pair of left and right restriction members (156) respectively joined to left and right side surfaces of the seat back body, the drive unit includes a pair of left and right air cells (161) which, when supplied with air, respectively cause seat-inner-side side surfaces of the left and right restriction members to protrude toward a seat inner side, and an air supply and discharge device (162) for supplying air to and discharging air from each of the left and right air cells, and the control unit makes the air supply and discharge device supply air to the left air cell when the lateral acceleration is rightward and makes the air supply and discharge device supply air to the right air cell when the lateral acceleration is leftward.

According to this configuration, the restriction members are respectively provided on the left and right sides of the occupant, whereby the lateral movement of the upper body of the occupant is restricted. Further, when a lateral acceleration is applied, the restriction member positioned in the moving direction of the occupant protrudes toward the seat inner side to apply a load opposing the inertial force to the occupant. Thus, the restriction member supports the upper body of the occupant, whereby the rolling of the upper body of the occupant can be prevented.

In the above aspect, preferably, the seat-inner-side side surfaces of the restriction members are each provided with a touch sensor (170) configured to detect contact with the occupant, and the control unit makes the air supply and discharge device supply air to the left air cell until the contact is detected by the left touch sensor when the lateral acceleration is rightward and makes the air supply and discharge device supply air to the right air cell until the contact is detected by the right touch sensor when the lateral acceleration is leftward.

According to this configuration, the amount of protrusion of the restriction members toward the seat inner side can be adjusted in accordance with the physique of the occupant based on the signals from the touch sensors.

In the above aspect, preferably, the drive unit includes a bag member (184) that is provided inside the seat back and, when air is discharged therefrom, forms a recess in a front surface of the seat back, and an air supply and discharge device (185) capable of supplying air to and discharging air from the bag member, wherein, when the lateral acceleration acquired by the lateral acceleration acquisition unit is greater than or equal to a prescribed threshold value, the control unit drives the air supply and discharge device.

According to this configuration, when the lateral acceleration is greater than or equal to the threshold value, the air supply and discharge device discharges air from the bag member so that the front surface of the seat back is depressed rearward. Thereby, a recess is formed in the seat back and the upper body of the occupant is received in the recess. Therefore, the lateral movement of the upper body of the occupant is restricted and the rolling of the upper body of the occupant is prevented.

In the above aspect, preferably, the lateral acceleration acquisition unit (132) includes one of an acceleration sensor (133) provided on/in the seat back or the seat cushion, a steering angle sensor (205) configured to acquire a steering angle of the vehicle, or a car navigation system (252) installed in the vehicle and storing map information, a position of the vehicle, and a travel schedule of the vehicle.

According to this configuration, the direction of the lateral acceleration applied to the seated occupant can be acquired, and the upper body of the occupant can be supported in accordance with the direction in which the upper body of the occupant moves due to inertial force and the timing at which the inertial force is applied.

In the above aspect, preferably, the vehicle seat comprises: a seating sensor provided in the seat cushion or the seat back to detect seating of the occupant; and a control unit that, when the seating of the occupant is detected by the seating sensor, makes the drive unit deform the seat back to restrain the upper body of the occupant from both the left and right sides.

According to this configuration, when the occupant is seated, the upper body of the occupant is restrained from both the left and right sides, whereby the rolling of the upper body of the occupant can be prevented during travel of the vehicle.

In the above aspect, preferably, the drive unit includes a bag member that is provided inside the seat back and, when air is discharged therefrom, forms a recess in a front surface of the seat back, and an air supply and discharge device capable of supplying air to and discharging air from the bag member, and when the seating of the occupant is detected, the control unit makes the air supply and discharge device discharge air from the bag member.

According to this configuration, when the occupant is seated, the air supply and discharge device discharges air from the bag member so that the front surface of the seat back is depressed rearward. Thereby, a recess is formed in the seat back and the upper body of the occupant is received in the recess. Therefore, the lateral movement of the upper body of the occupant is restricted and the rolling of the upper body of the occupant can be prevented.

In the above aspect, preferably, the drive unit includes a bag member provided inside the seat back and containing multiple spherical members therein, and an air supply and discharge device capable of supplying air to and discharging air from an interior of the bag member, and the control unit makes the drive unit discharge air from the bag member when the seating of the occupant is detected.

According to this configuration, when the occupant is seated, the seat back is deformed by the load from the occupant, and a recess conformal to the shape of the upper body of the occupant is formed on the front surface thereof. When air is discharged from the bag member, the spherical members closely contact one another so that the bag member becomes difficult to deform. Therefore, when inertial force due to the lateral acceleration is applied to the upper body of the occupant, a load opposing the inertial force is applied from the wall surface defining the recess. Thereby, the rolling of the upper body of the occupant can be prevented.

In the above aspect, preferably, the seat back includes a seat back body configured to support a back of the occupant and a pair of left and right restriction members respectively joined to left and right side surfaces of the seat back body, the drive unit includes a pair of left and right air cells which, when supplied with air, respectively cause seat-inner-side side surfaces of the left and right restriction members to protrude toward a seat inner side, and an air supply and discharge device for supplying air to and discharging air from each of the left and right air cells, the seat-inner-side side surfaces of the restriction members are each provided with a touch sensor configured to detect contact with the occupant, and when the seating of the occupant is detected by the seating sensor, the control unit makes the air supply and discharge device supply air to each of the left and right air cells until the left and right touch sensors detect the contact, and thereafter makes the air supply and discharge device discharge air from each of the left and right air cells for a prescribed time.

According to this configuration, when the occupant is seated, the left and right air cells are expanded until they contact the occupant. After the expansion, air is discharged from the left and right air cells for a prescribed time, so that a space is created between the seat-inner-side side surface of each restriction member and the occupant. In this way, with the restriction members protruding toward the seat inner side and disposed in the left and right vicinity of the occupant, the lateral movement of the upper body of the occupant is restricted, whereby the rolling of the upper body of the occupant can be prevented. Further, air is discharged from the left and right air cells for a prescribed time so that the seat-inner-side side surface of each restriction member is slightly spaced from the occupant, and therefore, the restriction members do not always contact the occupant, and the oppressive feeling imparted to the occupant is reduced.

In the above aspect, preferably, the drive unit includes a pair of left and right air cells that are provided inside the seat back and, when supplied with air, make a front surface of the seat back protrude forward at positions on left and right outer sides of shoulders of the occupant or on left and right outer sides of a hip of the occupant, and an air supply and discharge device for supplying air to and discharging air from each of the left and right air cells, portions of the front surface of the seat back in front of the respective air cells are each provided with a touch sensor (503) configured to detect contact with the occupant, and when the seating of the occupant is detected by the seating sensor, the control unit makes the air supply and discharge device supply air to each of the left and right air cells until the left and right touch sensors detect the contact, and thereafter makes the air supply and discharge device discharge air from each of the left and right air cells for a prescribed time.

According to this configuration, the front surface of the seat back is caused to protrude at positions on the left and right sides of the shoulders or the hip of the occupant. Thereby, the lateral movement of the occupant is restricted. The discharge of air from the air cells for a prescribed time after the touch sensors detect the contact creates a space between the occupant and a wall body formed by protruding of the front surface of the seat back, whereby the oppressive feeling imparted to the occupant is reduced.

In the above aspect, preferably, each of the seat cushion and the seat back includes a frame (112, 113) forming a skeleton, a pad member (114, 115) supported by the frame, and a skin member (116, 117) covering at least a part of a surface of the pad member.

According to this configuration, the provision of the frame can make the vehicle seat have sufficient rigidity to support the occupant, and the provision of the pad member and the skin member makes it easy for the occupant to be seated.

A vehicle seat for reducing the fatigue of the occupant when lateral acceleration is generated is known (for example, JP2005-253867A). This vehicle seat is provided with a three-point seat belt and, when lateral acceleration is generated, tightens the seat belt with a prescribed tension set beforehand to press the occupant against the seat back. Thereby, the friction force between the occupant and the seat back increases and the movement of the upper body of the occupant is prevented.

In cases as this, where the seat belt is configured to be positioned over a predetermined one of the left and right shoulders to restrain the one of the shoulders, if inertial force directed toward the side opposite from the restrained shoulder is applied to the occupant, the restrained shoulder may slip out of the seat belt so that the restraint of the upper body of the occupant may become insufficient.

Also, in the case where the prevention of the lateral movement of the upper body of the occupant depends on the support resistance produced by leaning of the occupant against the seat back (for example, see WO2013/160990A1), if the load applied to the seat back from the occupant is small, a support resistance sufficient to secure the upper body of the occupant may not be obtained so that the reduction of motion sickness may become insufficient.

Namely, in the seat belt device including the seat belt or in the vehicle seat provided with the seat belt device, it is desired to prevent the movement of the upper body of the occupant more reliably.

To achieve the above object, a seat belt device (601, 651, 671, 681, 691) comprises: a seat belt (621, 652) including a left belt portion (621L, 652L) configured to restrain a left shoulder of an occupant and a right belt portion (621R, 652R) configured to retrain a right shoulder of the occupant; a pair of retractors (622) including a left retractor (622L) configured to apply tension to the left belt portion and a right retractor (622R) configured to apply tension to the right belt portion; a lateral acceleration acquisition unit (623) configured to acquire a lateral acceleration that is applied to the occupant in a lateral direction; and a control unit (624) configured to drive the left retractor when the lateral acceleration acquired by the lateral acceleration acquisition unit is rightward and to drive the right retractor when the lateral acceleration acquired by the lateral acceleration acquisition unit is leftward.

According to this configuration, when leftward inertial force is applied to the occupant due to rightward lateral acceleration, the left retractor is driven to apply tension to the left belt portion. When rightward inertial force is applied to the occupant due to leftward lateral acceleration, the right retractor is driven to apply tension to the right belt portion. In this way, it is possible to apply tension to the belt portion positioned on the moving direction side of the occupant, namely, the belt portion more reliably positioned over the corresponding shoulder of the occupant. Thus, the movement of the upper body of the occupant can be prevented reliably regardless of the direction of the inertial force.

In the above aspect, preferably, the left belt portion includes a left lap belt (626L) extending leftward from a front side of a hip of the seated occupant and a left shoulder belt (627L) having one end joined to the left lap belt and extending upward to pass a front side of the left shoulder of the seated occupant, the right belt portion includes a right lap belt (626R) extending rightward from the front side of the hip of the seated occupant and a right shoulder belt (627R) having one end joined to the right lap belt and extending upward to pass a front side of the right shoulder of the seated occupant, and the left lap belt and the right lap belt are detachably connected to each other on the front side of the hip of the occupant.

According to this configuration, compared to the three-point seat belt, the upper body of the occupant can be restrained to the seat back more reliably. Also, since the right belt portion includes the right shoulder belt configured to be positioned over the right shoulder of the occupant and the left belt portion includes the left shoulder belt configured to be positioned over the left shoulder of the occupant, either of the left and right shoulders of the occupant can be pressed against the seat back by applying tension to the corresponding shoulder belt. Thereby, by selecting the shoulder of the occupant on the side of the direction of movement generated by inertial force and applying tension to the corresponding shoulder seat belt, it is possible to press the shoulder of the occupant against the seat back more reliably so that the movement of the occupant can be prevented.

In the above aspect, preferably, the left belt portion (652L) is configured to extend from the left shoulder to the right hip of the occupant, the right belt portion (652R) is configured to extend from the right shoulder to the left hip of the occupant, and the left belt portion and the right belt portion cross each other in front view.

According to this configuration, compared to the three-point seat belt, the upper body of the occupant can be restrained to the seat back more reliably. Also, since the left belt portion and the right belt portion are configured to be positioned over the left and right shoulders, respectively, it is possible to press either of the left and right shoulders of the occupant against the seat back with priority by applying tension to the corresponding one of the left belt portion and the right belt portion.

In the above aspect, preferably, the control unit drives the left retractor and the right retractor when a magnitude of the lateral acceleration acquired by the lateral acceleration acquisition unit is greater than or equal to a prescribed first threshold value, drives the left retractor when the magnitude of the lateral acceleration acquired by the lateral acceleration acquisition unit is greater than or equal to a prescribed second threshold value and a direction of the lateral acceleration is rightward, and drives the right retractor when the magnitude of the lateral acceleration acquired by the lateral acceleration acquisition unit is greater than or equal to the prescribed second threshold value and the direction of the lateral acceleration is leftward.

According to this configuration, in a region of the lateral acceleration greater than or equal to the first threshold value where the restriction of the occupant to the seat back cannot be achieved sufficiently by driving only one of the left and right retractors, both the left and right retractors are driven so that it is possible to restrain the occupant to the seat back more firmly and thereby to protect the occupant.

In the above aspect, preferably, with increase in the lateral acceleration the control unit drives the corresponding retractor to increase the applied tension.

According to this configuration, as the inertial force acting on the occupant increases, the tension applied by the corresponding retractor increases and the occupant is restrained to the seat back more firmly. Thereby, it is possible to increase the friction force between the upper body of the occupant and the seat back as the lateral acceleration increases, and therefore, the movement of the upper body of the occupant can be prevented more reliably.

In the above aspect, preferably, the vehicle seat comprises an auxiliary acceleration acquisition unit (673) configured to acquire a longitudinal acceleration applied to the occupant in a fore and aft direction and a vertical acceleration applied to the occupant in a vertical direction, and the control unit drives both the left retractor and the right retractor when the longitudinal acceleration is directed rearward and has a magnitude greater than or equal to a prescribed rearward threshold value or when the vertical acceleration is directed downward and has a magnitude greater than or equal to a prescribed downward threshold value.

According to this configuration, when large inertial force acts on the occupant forward or upward, the left and right retractors can be driven to apply a load to oppose the inertial force acting on the upper body in a direction away from the seat back. Thereby, it is possible to give a sense of stability to the occupant, whereby motion sickness can be reduced.

Also, there is provided a vehicle seat (602) provided with any one of the seat belt devices of the above aspects and configured to be installed in a vehicle, the vehicle seat comprising: a seat cushion (605) configured to be placed on a floor (604) in a cabin (603) to support buttocks of an occupant; and a seat back (6) configured to support a back of the occupant, wherein a lower end of the left belt portion and a lower end of the right belt portion are each joined to the seat cushion, the left retractor is supported by either the seat back or the seat cushion and is configured to wind an upper end of the left belt portion, and the right retractor is supported by either the seat back or the seat cushion and is configured to wind the upper end of the right belt portion.

According to this configuration, regardless of the position and direction of the vehicle seat in the cabin, the seat belt device can prevent the movement of the upper body of the occupant.

In the above aspect, preferably, the lateral acceleration acquisition unit includes an acceleration sensor supported by at least one of the seat back or the seat cushion.

According to this configuration, the acceleration sensor can be positioned in the vicinity of the occupant, and therefore, the lateral acceleration applied to the body of the occupant can be acquired more accurately and in a simple manner. Thereby, the corresponding shoulder of the occupant can be pressed against the seat back more reliably, and the movement of the occupant due to inertial force can be prevented more reliably.

In the above aspect, preferably, the lateral acceleration acquisition unit includes a steering angle sensor (684) configured to acquire a steering angle of the vehicle or a car navigation system (692) installed in the vehicle and storing map information, a position of the vehicle, and a travel schedule of the vehicle.

According to this configuration, it is possible to predict turning of the vehicle based on the steering angle acquired by the steering angle sensor or based on the map information, the position of the vehicle, and travel schedule, and to acquire the direction of lateral acceleration applied to the occupant and the time at which the lateral acceleration is applied. Thereby, it is possible to drive the retractor(s) in accordance with the instant at which the inertial force caused by the turning is applied to the occupant, whereby the movement of the upper body of the occupant can be prevented more reliably.

In the above aspect, preferably, the vehicle seat is supported on the floor to be rotatable about a vertical axis.

According to this configuration, the comfort of the vehicle seat is improved.

In the above aspect, preferably, each of the seat cushion and the seat back includes a frame (612, 613) forming a skeleton, a pad member (614, 615) supported by the frame, and a skin member (616, 617) covering at least a part of a surface of the pad member.

According to this configuration, the provision of the frame can make the vehicle seat have sufficient rigidity to support the occupant, and the provision of the pad member and the skin member makes it easy for the occupant to be seated.

Effect of the Invention

According to one aspect of the present invention, a vehicle seat configured to be install in a vehicle comprises: a seat cushion; a seat back provided at a rear portion of the seat cushion; a headrest including a main part connected to an upper end of the seat back to support a back of a head of an occupant, a left side part connected to a left edge of the main part to be rotatable about a vertical axis, a right side part connected to a right edge of the main part to be rotatable about a vertical axis, a left drive device for rotating the left side part forward relative to the main part; and a right drive device for rotating the right side part forward relative to the main part; an acceleration acquisition device configured to acquire an acceleration applied in a lateral direction; and a control device which, when a rightward acceleration is acquired by the acceleration acquisition device, makes the right drive device rotate the right side part forward until the right side part is positioned on a right side of the head of the occupant, and when a leftward acceleration is acquired by the acceleration acquisition device, makes the left drive device rotate the left side part forward until the left side part is positioned on a left side of the head of the occupant. According to this configuration, when an acceleration is applied to the occupant rightward, the right side part is rotated until it is positioned to the right of the head of the occupant. Thereby, the rightward movement of the head of the occupant due to centrifugal force is restricted by the right side part. When an acceleration is applied to the occupant leftward, the left side part is rotated until it is positioned to the left of the head of the occupant. Thereby, the leftward movement of the head of the occupant due to centrifugal force is restricted by the left side part. In this way, the movement of the head of the occupant is restricted, so that the posture of the head of the occupant is controlled. Thereby, the posture of the head of the occupant is stabilized and motion sickness of the occupant can be reduced.

According to the configuration where, in the above aspect, the right side part has a right contact surface that opposes the head of the occupant when the right side part is rotated forward, the left side part has a left contact surface that opposes the head of the occupant when the left side part is rotated forward, and the control device rotates the right side part until the right contact surface contacts a right side surface of the head when a rightward acceleration is acquired by the acceleration acquisition device and rotates the left side part until the left contact surface contacts a left side surface of the head when a leftward acceleration is acquired by the acceleration acquisition device, when an acceleration is applied to the occupant rightward, the right side part contacts the right side surface of the head with the right contact surface thereof and supports the head of the occupant from the right side. Similarly, when an acceleration is applied to the occupant leftward, the left side part contacts the left side surface of the head with the left contact surface thereof and supports the head of the occupant from the left side. In this way, when an acceleration is applied to the occupant in the lateral direction, the right side part and the left side part support the head of the occupant with the respective contact surfaces, whereby the posture of the head of the occupant is more stabilized.

According to the configuration where, in the above aspect, the right contact surface and the left contact surface are provided with respective light emitting devices, each light emitting device includes multiple light emitting elements arranged substantially horizontally, the light emitting device provided on the right side part emits light to correspond to optical flow of a view from a right side window of the vehicle when the right side part is positioned on the right side of the head, and the light emitting device provided on the left side part emits light to correspond to optical flow of a view from a left side window of the vehicle when the left side part is positioned on the left side of the head, when an acceleration is applied in the lateral direction, the light emitting device that emits light to correspond to the optical flow of the view from the side window is disposed to the side of the occupant. Thereby, the occupant can acquire information related to the acceleration of the vehicle through vision. As a result, the difference between the acceleration detected by the vestibular system in the ear and the visually perceived acceleration becomes small, whereby motion sickness of the occupant can be reduced.

According to the configuration where, in the above aspect, the right contact surface and the left contact surface are provided with respective displays, the display of the right side part displays optical flow of a view from a side window of the vehicle when the right side part is positioned on the right side of the head, and the display of the left side part displays optical flow of a view from a side window of the vehicle when the left side part is positioned on the left side of the head, the occupant can visually acquire the information related to the acceleration of the vehicle. Thereby, the difference between the acceleration detected by the vestibular system and the visually perceived acceleration becomes small, whereby motion sickness of the occupant can be reduced.

According to the configuration where, in the above aspect, the acceleration acquisition device is an acceleration sensor supported by one of the seat cushion, the seat back, and the headrest, the acceleration applied to the body of the occupant can be acquired more accurately and in a simple manner.

According to the configuration where, in the above aspect, a car navigation system capable of acquiring map information and a position of the vehicle is installed in the vehicle, and the acceleration acquisition device is configured to receive the map information and the position of the vehicle from the car navigation system and to calculate the acceleration, the acceleration applied to the occupant can be predicted based on the map information and the position of the vehicle, and the left side part and the right side part can be displaced based on the predicted acceleration. This makes it possible to displace the left side part and the right side part in accordance with the instant at which the centrifugal force is applied and thereby to restrict the movement of the head of the occupant more reliably. Therefore, motion sickness of the occupant can be reduced.

According to the configuration where, in the above aspect, the seat back is constituted of a frame forming a skeleton, a bag-shaped skin member covering the frame, and beads contained in the skin member such that when the occupant is seated, the seat back is depressed rearward under a load from the occupant to form a recess corresponding to an upper body of the occupant and a shape of the recess is held for a prescribed time, when the occupant is seated, a recess having a shape corresponding to the upper body of the occupant is formed in the seat back and the shape is held. Therefore, when the occupant is seated, the upper body of the occupant is received in the recess, so that the lateral movement of the upper body of the occupant is restricted. Thus, motion sickness of the occupant can be reduced.

According to the configuration where, in the above aspect, the vehicle seat comprises a pair of left and right armrests respectively joined to a left side surface and a right side surface of the seat back and extending forward, wherein the armrests are provided with respective swelling parts configured to selectively swell in mutually opposing directions, and the control device causes the swelling parts to swell to sandwich the upper body of the occupant therebetween when a lateral direction acceleration is acquired by the acceleration acquisition device, when the lateral direction acceleration is applied to the occupant, the swelling parts swell and restrict the lateral movement of the upper body of the occupant. Thereby, the posture of the occupant stabilized and motion sickness of the occupant can be reduced.

According to the configuration where, in the above aspect, at least one of a left side surface and a right side surface of the seat back is provided with an armrest that extends forward, wherein the armrest is provided with an upward protruding grip at a front end portion thereof, since the front end portion of the armrest is provided with the upward protruding grip, when an acceleration is applied in the lateral direction, the occupant can stabilize his/her posture by grasping the grip, whereby motion sickness of the occupant can be reduced.

To achieve the above object, a vehicle seat including a seat cushion and a seat back and configured to be installed in a vehicle comprises a drive unit for deforming the seat back to selectively restrain at least a part of an upper body of a seated occupant from left and right sides. According to this configuration, since the upper body of the occupant is restrained from the left and right sides, the rolling of the upper body of the occupant can be prevented more reliably.

In the above aspect, the vehicle seat comprises: a lateral acceleration acquisition unit configured to acquire a lateral acceleration applied to the occupant; and a control unit which, based on the lateral acceleration acquired by the lateral acceleration acquisition unit, makes the drive unit deform the seat back to oppose the inertial force acting on the upper body of the occupant. According to this configuration, application of inertial force to the occupant, which may cause rolling, can be detected from the lateral acceleration applied to the vehicle. Thereby, it is possible to support the upper body of the occupant in accordance with the timing at which the upper body of the occupant may roll, whereby the rolling of the upper body of the occupant can be prevented more effectively.

In the above aspect, the drive unit includes a pair of left and right air cells that are provided inside the seat back and, when supplied with air, make a front surface of the seat back protrude forward at positions on left and right outer sides of shoulders of the occupant or on left and right outer sides of a hip of the occupant, and an air supply and discharge device for supplying air to and discharging air from each of the left and right air cells, wherein the control unit makes the air supply and discharge device supply air to the left air cell when the lateral acceleration is rightward and makes the air supply and discharge device supply air to the right air cell when the lateral acceleration is leftward. According to this configuration, the air cells and the piping for supplying air to and discharging air from the air cells are provided in the seat back so that the seat back can be deformed, and thus, the configuration of the drive unit is simple.

In the above aspect, the seat back includes a seat back body configured to support a back of the occupant and a pair of left and right restriction members respectively joined to left and right side surfaces of the seat back body, the drive unit includes a pair of left and right air cells which, when supplied with air, respectively cause seat-inner-side side surfaces of the left and right restriction members to protrude toward a seat inner side, and an air supply and discharge device for supplying air to and discharging air from each of the left and right air cells, and the control unit makes the air supply and discharge device supply air to the left air cell when the lateral acceleration is rightward and makes the air supply and discharge device supply air to the right air cell when the lateral acceleration is leftward. According to this configuration, the restriction members are respectively provided on the left and right sides of the occupant, whereby the lateral movement of the upper body of the occupant is restricted. Further, when a lateral acceleration is applied, the restriction member positioned in the moving direction of the occupant protrudes toward the seat inner side to apply a load opposing the inertial force to the occupant. Thus, the restriction member supports the upper body of the occupant, whereby the rolling of the upper body of the occupant can be prevented.

In the above aspect, the seat-inner-side side surfaces of the restriction members are each provided with a touch sensor configured to detect contact with the occupant, and the control unit makes the air supply and discharge device supply air to the left air cell until the contact is detected by the left touch sensor when the lateral acceleration is rightward and makes the air supply and discharge device supply air to the right air cell until the contact is detected by the right touch sensor when the lateral acceleration is leftward. According to this configuration, the amount of protrusion of the restriction members toward the seat inner side can be adjusted in accordance with the physique of the occupant based on the signals from the touch sensors.

In the above aspect, the drive unit includes a bag member that is provided inside the seat back and, when air is discharged therefrom, forms a recess in a front surface of the seat back, and an air supply and discharge device capable of supplying air to and discharging air from the bag member, wherein, when the lateral acceleration acquired by the lateral acceleration acquisition unit is greater than or equal to a prescribed threshold value, the control unit drives the air supply and discharge device. According to this configuration, when the lateral acceleration is greater than or equal to the threshold value, the air supply and discharge device discharges air from the bag member so that the front surface of the seat back is depressed rearward. Thereby, a recess is formed in the seat back and the upper body of the occupant is received in the recess. Therefore, the lateral movement of the upper body of the occupant is restricted and the rolling of the upper body of the occupant is prevented.

In the above aspect, the lateral acceleration acquisition unit includes one of an acceleration sensor provided on/in the seat back or the seat cushion, a steering angle sensor configured to acquire a steering angle of the vehicle, or a car navigation system installed in the vehicle and storing map information, a position of the vehicle, and a travel schedule of the vehicle. According to this configuration, the direction of the lateral acceleration applied to the seated occupant can be acquired, and the upper body of the occupant can be supported in accordance with the direction in which the upper body of the occupant moves due to inertial force and the timing at which the inertial force is applied.

In the above aspect, the vehicle seat comprises: a seating sensor provided on/in the seat cushion or the seat back to detect seating of the occupant; and a control unit that, when the seating of the occupant is detected by the seating sensor, makes the drive unit deform the seat back to restrain the upper body of the occupant from both the left and right sides. According to this configuration, when the occupant is seated, the upper body of the occupant is restrained from both the left and right sides, whereby the rolling of the upper body of the occupant can be prevented during travel of the vehicle.

In the above aspect, the drive unit includes a bag member that is provided inside the seat back and, when air is discharged therefrom, forms a recess in a front surface of the seat back, and an air supply and discharge device capable of supplying air to and discharging air from the bag member, and when the seating of the occupant is detected, the control unit makes the air supply and discharge device discharge air from the bag member. According to this configuration, when the occupant is seated, the air supply and discharge device discharges air from the bag member so that the front surface of the seat back is depressed rearward. Thereby, a recess is formed in the seat back and the upper body of the occupant is received in the recess. Therefore, the lateral movement of the upper body of the occupant is restricted and the rolling of the upper body of the occupant can be prevented.

In the above aspect, the drive unit includes a bag member provided inside the seat back and containing multiple spherical members therein, and an air supply and discharge device capable of supplying air to and discharging air from an interior of the bag member, and the control unit makes the drive unit discharge air from the bag member when the seating of the occupant is detected. According to this configuration, when the occupant is seated, the seat back is deformed by the load from the occupant, and a recess conformal to the shape of the upper body of the occupant is formed on the front surface thereof. When air is discharged from the bag member, the spherical members closely contact one another so that the bag member becomes difficult to deform. Therefore, when inertial force due to the lateral acceleration is applied to the upper body of the occupant, a load opposing the inertial force is applied from the wall surface defining the recess. Thereby, the rolling of the upper body of the occupant can be prevented.

In the above aspect, the seat back includes a seat back body configured to support a back of the occupant and a pair of left and right restriction members respectively joined to left and right side surfaces of the seat back body, the drive unit includes a pair of left and right air cells which, when supplied with air, respectively cause seat-inner-side side surfaces of the left and right restriction members to protrude toward a seat inner side, and an air supply and discharge device for supplying air to and discharging air from each of the left and right air cells, the seat-inner-side side surfaces of the restriction members are each provided with a touch sensor configured to detect contact with the occupant, and when the seating of the occupant is detected by the seating sensor, the control unit makes the air supply and discharge device supply air to each of the left and right air cells until the left and right touch sensors detect the contact, and thereafter makes the air supply and discharge device discharge air from each of the left and right air cells for a prescribed time. According to this configuration, when the occupant is seated, the left and right air cells are expanded until they contact the occupant. After the expansion, air is discharged from the left and right air cells for a prescribed time, so that a space is created between the seat-inner-side side surface of each restriction member and the occupant. In this way, with the restriction members protruding toward the seat inner side and disposed in the left and right vicinity of the occupant, the lateral movement of the upper body of the occupant is restricted, whereby the rolling of the upper body of the occupant can be prevented. Further, air is discharged from the left and right air cells for a prescribed time so that the seat-inner-side side surface of each restriction member is slightly spaced from the occupant, and therefore, the restriction members do not always contact the occupant, and the oppressive feeling imparted to the occupant is reduced.

In the above aspect, the drive unit includes a pair of left and right air cells that are provided inside the seat back and, when supplied with air, make a front surface of the seat back protrude forward at positions on left and right outer sides of shoulders of the occupant or on left and right outer sides of a hip of the occupant, and an air supply and discharge device for supplying air to and discharging air from each of the left and right air cells, portions of the front surface of the seat back in front of the respective air cells are each provided with a touch sensor configured to detect contact with the occupant, and when the seating of the occupant is detected by the seating sensor, the control unit makes the air supply and discharge device supply air to each of the left and right air cells until the left and right touch sensors detect the contact, and thereafter makes the air supply and discharge device discharge air from each of the left and right air cells for a prescribed time. According to this configuration, the front surface of the seat back is caused to protrude at positions on the left and right sides of the shoulders or the hip of the occupant. Thereby, the lateral movement of the occupant is restricted. The discharge of air from the air cells for a prescribed time after the touch sensors detect the contact creates a space between the occupant and a wall body formed by the protruding of the front surface of the seat back, whereby the oppressive feeling imparted to the occupant is reduced.

In the above aspect, each of the seat cushion and the seat back includes a frame forming a skeleton, a pad member supported by the frame, and a skin member covering at least a part of a surface of the pad member. According to this configuration, the provision of the frame can make the vehicle seat have sufficient rigidity to support the occupant, and the provision of the pad member and the skin member makes it easy for the occupant to be seated.

To achieve the above object, a seat belt device comprises: a seat belt including a left belt portion configured to restrain a left shoulder of an occupant and a right belt portion configured to restrain a right shoulder of the occupant; a pair of retractors including a left retractor configured to apply tension to the left belt portion and a right retractor configured to apply tension to the right belt portion; a lateral acceleration acquisition unit configured to acquire a lateral acceleration that is applied to the occupant in a lateral direction, and a control unit configured to drive the left retractor when the lateral acceleration acquired by the lateral acceleration acquisition unit is rightward and to drive the right retractor when the lateral acceleration acquired by the lateral acceleration acquisition unit is leftward. According to this configuration, when leftward inertial force is applied to the occupant due to rightward lateral acceleration, the left retractor is driven to apply tension to the left belt portion. When rightward inertial force is applied to the occupant due to leftward lateral acceleration, the right retractor is driven to apply tension to the right belt portion. In this way, it is possible to apply tension to the belt portion positioned on the moving direction side of the occupant, namely, the belt portion more reliably positioned over the corresponding shoulder of the occupant. Thus, the movement of the upper body of the occupant can be prevented reliably regardless of the direction of the inertial force.

In the above aspect, the left belt portion includes a left lap belt extending leftward from a front side of a hip of the seated occupant and a left shoulder belt having one end joined to the left lap belt and extending upward to pass a front side of the left shoulder of the seated occupant, the right belt portion includes a right lap belt extending rightward from the front side of the hip of the seated occupant and a right shoulder belt having one end joined to the right lap belt and extending upward to pass a front side of the right shoulder of the seated occupant, and the left lap belt and the right lap belt are detachably connected to each other on the front side of the hip of the occupant. According to this configuration, compared to the three-point seat belt, the upper body of the occupant can be restrained to the seat back more reliably. Also, since the right belt portion includes the right shoulder belt configured to be positioned over the right shoulder of the occupant and the left belt portion includes the left shoulder belt configured to be positioned over the left shoulder of the occupant, either of the left and right shoulders of the occupant can be pressed against the seat back by applying tension to the corresponding shoulder belt. Thereby, by selecting the shoulder of the occupant on the side of the direction of movement generated by inertial force and applying tension to the corresponding shoulder seat belt, it is possible to press the shoulder of the occupant against the seat back more reliably so that the movement of the occupant can be prevented.

In the above aspect, the left belt portion is configured to extend from the left shoulder to the right hip of the occupant, the right belt portion is configured to extend from the right shoulder to the left hip of the occupant, and the left belt portion and the right belt portion cross each other in front view. According to this configuration, compared to the three-point seat belt, the upper body of the occupant can be restrained to the seat back more reliably. Also, since the left belt portion and the right belt portion are configured to be positioned over the left and right shoulders, respectively, it is possible to press either of the left and right shoulders of the occupant against the seat back with priority by applying tension to the corresponding one of the left belt portion and the right belt portion.

In the above aspect, the control unit drives the left retractor and the right retractor when a magnitude of the lateral acceleration acquired by the lateral acceleration acquisition unit is greater than or equal to a prescribed first threshold value, drives the left retractor when the magnitude of the lateral acceleration acquired by the lateral acceleration acquisition unit is greater than or equal to a prescribed second threshold value and a direction of the lateral acceleration is rightward, and drives the right retractor when the magnitude of the lateral acceleration acquired by the lateral acceleration acquisition unit is greater than or equal to the prescribed second threshold value and the direction of the lateral acceleration is leftward. According to this configuration, in a region of the lateral acceleration greater than or equal to the first threshold value where the restriction of the occupant to the seat back cannot be achieved sufficiently by driving only one of the left and right retractors, both the left and right retractors are driven so that it is possible to restrain the occupant to the seat back more firmly and thereby to protect the occupant.

In the above aspect, with increase in the lateral acceleration the control unit drives the corresponding retractor to increase the applied tension. According to this configuration, as the inertial force acting on the occupant increases, the tension applied by the corresponding retractor increases and the occupant is restrained to the seat back more firmly. Thereby, it is possible to increase the friction force between the upper body of the occupant and the seat back as the lateral acceleration increases, and therefore, the movement of the upper body of the occupant can be prevented more reliably.

In the above aspect, the vehicle seat comprises an auxiliary acceleration acquisition unit configured to acquire a longitudinal acceleration applied to the occupant in a fore and aft direction and a vertical acceleration applied to the occupant in a vertical direction, and the control unit drives both the left retractor and the right retractor when the longitudinal acceleration is directed rearward and has a magnitude greater than or equal to a prescribed rearward threshold value or when the vertical acceleration is directed downward and has a magnitude greater than or equal to a prescribed downward threshold value. According to this configuration, when large inertial force acts on the occupant forward or upward, the left and right retractors can be driven to apply a load to oppose the inertial force acting on the upper body in a direction away from the seat back. Thereby, it is possible to give a sense of stability to the occupant, whereby motion sickness can be reduced.

Also, there is provided a vehicle seat provided with any one of the seat belt devices of the above aspects and configured to be installed in a vehicle, the vehicle seat comprising: a seat cushion configured to be placed on a floor in a cabin to support buttocks of an occupant; and a seat back configured to support a back of the occupant, wherein a lower end of the left belt portion and a lower end of the right belt portion are each joined to the seat cushion, the left retractor is supported by either the seat back or the seat cushion and is configured to wind an upper end of the left belt portion, and the right retractor is supported by either the seat back or the seat cushion and is configured to wind the upper end of the right belt portion. According to this configuration, regardless of the position and direction of the vehicle seat in the cabin, the seat belt device can prevent the movement of the upper body of the occupant.

In the above aspect, the lateral acceleration acquisition unit includes an acceleration sensor supported by at least one of the seat back or the seat cushion. According to this configuration, the acceleration sensor can be positioned in the vicinity of the occupant, and therefore, the lateral acceleration applied to the body of the occupant can be acquired more accurately and in a simple manner. Thereby, the corresponding shoulder of the occupant can be pressed against the seat back more reliably, and the movement of the occupant due to inertial force can be prevented more reliably.

In the above aspect, the lateral acceleration acquisition unit includes a steering angle sensor configured to acquire a steering angle of the vehicle or a car navigation system installed in the vehicle and storing map information, a position of the vehicle, and a travel schedule of the vehicle. According to this configuration, it is possible to predict turning of the vehicle based on the steering angle acquired by the steering angle sensor or based on the map information, the position of the vehicle, and travel schedule, and to acquire the direction of lateral acceleration applied to the occupant and the time at which the lateral acceleration is applied. Thereby, it is possible to drive the retractor(s) in accordance with the instant at which the inertial force caused by the turning is applied to the occupant, whereby the movement of the upper body of the occupant can be prevented more reliably.

In the above aspect, the vehicle seat is supported on the floor to be rotatable about a vertical axis. According to this configuration, the comfort of the vehicle seat is improved.

In the above aspect, each of the seat cushion and the seat back includes a frame forming a skeleton, a pad member supported by the frame, and a skin member covering at least a part of a surface of the pad member. According to this configuration, the provision of the frame can make the vehicle seat have sufficient rigidity to support the occupant, and the provision of the pad member and the skin member makes it easy for the occupant to be seated.

BRIEF DESCRIPTION OF THE DRAWINGS

FIG. 14 is s horizontal sectional view of the vehicle seat according to the seventh embodiment (A) when air is discharged from the left air cell and (B) when air is supplied to the left air cell;

FIG. 17 is a horizontal sectional view of the vehicle seat according to the eighth embodiment when (A) air is discharged from the left air cell and (B) air is supplied to the left air cell;

MODE(S) FOR CARRYING OUT THE INVENTION

In the following, embodiments in which the vehicle seat according to the present invention is applied to a seat of a vehicle such as an automobile will be described with reference to the drawings.

First Embodiment

Figure 1:
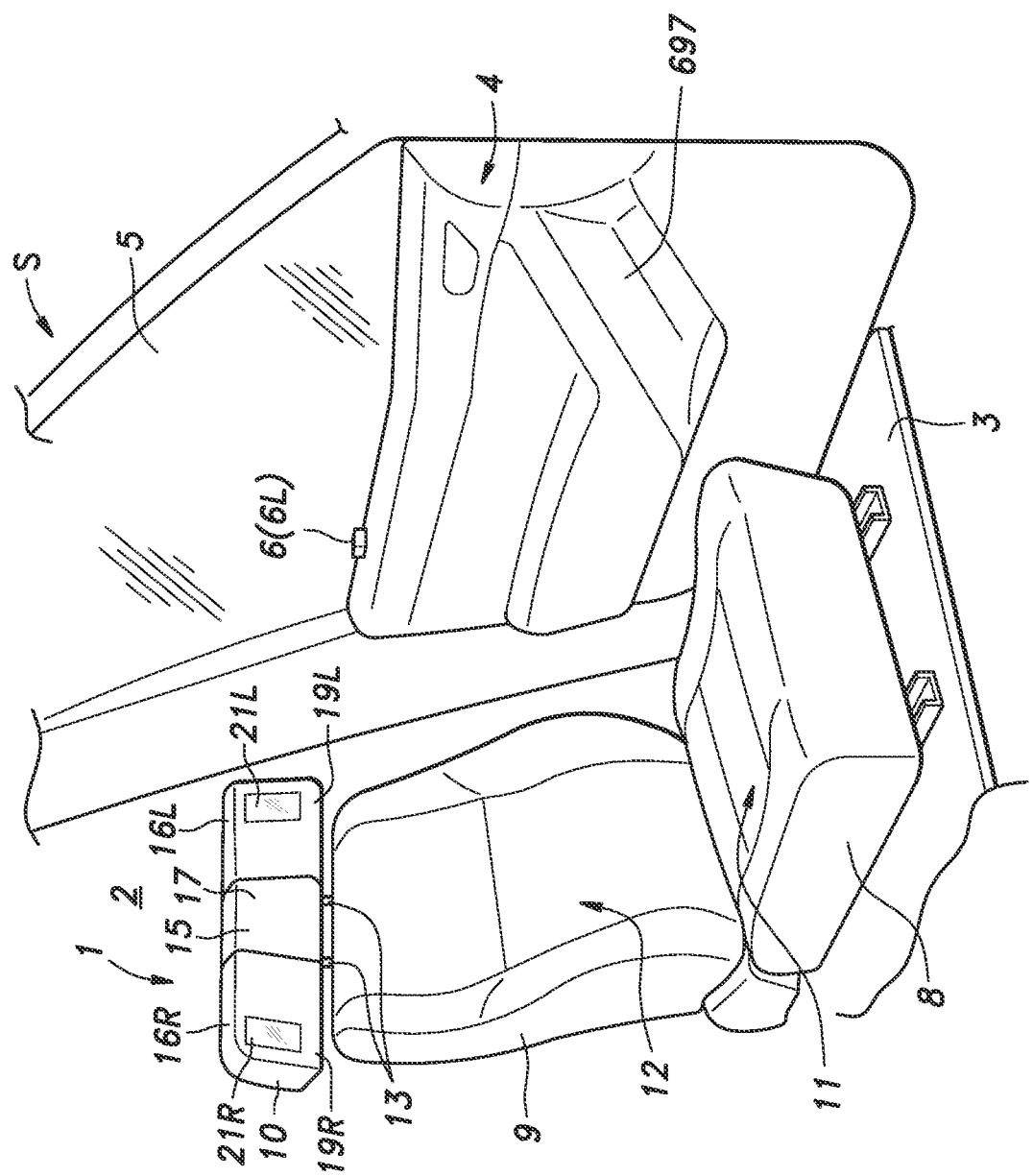
FIG. 1 is a perspective view of a vehicle seat according to the first embodiment.

As shown in FIG. 1, a vehicle seat 1 is installed in a vehicle S such as an automobile. The vehicle seat 1 is disposed on a floor 3 defining a bottom portion of a cabin 2 at a position adjacent to the driver's seat to constitute a front passenger seat (assistant seat). On an outboard side of each of the driver's seat and the front passenger seat, a door 4 is provided to allow an occupant to get in and out of the vehicle S. The doors are provided with respective side windows 5 for allowing the occupant to have views on the left and right sides of the vehicle S and respective camera 6s for successively acquiring images on the left and right outer sides of the vehicle S through the side windows 5 in every prescribed time period. In the following, the fore and aft, lateral, and vertical directions are defined using the fore and aft direction of the vehicle S as a reference. Also, the camera provided on the left door 4 of the vehicle S will be referred to as the left camera 6L and the camera provided on the right door 4 of the vehicle S will be referred to as the right camera.

The vehicle seat 1 includes a seat cushion 8 that supports the buttocks of a seated person, a seat back 9 provided at a rear portion of the seat cushion 8 to function as a backrest, and a headrest 10 provided in an upper part of the seat back 9.

The seat cushion 8 has a substantially rectangular parallelepiped shape having a surface that faces substantially vertically. The upper surface of the seat cushion 8 forms a seating surface 11 for a single occupant. The seating surface 11 is recessed downward substantially at a laterally central part thereof, and is slightly inclined downward in the fore and aft direction toward the rear end thereof. Thus, the seating surface 11 has a shape corresponding to the buttocks and thighs of the occupant. When an occupant is seated, the buttocks and thighs of the occupant are positioned on the seating surface 11.

The seat back 9 extends vertically and has a substantially rectangular parallelepiped shape having a surface that faces substantially in the fore and aft direction. The front surface of the seat back 9 forms a support surface 12 for supporting the occupant's back. The support surface 12 is recessed rearward substantially at a laterally central part thereof, and is slightly inclined rearward toward the upper end thereof. Thus, the support surface 12 has a shape corresponding to the back of the occupant, and the back of the occupant is supported by the support surface 12.

The lower end of the seat back 9 is pivotally supported by the rear end of the seat cushion 8 via a per se known reclining mechanism. In other words, the seat back 9 is connected to the rear end of the seat cushion 8 at the lower end so as to be pivotable forward and backward.

The headrest 10 is of a so-called butterfly type and includes a main part 15 connected to the upper end of the seat back 9 via two pillars 13, a left side part 16L provided on the left side of the main part 15, and a right side part 16R provided on the right side of the main part 15. The main part 15 has a substantially rectangular surface facing substantially forward. The main part 15 contacts the back of the head of the seated occupant with that surface (hereinafter, the main contact surface 17) and supports the back of the head of the occupant from the rear.

Figure 2:
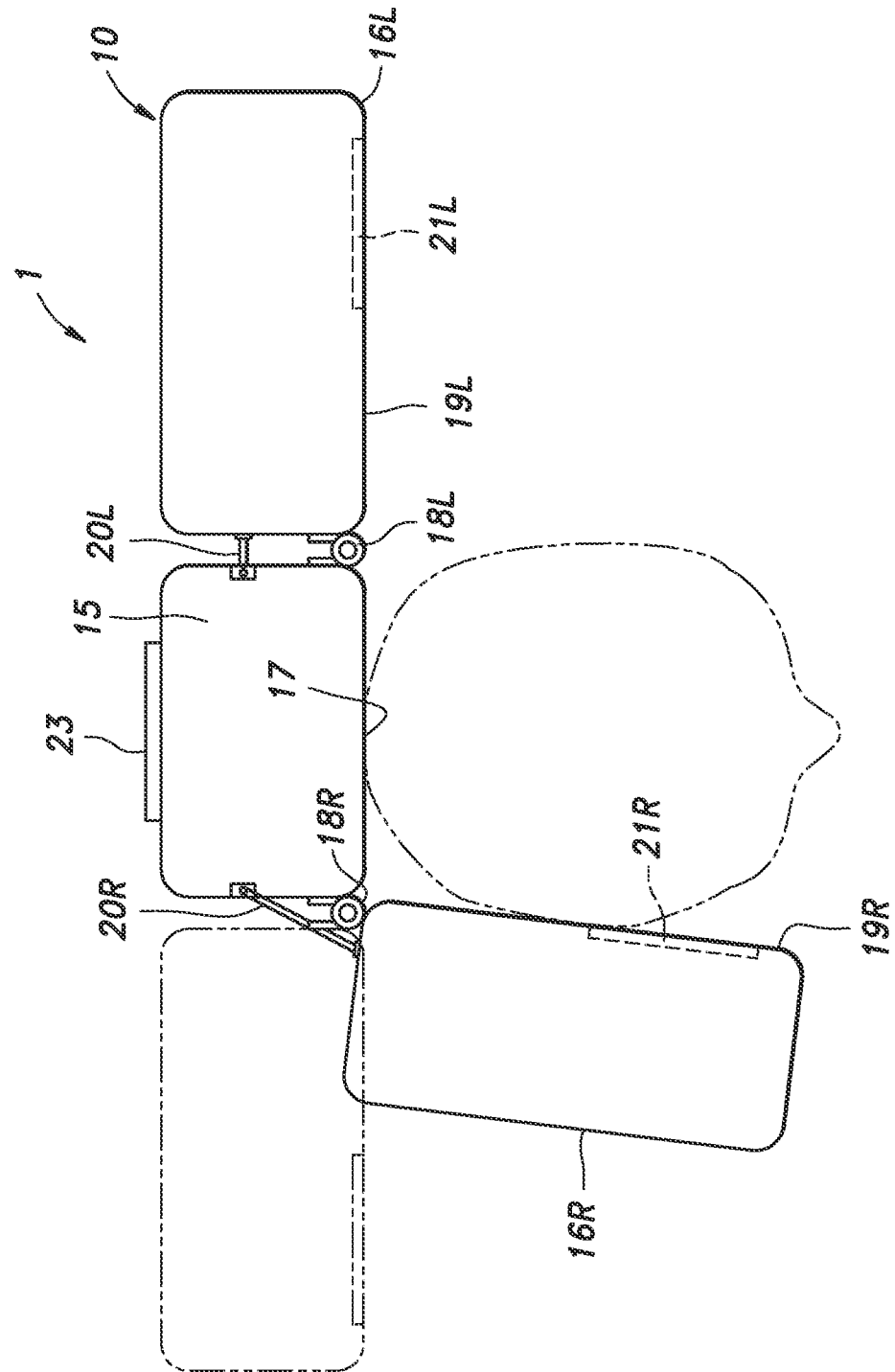
FIG. 2 is a plan view of a headrest of the vehicle seat according to the first embodiment.

The right side part 16R has a substantially rectangular parallelepiped shape. As shown in FIG. 2, the right side part 16R is connected to the right edge of the main contact surface 17 via a hinge 18R at one ridge thereof, and is connected to the main part 15 to be rotatable about a vertical axis. Thereby, the right side part 16R is displaceable between a use position (two-dot chain line) in which one wall surface thereof (hereinafter, the right contact surface 19R) faces substantially forward to be continuous with the main contact surface 17 and a support position (solid line) in which the right contact surface 19R faces leftward and is positioned on the right side of the head of the occupant. When the right side part 16R is in the support position, the angle formed between the right contact surface 19R and the main contact surface 17 preferably is greater than or equal to 85 degrees and less than or equal to 105 degrees, and in the present embodiment, is approximately 95 degrees. The hinge 18R is provided with a coil spring (not shown in the drawings) for urging the right side part 16R toward the use position.

The left side part 16L has a substantially rectangular parallelepiped shape. The left side part 16L is connected to the left edge of the main contact surface 17 via a hinge 18L at one ridge thereof, and is connected to the main part 15 to be rotatable about a vertical axis. Thereby, the left side part 16L is displaceable between a use position in which one wall surface thereof (hereinafter, the left contact surface 19L) faces substantially forward to be continuous with the main contact surface 17 and a support position in which the left contact surface 19L faces rightward and is positioned on the left side of the head of the occupant. When the left side part 16L is in the support position, the angle formed between the left contact surface 19L and the main contact surface 17 preferably is greater than or equal to 85 degrees and less than or equal to 105 degrees, and in the present embodiment, is approximately 95 degrees. The hinge 18L is provided with a coil spring (not shown in the drawings) for urging the left side part 16L toward the use position.

An actuator for rotating the left side part 16L relative to the main part 15 (hereinafter, the left drive device 20L) is provided between the main part 15 and the left side part 16L, and an actuator for rotating the right side part 16R relative to the main part 15 (hereinafter, the right drive device 20R) is provided between the main part 15 and the right side part 16R. In the present embodiment, as shown in FIG. 2, the left drive device 20L and the right drive device 20R are respectively supported by the left side portion and the right side portion of the main part 15 to be pivotable about respective vertical axes. Each of the left drive device 20L and the right drive device 20R can expand and contract and, as shown in FIG. 2, the left side part 16L rotates about the axis of the hinge 18L in response to the expansion and contraction of the left drive device 20L to be displaced between the use position (two-dot chain line) and the support position (solid line). Similarly, the right side part 16R is displaced between the use position and the support position in response to the expansion and contraction of the right drive device 20R.

Figure 3:
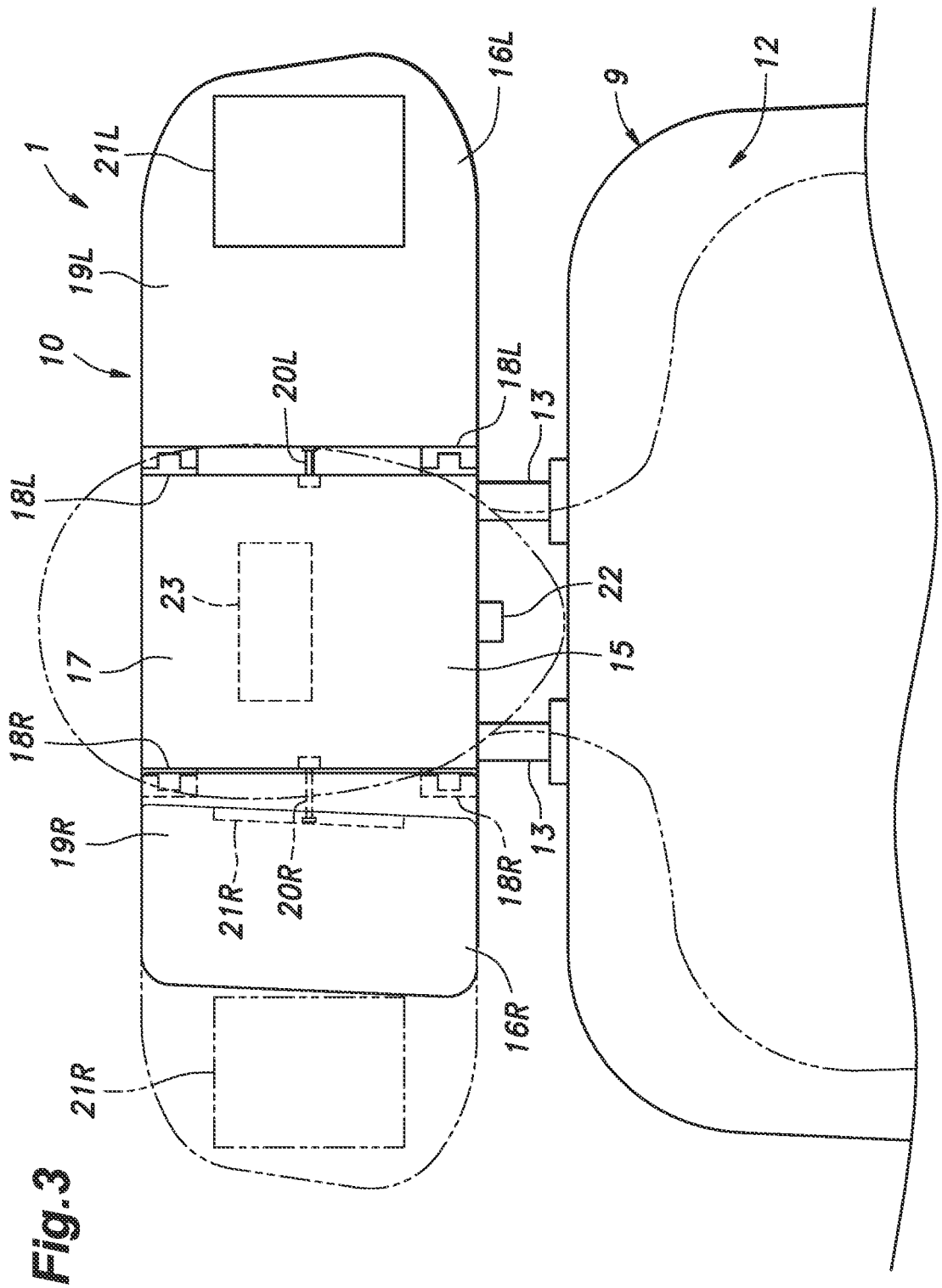
FIG. 3 is a front view of the headrest of the vehicle seat according to the first embodiment.

As shown in FIG. 3, the left contact surface 19L of the left side part 16L and the right contact surface 19R of the right side part 16R are provided with displays 21L, 21R, respectively. The displays 21L, 21R each consist of a so-called organic EL display in a film form, and are adhered to the left contact surface 19L and the right contact surface 19R, respectively. In the following, the display provided on the left side part 16L will be referred to as the left display 21L, and the display provided on the right side part 16R will be referred to as the right display 21R.

An acceleration sensor 22 (acceleration acquisition device) configured to acquire a lateral direction acceleration applied to the main part 15 is provided on the lower surface of the main part 15. In the present embodiment, the acceleration sensor 22 is of a so-called semiconductor type, and may consist of a capacitive sensor or a piezoresistive sensor. When an acceleration directed rightward of the main part 15 is acquired, the acceleration sensor 22 outputs the acceleration as a positive value, and when an acceleration directed leftward of the main part 15 is acquired, the acceleration sensor 22 outputs the acceleration as a negative value. By providing the main part 15 with the acceleration sensor 22 as described above, it is possible to arrange the acceleration sensor 22 at a position closer to the head of the occupant. Thereby, the acceleration applied to the head of the occupant can be acquired more accurately.

As shown in FIG. 2, a control device 23 is provided on the rear surface of the main part 15. The control device 23 is a microcomputer including a central processing unit (CPU), a storage device (memory), and the like, and is connected to the left camera 6L, the right camera, the acceleration sensor 22, the left drive device 20L, the right drive device 20R, the left display 21L, and the right display 21R. More specifically, the control device 23 includes an input unit to which signals from the acceleration sensor 22, the left camera 6L, and the right camera are input, an output unit configured to output signals to each of the left drive device 20L, the right drive device 20R, the left display 21L, and the right display 21R, and an optical flow calculation unit for calculating optical flow from multiple images acquired by each of the left camera 6L and the right camera in every prescribed time period. Optical flow represents the positions of multiple feature points, which are extracted from the multiple images acquired in every prescribed time period, and temporal changes of the positions of the feature points as a vector field by using vectors having initial points at the positions of the respective feature points. The optical flow calculation unit may be configured by known software stored in the memory of the control device 23 and executed by the CPU.

The control device 23 executes a motion sickness prevention process in every prescribed time period (more specifically, in about every 0.05 seconds) when the vehicle S is traveling. In the following, the motion sickness prevention process will be described in detail with reference to FIG. 5. Note that it is assumed that when the vehicle S starts traveling, the left side part 16L and the right side part 16R are each in the use position.

Figure 5:
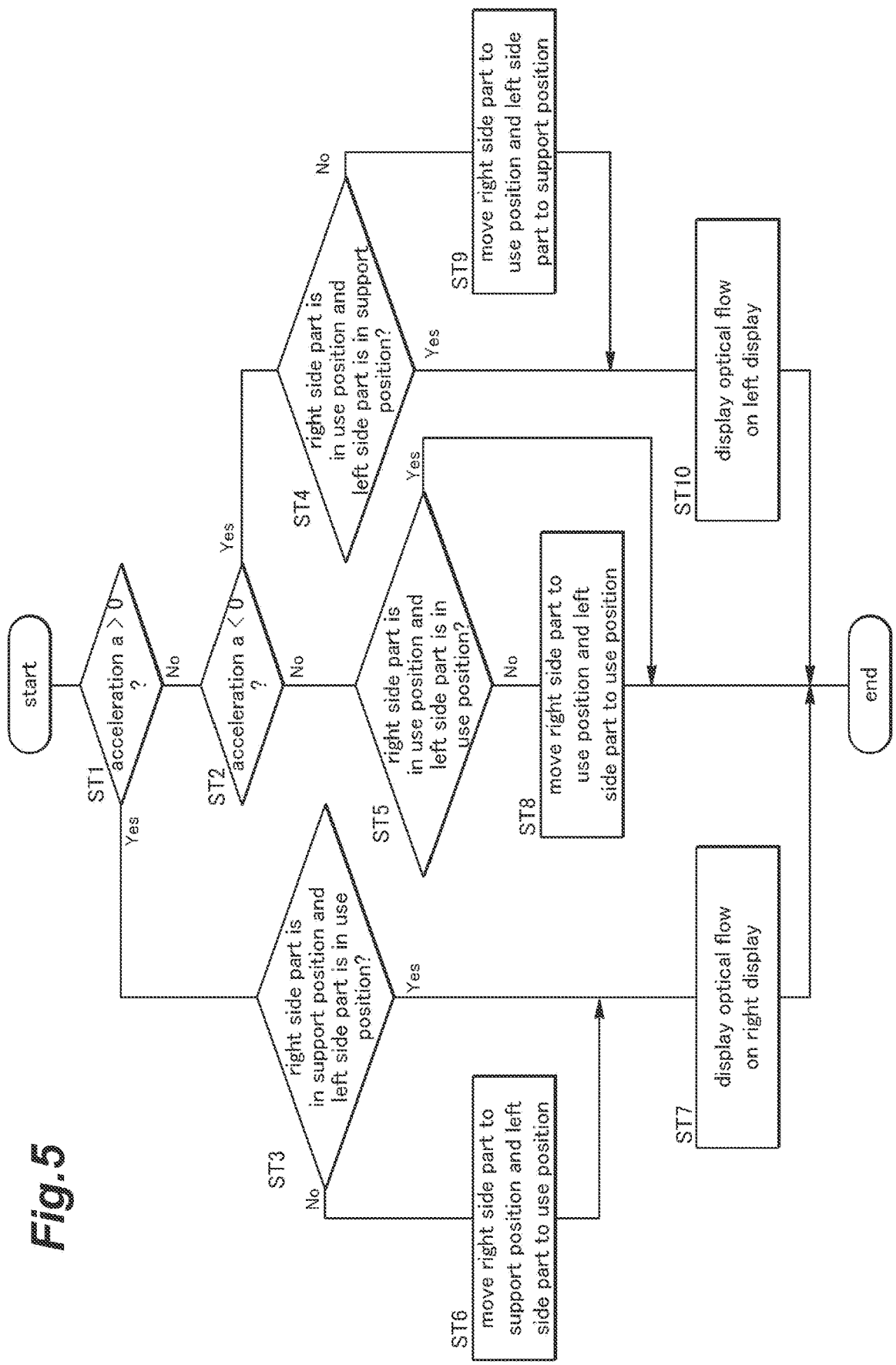
FIG. 5 is a flowchart of a motion sickness prevention process.

As shown in FIG. 5, in the first step ST1 of the motion sickness prevention process, the control device 23 acquires an acceleration a from the acceleration sensor 22. Next, the control device 23 determines whether the acceleration a is a positive value (a>0) (namely, whether a rightward acceleration is acquired by the acceleration sensor 22). When the acceleration a is a positive value, the control device 23 executes step ST3, and otherwise executes step ST2.

In step ST2, the control device 23 determines whether the acceleration a is a negative value (a<0) (namely, whether a leftward acceleration is acquired by the acceleration sensor 22). When the acceleration a is a negative value, the control device 23 executes step ST4, and otherwise (namely, the acceleration is 0) executes step ST5.

In step ST3, the control device 23 determines whether the right side part 16R is in the support position and the left side part 16L is in the use position. If the right side part 16R is in the support position and the left side part 16L is in the use position, the control device 23 executes step ST7, and otherwise executes step ST6.

In step ST6, the control device 23 drives the right drive device 20R to displace the right side part 16R from the use position to the support position. Thereby, the right side part 16R is rotated forward until being positioned on the right side of the head of the occupant. Also, the control device 23 drives the left drive device 20L to displace the left side part 16L from the support position to the use position. Thereafter, the control device 23 executes step ST7.

Figure 4:
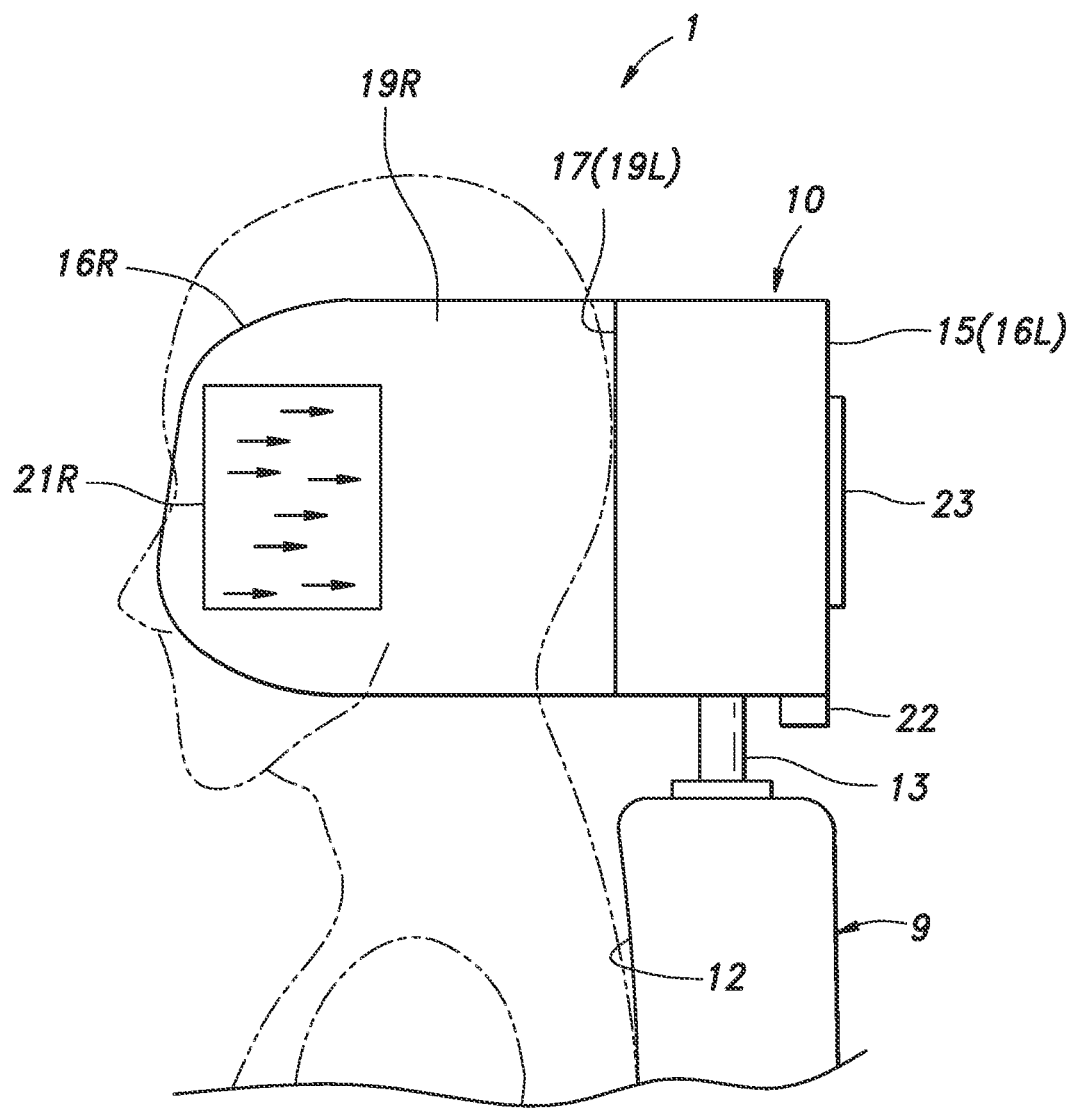
FIG. 4 is a side view of the headrest when a right side part of the vehicle seat according to the first embodiment is in a support position.

In step ST7, the control device 23 calculates optical flow from the multiple images acquired by the right camera in every prescribed time period and causes the right display 21R to display the optical flow. The right display 21R is caused to display multiple arrows representing the flow of the view that can be visually recognized by the occupant through the right side window 5 of the vehicle S. For example, as shown in FIG. 4, when the vehicle S is traveling forward, the view flows backward, and therefore, multiple backward arrows are displayed on the right display 21R. When the display on the right display 21R is completed, the control device 23 ends the motion sickness prevention process.

In step ST4, the control device 23 determines whether the right side part 16R is in the use position and the left side part 16L is in the support position. If the right side part 16R is in the use position and the left side part 16L is in the support position, the control device 23 executes step ST10, and otherwise executes step ST9.

In step ST9, the control device 23 drives the left drive device 20L to displace the left side part 16L from the use position to the support position. Thereby, the left side part 16L is rotated forward until being positioned on the left side of the head of the occupant. Also, the control device 23 drives the right drive device 20R to displace the right side part 16R from the support position to the use position. Thereafter, the control device 23 executes step ST10.

In step ST10, the control device 23 calculates optical flow from the multiple images acquired by the left camera 6L in every prescribed time period and causes the left display 21L to display the optical flow. The left display 21L is caused to display multiple arrows representing the flow of the view that can be visually recognized by the occupant through the left side window 5 of the vehicle S. When the display is completed, the control device 23 ends the motion sickness prevention process.

In step ST5, the control device 23 determines whether the right side part 16R is in the use position and the left side part 16L is in the use position. If the right side part 16R is in the use position and the left side part 16L is in the use position, the control device 23 ends the motion sickness prevention process, and otherwise executes step ST8.

In step ST8, the control device 23 drives the right drive device 20R to move the right side part 16R to the use position, and drives the left drive device 20L to displace the left side part 16L to the use position. Thereafter, the control device 23 turns off the left display 21L and the right display 21R, and ends the motion sickness prevention process.

Next, the effect of the vehicle seat 1 thus configured will be discussed. When a rightward acceleration is detected by the acceleration sensor 22, the control device 23 executes step ST3 and step ST6 in order and thereby moves the right side part 16R to the support position. As a result, the right side part 16R is rotated until being positioned to the right of the head of the occupant, whereby the rightward movement of the head of the occupant due to centrifugal force is restricted. Further, in the present embodiment, the right side part 16R is rotated to the position where the right contact surface 19R of the right side part 16R contacts the right side surface of the head, and therefore, the right side surface of the head and the right contact surface 19R contact each other to restrict the rightward movement of the head more reliably.

When a leftward acceleration is detected by the acceleration sensor 22, the control device 23 executes step ST4 and step ST9 in order and thereby moves the left side part 16L to the support position. As a result, the left contact surface 19L of the left side part 16L is rotated until being positioned to the left of the head of the occupant, whereby the leftward movement of the head of the occupant due to centrifugal force is restricted. Further, in the present embodiment, the left side part 16L is rotated to the position where the left contact surface 19L of the left side part 16L contacts the left side surface of the head, and therefore, the left side surface of the head and the left contact surface 19L contact each other to restrict the leftward movement of the head more reliably. In this way, owing to the movement of the right side part 16R and the left side part 16L, the movement of the head of the occupant due to centrifugal force is prevented and the posture of the head of the occupant is stabilized. Thus, motion sickness of the occupant can be reduced.

When the right side part 16R is disposed on the right side of the head, the optical flow corresponding to the images acquired by the right camera through the right side window 5 of the vehicle S is displayed on the right display 21R. Since the images acquired by the right camera change in accordance with the speed and acceleration of the vehicle S, the display on the right display 21R substantially corresponds to the speed and acceleration of the vehicle in the fore and aft direction. Similarly, when the left side part 16L is disposed on the left side of the head, the optical flow corresponding to the images acquired by the left camera 6L through the left side window 5 of the vehicle S is displayed on the left display 21L, so that the display thereof substantially corresponds to the speed and acceleration of the vehicle S in the fore and aft direction. Therefore, via the right display 21R or the left display 21L, the occupant can acquire information related to the speed and acceleration of the vehicle S in the fore and aft direction through vision. As a result, compared to the case where the occupant acquires only the situation inside the cabin 2 through vision, for example, the difference between the acceleration detected by the vestibular system in the ear and the visually perceived acceleration becomes small, whereby motion sickness of the occupant can be reduced.

Second Embodiment

Figure 6:
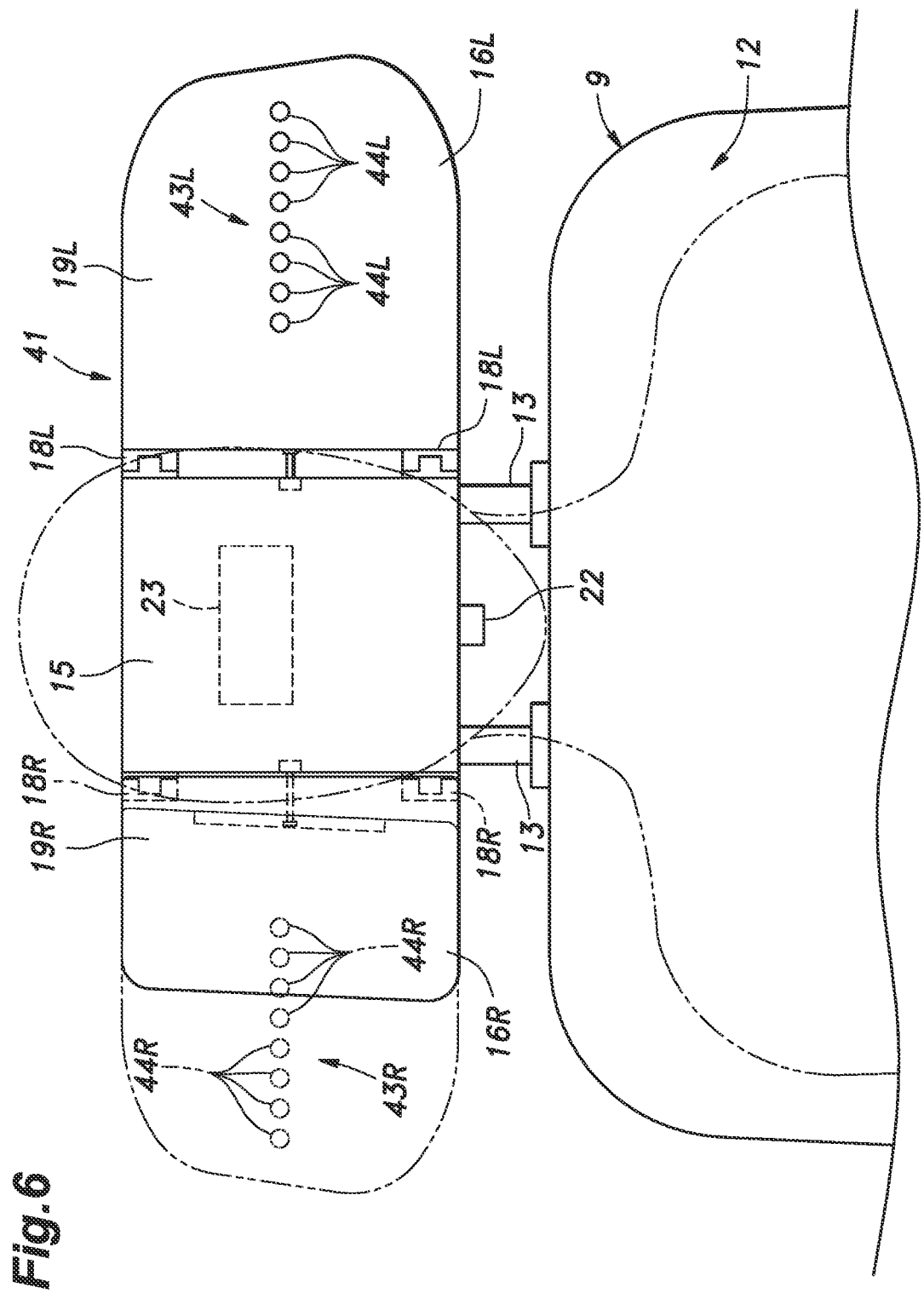
FIG. 6 is a front view of a headrest of a vehicle seat according to the second embodiment.
Figure 7:
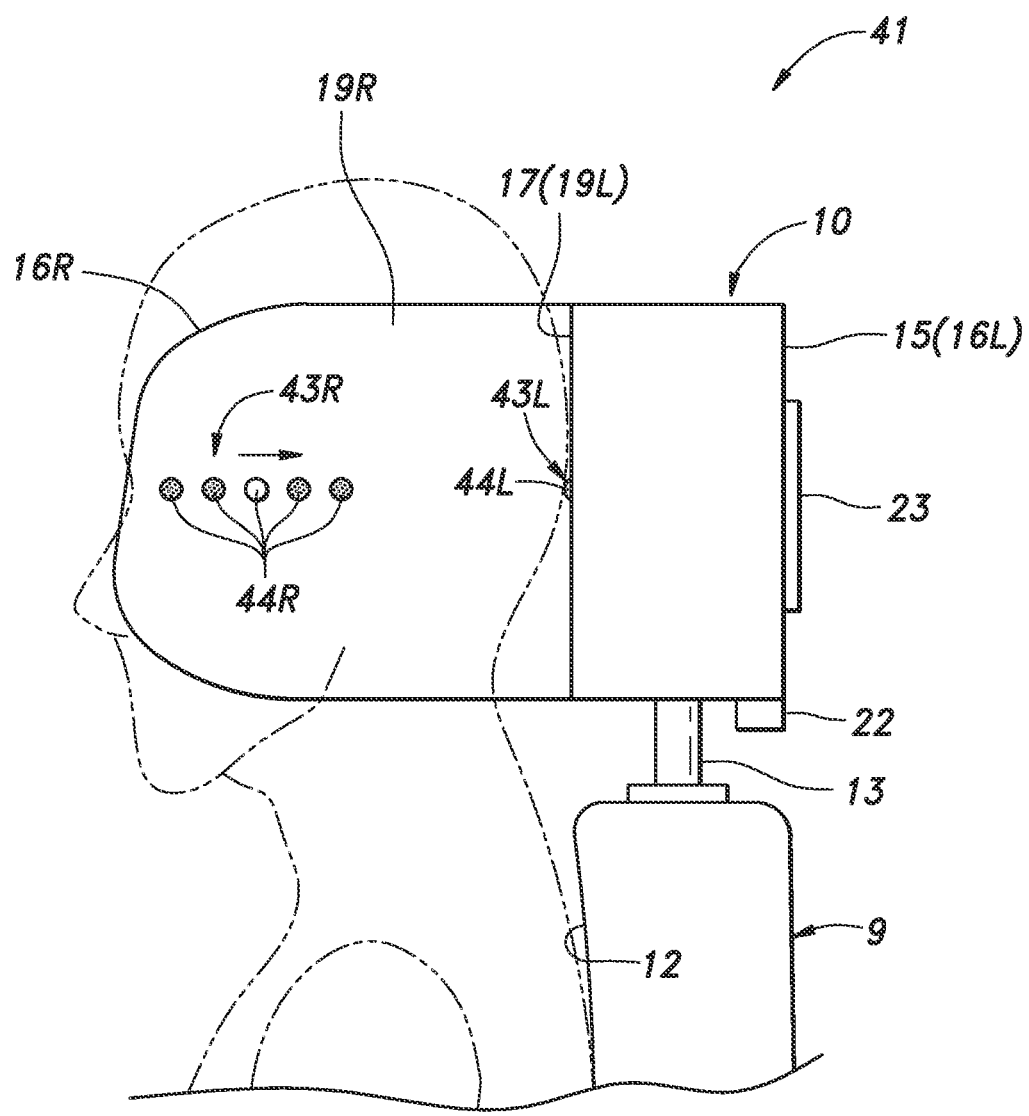
FIG. 7 is a side view of the headrest when a right side part of the vehicle seat according to the second embodiment is in the support position.

As shown in FIG. 6 and FIG. 7, a vehicle seat 41 according to the second embodiment differs from the first embodiment only in that a left light emitting device 43L is provided in place of the left display 21L, a right light emitting device 43R is provided in place of the right display 21R, and steps ST6, ST7, ST9, and ST10 of the motion sickness prevention process are modified. The other configuration is the same as in the first embodiment, and the description thereof will be omitted.

The right light emitting device 43R includes multiple LED elements 44L (light emitting elements) arranged substantially horizontally along the right contact surface 19R. The left light emitting device 43L includes multiple LED elements 44R (light emitting elements) arranged in the vehicle width direction along the left contact surface 19L. The right light emitting device 43R and the left light emitting device 43L are each connected to the control device 23. The control device 23 can control the light emission from the LED elements 44L, 44R included in the right light emitting device 43R and the left light emitting device 43L and the time of the light emission.

In step ST6, the control device 23 moves the right side part 16R to the support position and the left side part 16L to the use position. Thereafter, the control device 23 causes the frontmost LED element in the right light emitting device 43R to emit light.

In step ST7, the control device 23 obtains the magnitudes of the vectors representing the movement of the feature points from the images acquired by the right camera, and calculates the speed of the vehicle S by calculating the average of the magnitudes of the all vectors. Subsequently, the control device 23 selects the LED element to emit light from the position of the LED element that is being lit in the right light emitting device 43R when executing ST7 and based on the calculated speed of the vehicle S. The control device 23 may be configured to select, as the LED element to emit light, an LED element that is positioned more rearward from the position of the LED element that is being lit as the speed of the vehicle S increases, or may select the LED element to emit light in accordance with the teaching of WO2017/176920A1. The control device 23 turns off the LED element that has been lit before executing step ST7, and causes the selected LED element to emit light. Thereby, the light emitting position of the right light emitting device 43R moves to flow backward in accordance with the speed of the vehicle S (see FIG. 7).

In step ST9, the control device 23 moves the left side part 16L to the support position and the right side part 16R to the use position. Thereafter, the control device 23 causes the frontmost LED element in the left light emitting device 43L to emit light.

In step ST10, the control device 23 obtains the magnitudes of the vectors representing the movement of the feature points from the images acquired by the left camera 6L, and calculates the speed of the vehicle S by calculating the average of the magnitudes of the all vectors. Subsequently, the control device 23 selects the LED element to emit light from the position of the LED element that is being lit when executing step ST10 and based on the calculated speed of the vehicle S. Further, the control device 23 turns off the LED element that has been lit before executing step ST10, and causes the selected LED element to emit light. Thereby, the light emitting position of the left light emitting device 43L moves to flow backward in accordance with the speed of the vehicle S.

The effect of the vehicle seat 41 thus configured will be discussed. When a rightward (leftward) acceleration is applied to the occupant, the right side part 16R (the left side part 16L) is disposed on the right side (left side) of the head. Further, the light emitting position of the right light emitting device 43R (the left light emitting device 43L) provided on the right side part 16R (the left side part 16L) is caused to move to flow backward of the vehicle S. Thereby, the occupant can acquire information related to the speed and acceleration of the vehicle S through vision, and thus, motion sickness of the occupant can be reduced.

Third Embodiment

Figure 8:
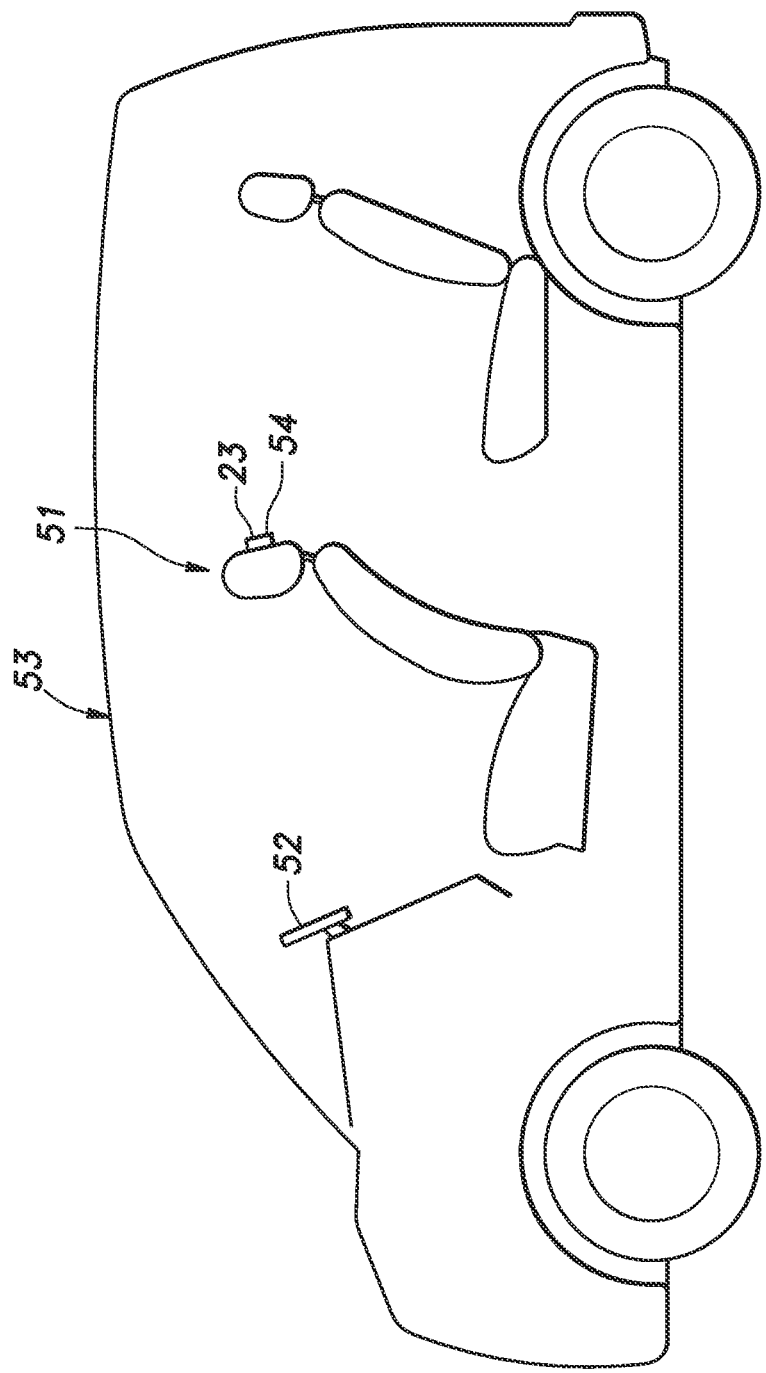
FIG. 8 is a side view of a vehicle in which a vehicle seat according to the third embodiment is installed.

As shown in FIG. 8, a vehicle seat 51 according to the third embodiment is installed in a vehicle 53 provided with a car navigation system 52. The car navigation system 52 is configured to be capable of acquiring the map information and the position of the vehicle 53 via GPS, the Internet, or the like. The vehicle seat 51 according to the fourth embodiment is not provided with the acceleration sensor 22, and instead is provided in the control device 23 with an acceleration acquisition device 54 which receives the map information and the position of the vehicle 53 from the car navigation system 52 and calculates a lateral direction acceleration applied to the vehicle 53. The other configuration of the vehicle seat 51 according to the fourth embodiment is the same as in the first embodiment, and therefore, the description thereof will be omitted.

The acceleration acquisition device 54 is configured as software stored in the memory of the control device 23 and executed by the CPU. The acceleration acquisition device 54 receives the map information and the position of the vehicle 53 from the car navigation system 52, and based on the received map information and the position of the vehicle 53, calculates a lateral direction acceleration predicted to be applied to the occupant a prescribed time later. The control device 23 displaces the left side part 16L and the right side part 16R based on the acceleration calculated by the acceleration acquisition device 54.

The effect of the vehicle seat 51 thus configured will be discussed. The control device 23 can displace the left side part 16L and the right side part 16R based on the acceleration calculated by the acceleration acquisition device 54, namely, the acceleration predicted to be applied to the occupant. This makes it possible to move the left side part 16L and the right side part 16R in accordance with the instant at which the centrifugal force is applied to the head of the occupant, so that the movement of the head of the occupant due to centrifugal force can be prevented more reliably. Thus, the posture of the head of the occupant becomes more stable, and motion sickness of the occupant can be reduced more reliably.

Fourth Embodiment

Figure 9:
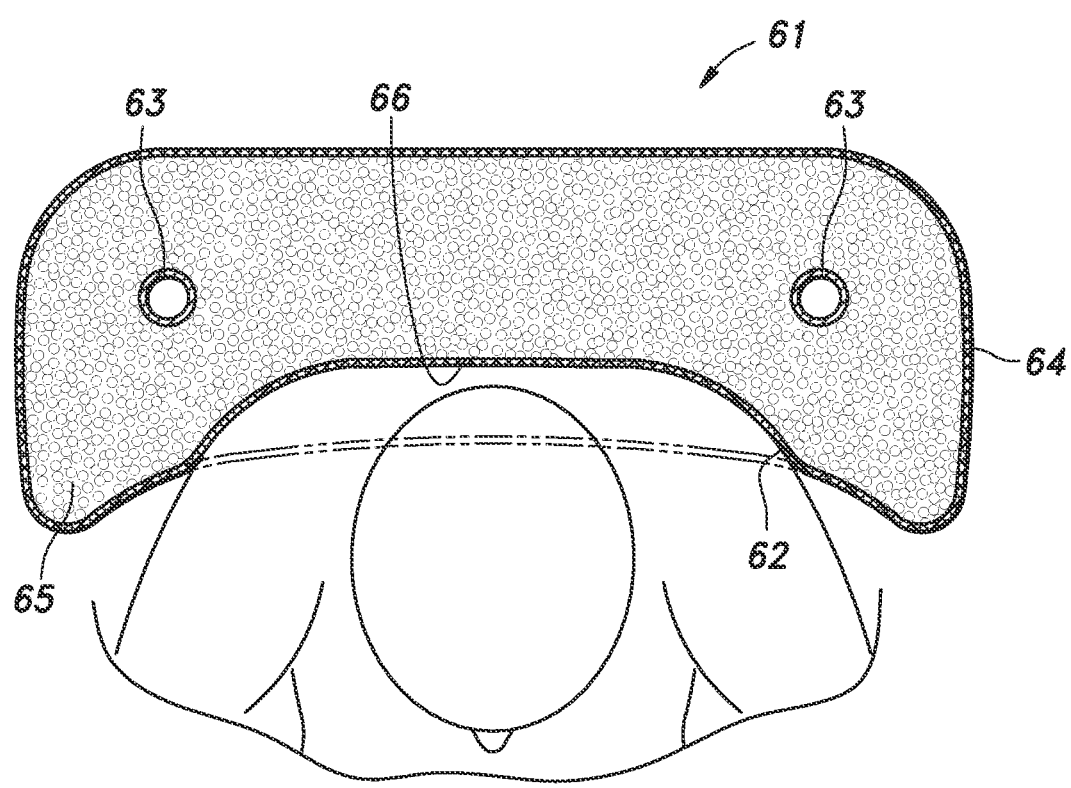
FIG. 9 is a horizontal sectional view of a seat back of a vehicle seat according to the fourth embodiment.

A vehicle seat 61 according to the fourth embodiment differs from the first embodiment only with respect to the configuration of the seat back 62. The other configuration is the same as in the first embodiment, and therefore, the description thereof will be omitted. FIG. 9 shows a horizontal cross section of the seat back 62 of the vehicle seat 61. As shown in FIG. 9, the seat back 62 is constituted of a frame 63 forming a skeleton, a bag-shaped skin member 64 covering the frame 63, and beads 65 contained in the skin member 64. When the occupant is seated, the front surface of the seat back 62 is depressed rearward due to the load from the occupant to form a recess corresponding to the upper body of the occupant 66. The shape of the recess 66 is held for a prescribed time after the occupant leaves the seat.

The effect of the vehicle seat 61 thus configured will be discussed. Once the occupant is seated, the recess 66 corresponding to the shape of the upper body of the occupant is formed in the seat back 62. After the occupant leaves the seat, the shape of the recess 66 is held for a prescribed time. When the occupant is seated next, the upper body of the occupant closely contact the wall surface of the recess 66, whereby the lateral movement of the occupant is restricted more reliably and the posture of the occupant is stabilized. Thus, motion sickness of the occupant can be reduced.

Fifth Embodiment

Figure 10:
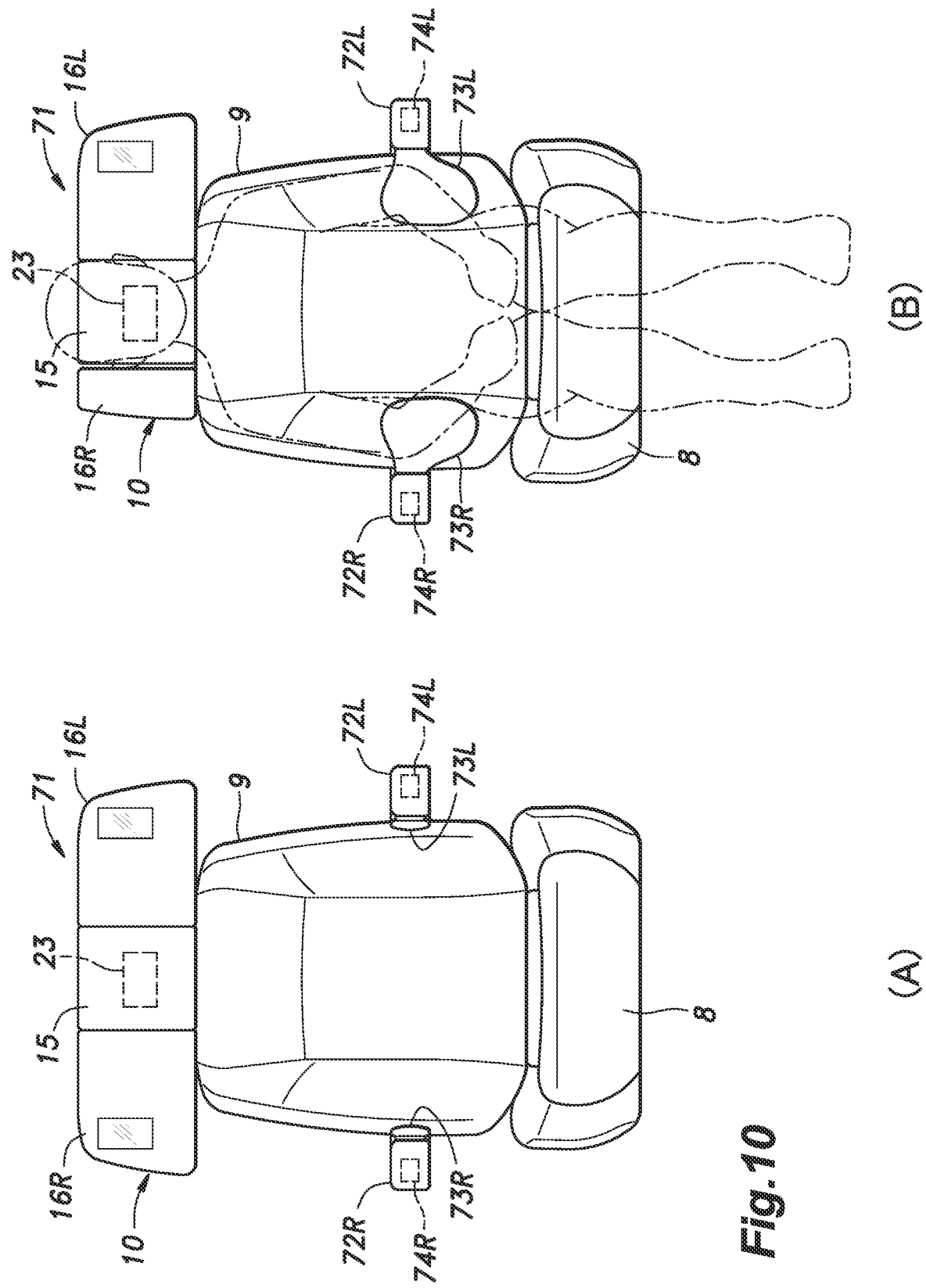
FIG. 10 is (A) a front view of a vehicle seat according to the fifth embodiment and (B) a front view of the vehicle seat when air cells provided on respective armrests are expanded.

As shown in FIG. 10 (A), a vehicle seat 71 according to the fifth embodiment is provided with armrests 72L, 72R extending forward from the left and right side surfaces of the seat back 9, respectively, and the processes in steps ST6, ST8, and ST9 of the motion sickness prevention process executed by the control device 23 differ from the first embodiment. However, the other configuration is the same as in the first embodiment, and therefore, the description thereof will be omitted.

The left and right armrests 72L, 72R are joined to the left and right side surfaces of the seat back 9, respectively, and each have a rectangular columnar shape extending forward. The left and right armrests 72L, 72R include air cells 73L, 73R (swelling part) provided on the mutually opposing surfaces thereof and each consisting of a bag member, and air cell control units 74L, 74R accommodated inside the armrests 72L, 72R and configured to inject compressed air into and discharge the compressed air from the air cells 73L, 73R, respectively. When the compressed air is injected, the air cells 73L, 73R swell in mutually opposing directions and sandwich the upper body of the occupant therebetween. The air cells 73L, 73R contract when the compressed air is discharged. The control device 23 is connected to each of the air cell control units 74L, 74R and is capable of controlling the expansion and contraction of the air cells 73L, 73R.

In step ST6, the control device 23 moves the right side part 16R to the support position and the left side part 16L to the use position controls, and in addition, controls the air cell control units 74L, 74R to inject the compressed air into the air cells 73L, 73R thereby to expand the air cells 73L, 73R. As a result, as shown in FIG. 10 (B), the upper body of the occupant is sandwiched by the air cells 73L, 73R and is maintained in that state. In step ST8, the control device 23 moves each of the right side part 16R and the left side part 16L to the use position, and in addition, makes the air cell control units 74L, 74R discharge the compressed air inside the air cells 73L, 73R to contract the air cells 73L, 73R. In step ST9, the control device 23 moves the right side part 16R to the use position and the left side part 16L to the support position, and in addition, controls the air cell control units 74L, 74R to inject the compressed air into the air cells 73L, 73R thereby to expand the air cells 73L, 73R. In this way, the upper body of the occupant is sandwiched by the air cells 73L, 73R and is maintained in that state.

The effect of the vehicle seat 71 thus configured will be discussed. When an acceleration is applied to the occupant in the lateral direction, the air cells 73L, 73R expand so that the upper body of the occupant is sandwiched between the air cells 73L, 73R and is maintained in that state. Thereby, the posture of the occupant is stabilized, and thus, motion sickness of the occupant can be reduced.

Sixth Embodiment

Figure 11:
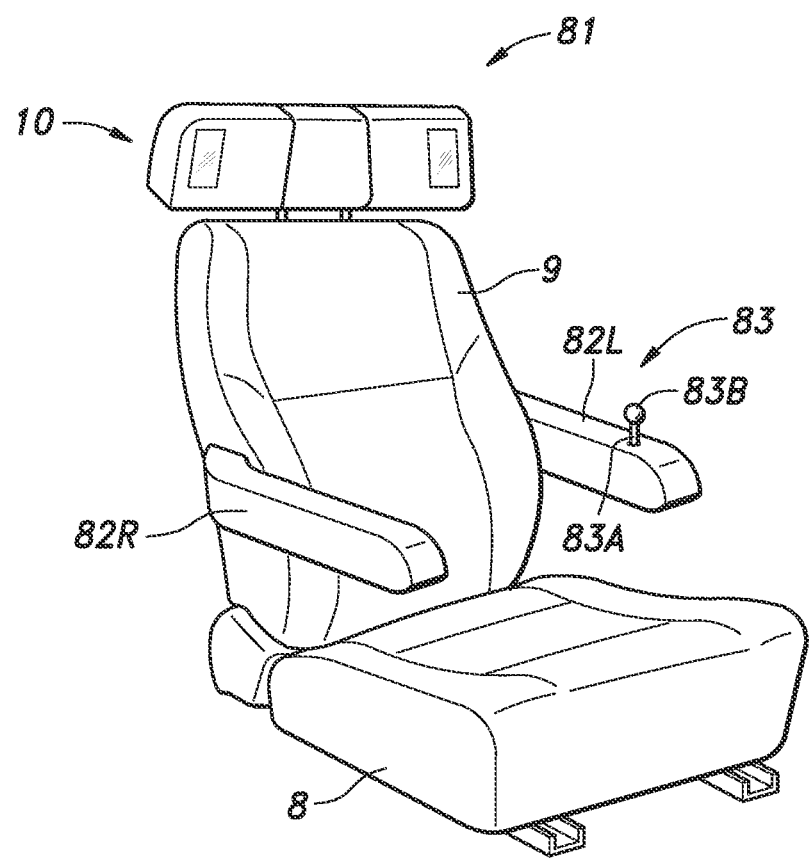
FIG. 11 is a perspective view of a vehicle seat according to the sixth embodiment.

As shown in FIG. 11, a vehicle seat 81 according to the sixth embodiment differs from the first embodiment only in that the left side surface and the right side surface of the seat back 9 are respectively provided with armrests 82L, 82R each extending forward, and at least one of the armrests 82L, 82R is provided with a grip 83. The other configuration is the same as in the first embodiment, and therefore, the description thereof will be omitted. The armrests 82L, 82R are coupled to the left side surface and the right side surface of the seat back 9, respectively. In the present embodiment, the grip 83 is provided on the front end of the armrest 82L joined to the left side surface of the seat back 9, specifically at a position corresponding to the left palm of the occupant. The grip 83 includes a base portion 83A protruding upward from the front end upper surface of the armrest 82L and a spherical main body 83B provided at the tip of the base portion 83A. When applied with centrifugal force in the lateral direction, the seated occupant can grasp the main body 83B of the grip 83, thereby to stabilize the posture against the centrifugal force. Thus, motion sickness of the occupant can be reduced.

Seventh Embodiment

Figure 12:
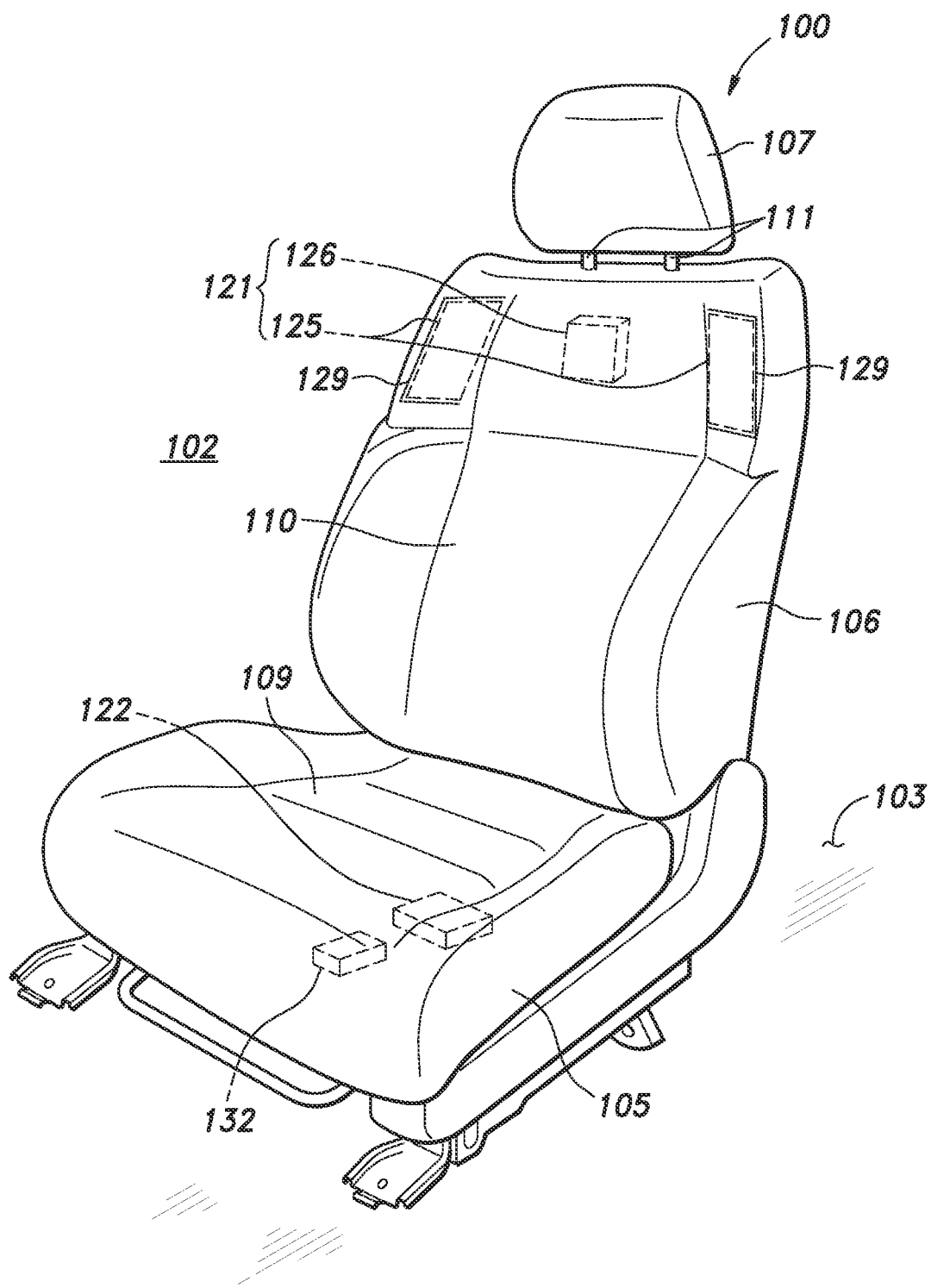
FIG. 12 is a perspective view of a vehicle seat according to the seventh embodiment.
Figure 22:
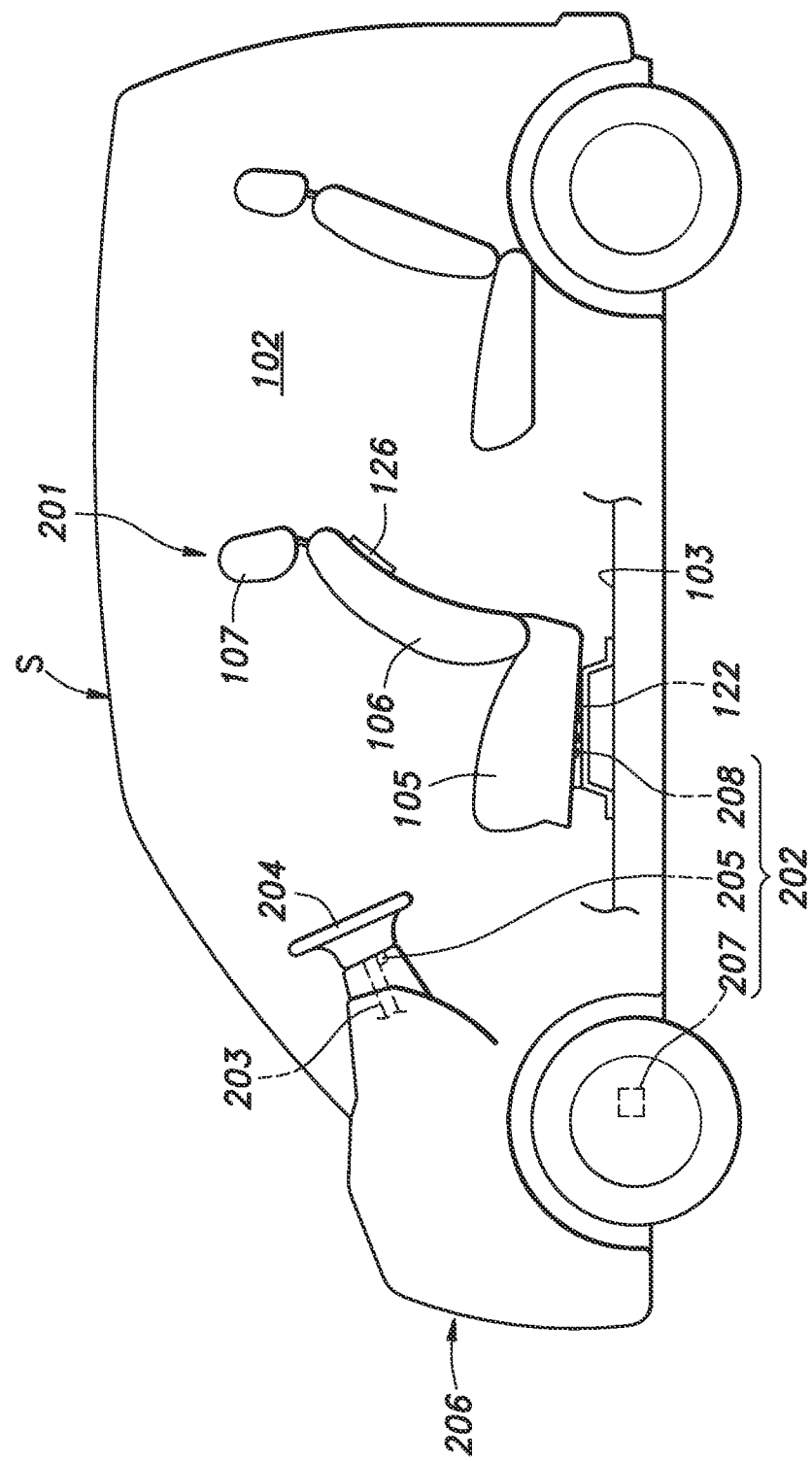
FIG. 22 is a schematic diagram of a vehicle provided with a vehicle seat according to the tenth embodiment.

A vehicle seat 101 is positioned to the side of the driver's seat to constitute a front passenger seat in a vehicle S such as an automobile (see FIG. 22). As shown in FIG. 12, the vehicle seat 101 is placed on a floor 103 defining a bottom portion of a cabin 102 so as to face forward of the vehicle S (more specifically, such that the seated occupant faces forward of the vehicle S). The vehicle seat 101 is supported on the floor 103 to be slidably movable in the fore and aft direction. In the following, description will be made with the fore and aft, lateral, and vertical directions being defined with reference to the directions as viewed from the occupant seated in the vehicle seat 101.

The vehicle seat 101 includes a seat cushion 105 that supports the buttocks of a seated person, a seat back 106 provided at a rear portion of the seat cushion 105 to function as a backrest, and a headrest 107 provided in an upper part of the seat back 106.

The seat cushion 105 has a substantially rectangular parallelepiped shape having a surface that faces substantially vertically. The upper surface of the seat cushion 105 forms a seating surface 109 for a single occupant. The seating surface 109 is recessed downward substantially at a laterally central part thereof, and is slightly inclined downward toward the rear end thereof. Thus, the seating surface 109 has a shape corresponding to the buttocks and thighs of the occupant. When an occupant is seated, the buttocks and thighs of the occupant are positioned on the seating surface 109.

The seat back 106 extends vertically and has a substantially rectangular parallelepiped shape having a surface that faces substantially in the fore and aft direction. The front surface of the seat back 106 forms a support surface 110 for supporting the occupant's back. The support surface 110 is recessed rearward substantially at a laterally central part thereof, and is slightly inclined rearward toward the upper end thereof. Thus, the support surface 110 has a shape corresponding to the back of the occupant, and the back of the seated occupant is supported by the support surface 110.

The lower end of the seat back 106 is pivotally supported by the rear end of the seat cushion 105 via a per se known reclining mechanism. In other words, the seat back 106 is connected to the rear end of the seat cushion 105 at the lower end so as to be pivotable forward and backward.

The headrest 107 is connected to the upper end of the seat back 106 via two pillars 111. The headrest 107 is disposed behind the head of the seated occupant.

Figure 13:
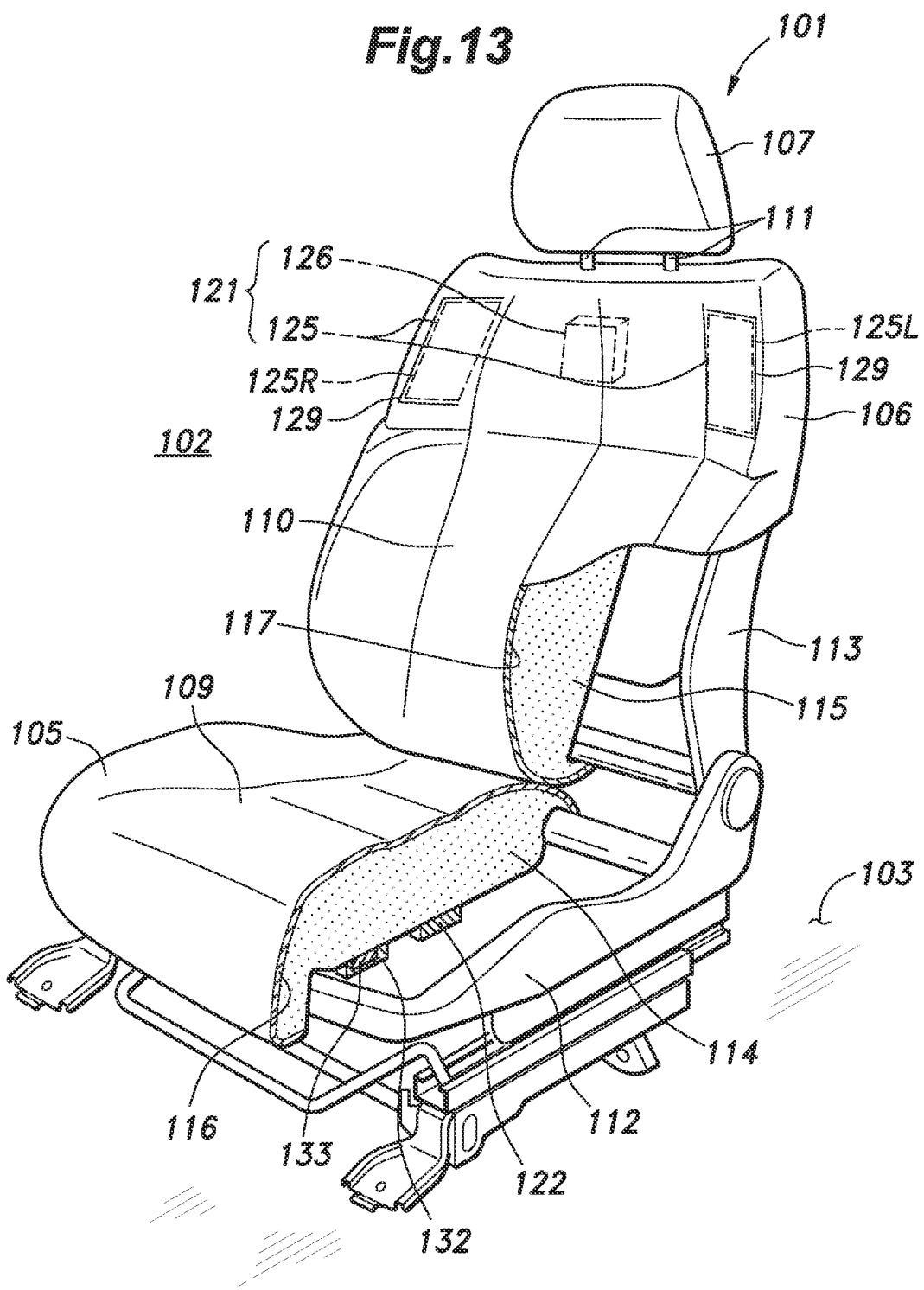
FIG. 13 is a perspective sectional view of the vehicle seat according to the seventh embodiment.

As shown in FIG. 13, the seat cushion 105 and the seat back 106 include frames 112, 113 forming skeletons, pad members 114, 115 supported by the frames 112, 113, and skin members 116, 117 covering at least a part of the surfaces of the pad members 114, 115, respectively. The frames 112, 113 of the seat cushion 105 and the seat back 106 are each made of metal and formed in a substantially rectangular frame shape. The pad member 114 of the seat cushion 105 is disposed on the upper side of the corresponding frame 112, and the upper surface thereof is covered by the skin member 116. The pad member 115 of the seat back 106 is disposed on the front surface of the corresponding frame 113, and the front surface thereof is covered by the skin member 117. In this way, the provision of the frames 112, 113 in the seat cushion 105 and the seat back 106, respectively, can make the vehicle seat 101 have sufficient rigidity to support the occupant. Also, the provision of the pad members 114, 115 and the skin members 116, 117 enables the seating surface 109 and the support surface 110 to have favorable elasticity and texture, so that it becomes easy for the occupant to be seated and the comfort of the vehicle seat 101 improves.

The seat back 106 is provided with a drive unit 121 for deforming the shape of the seat back 106 and a control unit 122 for controlling the driving of the drive unit 121. The drive unit 121 includes a pair of left and right air cells 125 and an air supply and discharge device 126 for supplying air to and discharging air from each of the left and right air cells 125.

Each of the air cells 125 is a bag-shaped member with no air permeability and is preferably made of a stretchable material such as rubber. The air cells 125 are positioned on the left and right outer sides of the shoulders of the seated occupant in front view (see the broken line in FIG. 12), and as shown in FIG. 14 (A), are disposed between the pad member 115 and the skin member 117. Inside the seat back 106, a pair of left and right air supply and discharge pipes 127 are provided so as to be connected to the respective air cells 125 on one end and penetrating the pad member 115 to independently open in the rear surface lower portion of the seat back 106. In the following, the air cell 125 provided on the left side will be referred to as the left air cell 125L and the air cell 125 provided on the right side will be referred to as the right air cell 125R, as necessary.

As shown in FIG. 14 (B), each of the air cells 125 expands forward and deforms the front surface of the seat back 106 so as to protrude forward when air is supplied to the interior thereof. Each air cell 125 can expand until the front surface of the seat back 106 protrudes on the left and right sides of the shoulders of the occupant to form wall bodies 128 for preventing the lateral movement of the occupant.

In the present embodiment, when air is discharged, each air cell 125 is compressed in the fore and aft direction and has a substantially rectangular shape in front view. When air is supplied, each air cell 125 deploys in a fan shape in top view with an edge portion on the seat inner side being the pivot, as shown by an arrow in FIG. 14 (B). In the present embodiment, as shown in FIG. 12, the skin member 117 of the seat back 106 is provided with a pair of left and right slits 129 extending along the left and right outer edges and upper and lower edges of the air cells 125 so that the expansion of the air cells 125 is not obstructed. As shown in FIGS. 14 (A) and (B), the front surface of each air cell 125 and the back surface of the skin member 117 is adhered to each other, and the rear surface of each air cell 125 is adhered to the front surface of the pad member 115.

As shown in FIG. 12, the air supply and discharge device 126 is fixed to the rear surface upper portion of the seat back 106. As shown in FIG. 14, the air supply and discharge device 126 is an air pump provided with two air supply and discharge ports 130 and capable of supplying air through each air supply and discharge port 130 individually and discharging air through each air supply and discharge port 130 individually. The air supply and discharge ports 130 are connected to different air supply and discharge pipes 127, whereby the air supply and discharge device 126 can supply air to the left and right air cells 125 individually and can discharge air from the left and right air cells 125 individually via the air supply and discharge pipes 127. When the air supply and discharge device 126 supplies air to the air cells 125, the air supply and discharge device 126 increases the internal pressure of the air cells 125 such that the internal pressure of the air cells 125 becomes a prescribed pressure. When the internal pressure of the air cells 125 is the prescribed pressure, the wall body 128 is formed on the seat outer side of each shoulder of the occupant, as shown in FIG. 14 (B). Thereafter, the air supply and discharge device 126 maintains the internal pressure of the air cells 125 until receiving an instruction to discharge air.

As shown in FIG. 12, on the lower surface of the seat cushion 105, a lateral acceleration acquisition unit 132 is provided, which is configured to acquire a lateral direction acceleration (hereinafter, lateral acceleration) of the seat cushion 105, namely, the lateral acceleration applied to the occupant seated in the vehicle seat 101, including the magnitude and direction thereof. The lateral acceleration acquisition unit 132 is configured to output the lateral acceleration as a positive value when it is rightward and as a negative value when it is leftward, for example. The lateral acceleration acquisition unit 132 includes a semiconductor type acceleration sensor 133 using MEMS technology. In the present embodiment, the acceleration sensor 133 is a so-called capacitive sensor, which detects the acceleration by reading a displacement of a movable part supported by a beam as a change in the capacitance. Note that the acceleration sensor 133 is not limited to this embodiment, and may be a piezoelectric element sensor that detects an acceleration by using a change in the piezoresistance, for example.

Thus, since the lateral acceleration acquisition unit 132 is provided on the seat cushion 105, the lateral acceleration acquisition unit 132 is positioned in the vicinity of the seated occupant and can acquire the magnitude and direction of the inertial force acting on the occupant accurately and conveniently.

The control unit 122 is a computer including a central processing unit (CPU), a storage device (memory), and the like, and is secured on the lower surface of the seat cushion 105. The control unit 122 is connected to the lateral acceleration acquisition unit 132 and the air supply and discharge device 126 via signal lines. The control unit 122 receives information on the direction and magnitude of the lateral acceleration from the lateral acceleration acquisition unit 132, specifies one or both of the left and right air cells 125, and makes the air supply and discharge device 126 supply air to or discharge air from the specified air cell(s) 125.

It is to be noted that if, while supplying air to the specified air cell 125, the air supply and discharge device 126 is instructed by the control unit 122 to supply air to this air cell 12, the air supply and discharge device 126 continues supplying air to this air cell 125 to maintain the internal pressure of the air cell 125 at the prescribed pressure. Also, if, while discharging air from the specified air cell 125, the air supply and discharge device 126 is instructed by the control unit 122 to discharge air from this air cell 125, the air supply and discharge device 126 continues discharging air from this air cell 125.

Figure 15:
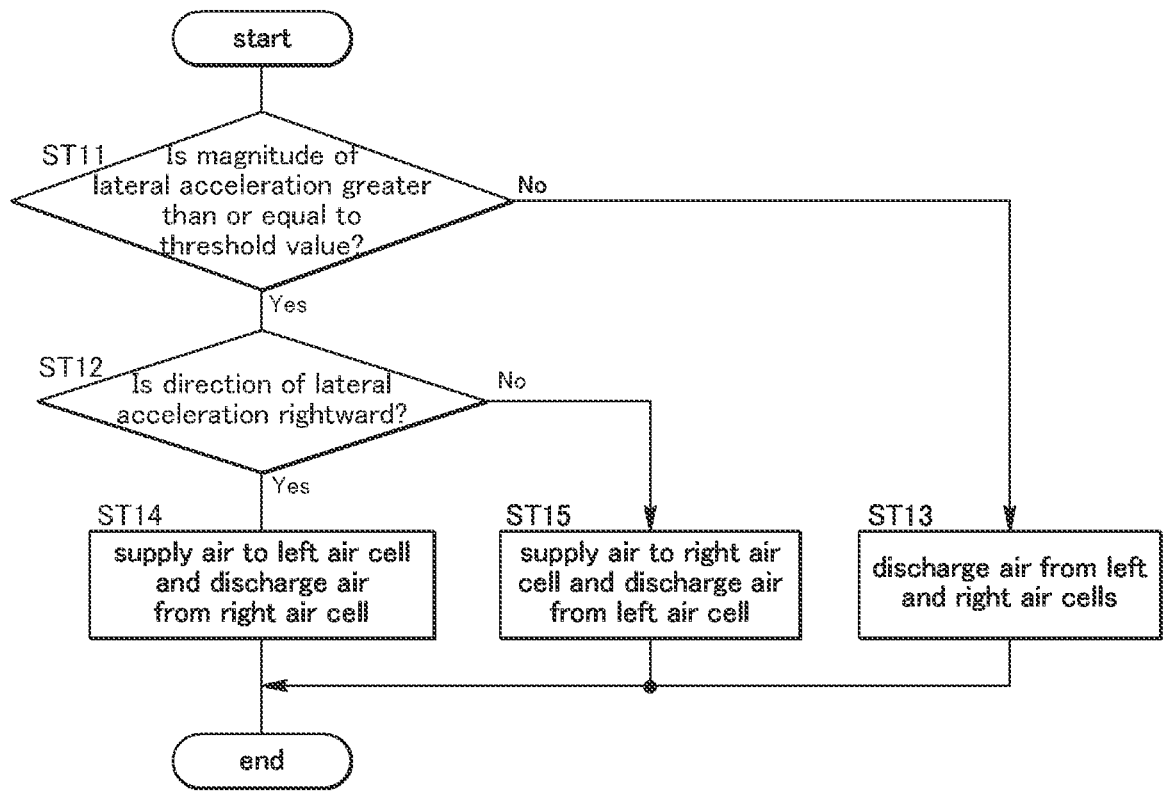
FIG. 15 is a flowchart of a first air cell control process.

When the vehicle S is driving, the control unit 122 executes a first air cell control process to control the operation of the air supply and discharge device 126 based on the lateral acceleration acquired by the lateral acceleration acquisition unit 132. In the following, the first air cell control process will be described in detail with reference to FIG. 15.

In the first step ST11 of the first air cell control process, the control unit 122 receives a signal from the lateral acceleration acquisition unit 132 and determines whether the magnitude (absolute value) of the lateral acceleration applied to the vehicle seat 101 is greater than or equal to a prescribed threshold value (hereinafter, the lateral acceleration threshold value). When the magnitude of the lateral acceleration is greater than or equal to the lateral acceleration threshold value, the control unit 122 executes step ST12, and when the magnitude of the lateral acceleration is less than the lateral acceleration threshold value, the control unit 122 executes step ST13. The lateral acceleration threshold value is set as a threshold value of the lateral acceleration at or above which motion sickness of the occupant is more likely to occur in general.

In step ST12, the control unit 122 determines the direction of the acquired lateral acceleration. The control unit 122 executes step ST14 when the direction of the lateral acceleration is rightward and executes step ST15 when the direction of the lateral acceleration is leftward. In the case where the lateral acceleration acquisition unit 132 is configured to output the lateral acceleration as a positive value when it is rightward and as a negative value when it is leftward, for example, the control unit 122 may determine the direction of the lateral acceleration based on whether the lateral acceleration is positive or negative.

In step ST14, the control unit 122 makes the air supply and discharge device 126 supply air to the left air cell 125L and discharge air from the right air cell 125R. Thereafter, the control unit 122 completes step ST14 and ends the first air cell control process.

In step ST15, the control unit 122 makes the air supply and discharge device 126 supply air to the right air cell 125R and discharge air from the left air cell 125L. Thereafter, the control unit 122 completes step ST15 and ends the first air cell control process.

In step ST13, the control unit 122 makes the air supply and discharge device 126 discharge air from the right air cell 125R and the left air cell 125L. Thereafter, the control unit 122 completes step ST13 and ends the first air cell control process.

Next, the operation and effect of the vehicle seat 101 thus configured will be described. A lateral direction acceleration may be applied to the vehicle seat 101 due to turning of the vehicle S or the like.

When an acceleration greater than or equal to the lateral acceleration threshold value is applied to the vehicle seat 101 in the rightward direction, the control unit 122 executes step ST11, step ST12, and step ST14 sequentially. In step ST14, the control unit 122 makes the air supply and discharge device 126 supply air to the left air cell 125L and discharge air from the right air cell 125R. Thereby, the front surface of the seat back 106 protrudes forward on the left side of the left shoulder of the occupant so that the wall body 128 is provided on the left outer side of the left shoulder of the occupant (see FIG. 14 (B)).

At this time, inertial force is applied to the upper body of the occupant in the direction opposite to the acceleration, namely, in the leftward direction. Thereby, the upper body of the occupant moves leftward and comes into contact with the wall body 128. A load opposing the inertial force is applied to the occupant from the wall body, and the upper body of the occupant is supported by the wall body 128.

Also, when an acceleration greater than or equal to the lateral acceleration threshold value is applied to the vehicle seat 101 in the leftward direction due to turning of the vehicle S or the like, the control unit 122 executes step ST11, step ST12, and step ST15 to make the air supply and discharge device 126 supply air to the right air cell 125R and discharge air from the left air cell 125L. Thereby, the front surface of the seat back 106 protrudes forward on the right side of the right shoulder of the occupant so that the wall body 128 is provided on the right outer side of the right shoulder of the occupant.

The upper body of the occupant receives rightward inertial force. Therefore, the upper body of the occupant moves rightward and comes into contact with the wall body 128. A load opposing the inertial force is applied to the occupant from the wall body 128, and the upper body of the occupant is supported by the wall body 128.

In this way, when a lateral acceleration greater than or equal to the lateral acceleration threshold value is applied, the wall body 128 is formed in the seat back 106 on the outer side of the shoulder of the occupant on the side to which the occupant moves due to the inertial force. Thereby, a load opposing the inertial force is applied to the occupant from the wall body 128 so that the occupant is supported. Thus, the side to which the occupant moves due to the inertial force is selected based on the lateral acceleration, and the wall body 128 is formed so as to restrain the upper body of the occupant from the selected side (namely, selectively). The formed wall body 128 supports the upper body of the occupant so that the rolling of the upper body of the occupant is prevented and the posture of the occupant is stabilized. Thus, motion sickness can be prevented.

Also, when the lateral acceleration is less than the lateral acceleration threshold value, air is discharged from the air cells 125, and when the lateral acceleration is greater than or equal to the lateral acceleration threshold value, one of the left and right air cells 125 is caused to expand so that the wall body 128 is formed on one of the left and right outer sides of the shoulders of the occupant. In this way, the wall body 128 is formed when it is necessary to support the upper body of the occupant, and therefore, compared to the case where the wall body 128 is always formed on each of the left and right outer sides of the occupant, the oppressive feeling imparted to the occupant can be reduced.

To deform the seat back 106, it is only necessary to provide the seat back 106 with the air cells 125 and the air supply and discharge pipe 127 for supplying air to and discharging air from the air cells 125, and therefore, compared to the configuration that uses multiple links to deform the seat back 106, for example, the configuration of the drive unit 121 is simple.

Eighth Embodiment

A vehicle seat 151 according to the eighth embodiment differs from the seventh embodiment with respect to the configuration of the seat back 152, the configuration of the drive unit 153, and the process performed by the control unit 122. The other configuration is the same as in the seventh embodiment, and therefore, the description of the other configuration will be omitted.

Figure 16:
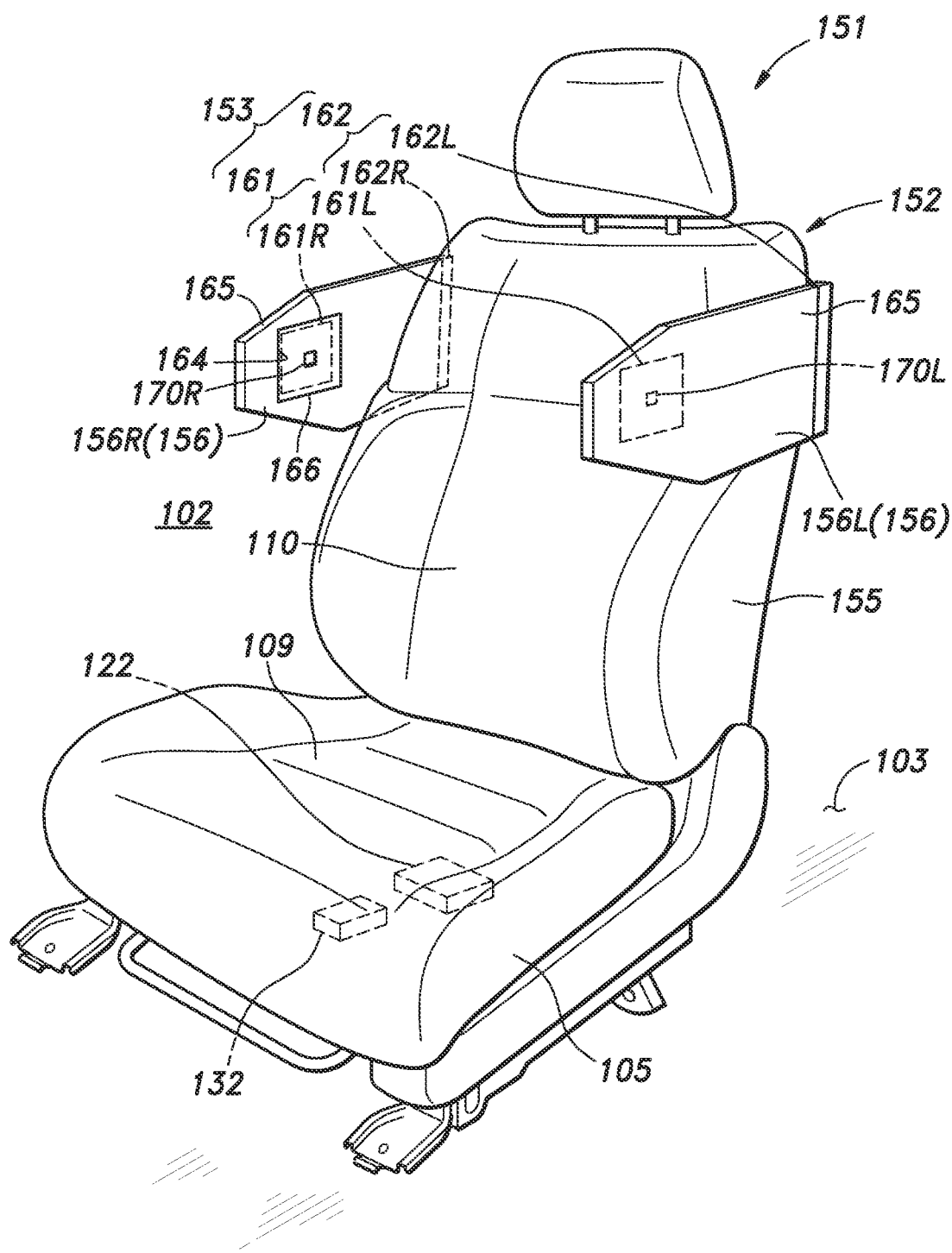
FIG. 16 is a perspective view of a vehicle seat according to the eighth embodiment.

As shown in FIG. 16, the seat back 152 includes a seat back body 155 that extends vertically and has a substantially rectangular parallelepiped shape having a surface that faces substantially in the fore and aft direction, and a pair of left and right restriction members 156 respectively joined to the left and right side surfaces of the seat back body 155.

The seat back body 155 has the same shape as the seat back 106 of the seventh embodiment and includes a metallic frame 113 having a substantially rectangular frame shape and forming a skeleton, a pad member 115 supported by the frame 113, and a skin member 117 covering at least a part of the surface of the pad member 115 (see FIG. 13). The front surface of the seat back body 155 forms a support surface 110 for supporting the occupant's back.

Each of the restriction members 156 is in a plate shape having a main surface facing in the vehicle width direction and extending in the fore and aft direction. The restriction members 156 are fixed to the left and right side surfaces of the seat back body 155 at their rear ends, respectively. Each restriction member 156 extends more forward than the front surface of the seat back body 155.

The drive unit 153 includes a pair of air cells 161 respectively provided in the left and right restriction members 156, and a pair of left and right air supply and discharge devices 162 for supplying air to and discharging air from the corresponding air cells 161. As in the seventh embodiment, each of the air cells 161 is a bag-shaped member with no air permeability and is accommodated in the corresponding restriction member 156 at a position forward of the front surface of the seat back body 155. In the following, the restriction member 156 on the left side will be referred to as the left restriction member 156L and the restriction member 156 on the right side will be referred to as the right restriction member 156R, as necessary. Also, the air cell 161 provided in the left restriction member 156L will be referred to as the left air cell 161L and the air cell 161 provided in the right restriction member 156R will be referred to as the right air cell 161R. Further, the air supply and discharge device 162 provided on the left restriction member 156L will be referred to as the left air supply and discharge device 162L and the air supply and discharge device 162 provided on the right restriction member 156 will be referred to as the right air supply and discharge device 162R.

In the present embodiment, as shown in FIG. 17 (A), each restriction member 156 includes a restriction member main body 165 extending in the fore and aft direction and provided in a front portion thereof with an accommodation recess 164 for accommodating the air cell 161 therein, and a cap member 166 that covers the air cell 161 from the seat inner side. Each restriction member main body 165 is a member made of resin and is in a plate shape having a main surface facing in the vehicle width direction. The restriction member main bodies 165 are respectively fixed to the left and right side surfaces of the seat back body 155 to the rear ends thereof. Each accommodation recess 164 is a recess formed in the seat-inner-side side surface of the corresponding restriction member main body 165 so as to be depressed toward the seat outer side and is positioned forward of the front surface of the seat back body 155.

Each restriction member main body 165 is provided with a through hole 167 extending from the accommodation recess 164 to the rear end, and an air supply and discharge pipe 168 is accommodated in the through hole 167. The air supply and discharge pipe 168 is connected to the air cell 161 at one end thereof and extends through the through hole 167 to open in the rear end of the restriction member main body 165. The air supply and discharge device 162 is joined to the rear end of the restriction member 156, and the air supply and discharge pipe 168 is connected to the air supply and discharge device 162 at the other end thereof. As shown in FIG. 17 (B), when air is supplied thereto by the air supply and discharge device 162, each air cell 161 expands toward the seat inner side and thereby deforms the seat-inner-side side surface of the corresponding restriction member 156 to protrude toward the seat inner side.

Each cap member 166 is in a plate shape having a main surface facing in the lateral direction and is fitted in the corresponding accommodation recess 164. The seat-outer-side side surface of the cap member 166 is adhered to the air cell 161, and the air cell 161 is adhered to the bottom surface of the accommodation recess 164.

The seat-inner-side side surface of each cap member 166 is provided with a touch sensor 170. The touch sensor 170 is a sensor configured to detect contact with the occupant from the seat inner side. In the present embodiment, the touch sensor 170 is a capacitive sensor which has an electrode on the seat-inner-side side surface and detects the contact (touch) of the occupant with the electrode by reading a change in the capacitance between the electrode and the ground. Note that the touch sensor 170 is not limited to this embodiment, and may be a resistive film sensor, for example. In the following, the touch sensor 170 provided on the cap member 166 of the left restriction member 156L will be referred to as the left touch sensor 170L and the touch sensor 170 provided on the cap member 166 of the right restriction member 156R will be referred to as the right touch sensor 170R.

The control unit 122 executes a second air cell control process to control the air supply and discharge devices 162 based on the signals from the lateral acceleration acquisition unit 132 and the left and right touch sensors 170. In the following, the second air cell control process will be described in detail with reference to FIG. 18.

Figure 18:
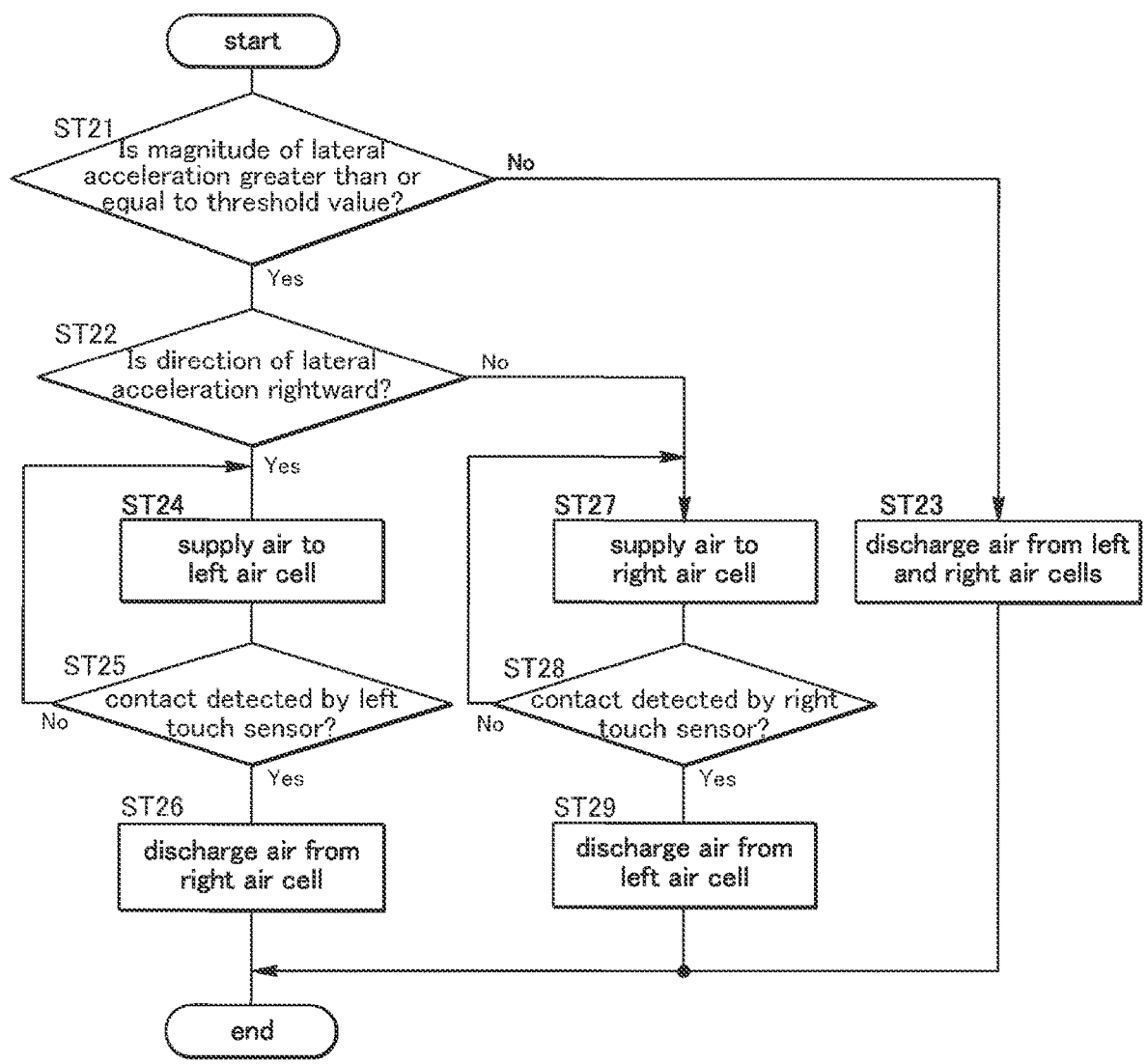
FIG. 18 is a flowchart of a second air cell control process.

As shown in FIG. 18, in the first step ST21 of the second air cell control process, the control unit 122 acquires the lateral acceleration applied to the vehicle seat 151 from the lateral acceleration acquisition unit 132 and determines whether the magnitude thereof is greater than or equal to the lateral acceleration threshold value. When the magnitude of the lateral acceleration is greater than or equal to the lateral acceleration threshold value, the control unit 122 executes step ST22, and when the magnitude of the lateral acceleration is less than the lateral acceleration threshold value, the control unit 122 executes step ST23.

In step ST22, the control unit 122 determines whether the direction of the lateral acceleration is rightward. When rightward, the control unit 122 executes step ST24, and when leftward, the control unit 122 executes step ST27.

In step ST24, the control unit 122 instructs the left air supply and discharge device 162L to supply air to the left air cell 161L. Thereafter, the control unit 122 executes step ST25.

In step ST25, the control unit 122 determines whether the contact is detected by the left touch sensor 170L. When the contact is detect, the control unit 122 executes step ST26, an when the contact is not detected, the process returns to step ST24.

In step ST26, the control unit 122 instructs the right air supply and discharge device 162R to discharge air from the right air cell 161R. When the air discharge is completed, the control unit 122 ends the second air cell control process.

In step ST27, the control unit 122 instructs the right air supply and discharge device 162R to supply air to the right air cell 161R. Thereafter, the control unit 122 executes step ST28.

In step ST28, the control unit 122 determines whether the contact is detected by the right touch sensor 170R. When the contact is detected, the control unit 122 executes step ST29, and when the contact is not detected, the process returns to step ST27.

In step ST29, the control unit 122 instructs the left air supply and discharge device 162L to discharge air from the left air cell 161L. When the air discharge is completed, the control unit 122 ends the second air cell control process.

In step ST23, the control unit 122 instructs the left air supply and discharge device 162L and the right air supply and discharge device 162R to discharge air from the left air cell 161L and the right air cell 161R. When the air discharge from the left air cell 161L and the right air cell 161R is completed, the control unit 122 ends the second air cell control process.

Next, the operation and effect of the vehicle seat 151 according to the eighth embodiment will be described. Since the restriction members 156 are provided on the left and right sides of the occupant, the lateral movement of the upper body of the occupant can be restricted.

When an acceleration greater than or equal to the lateral acceleration threshold value is applied to the vehicle seat 151 in the rightward direction, leftward inertial force is applied to the upper body of the occupant. At this time, the control unit 122 repeatedly executes steps ST24 and ST25 after executing step ST21 and step ST22, whereby the control unit 122 makes the left air supply and discharge device 162L supply air to the left air cell 161L until the contact is detected by the left touch sensor 170L. Thus, the left air cell 161L expands until the left touch sensor 170L touches the occupant, namely, until the left side surface of the left restriction member 156L touches the occupant. As a result of the expansion of the left restriction member 156L, the upper body of the occupant is supported and a load opposing the inertial force is applied to the occupant (see FIG. 17 (B)).

When an acceleration greater than or equal to the lateral acceleration threshold value is applied to the vehicle seat 151 in the leftward direction, rightward inertial force is applied to the upper body of the occupant. At this time, the control unit 122 repeatedly executes steps ST27 and ST28 after executing step ST21 and step ST22, whereby the control unit 122 makes the right air supply and discharge device 162R supply air to the right air cell 161R until the contact is detected by the right touch sensor 170R. Thus, the right air cell 161R expands until the right touch sensor 170R touches the occupant, namely, until the right side surface of the right restriction member 156R touches the occupant. As a result of the expansion of the right restriction member 156R, the upper body of the occupant is supported and a load opposing the inertial force is applied to the occupant.

As described above, to apply a load opposing the inertial force to the occupant, the restriction member positioned in the moving direction of the occupant 156 is caused to protrude toward the seat inner side to apply a load opposing the inertial force to the occupant. Thereby, the upper body of the occupant is supported and the rolling of the upper body of the occupant is prevented.

In the present embodiment, each restriction member 156 is caused to expand toward the seat inner side until the contact with the occupant is detected by the touch sensor 170. Thereby, even when the seated occupant has a small physique, the occupant can be reliably supported, and therefore, regardless of the physique of the occupant, the rolling of the upper body of the occupant can be prevented.

Ninth Embodiment

A vehicle seat 181 according to the ninth embodiment differs from the seventh embodiment with respect to the configuration of the drive unit 183 and the control process executed by the control unit 122, and the other part is the same as in the seventh embodiment, and therefore, the description of the other part will be omitted.

Figure 19:
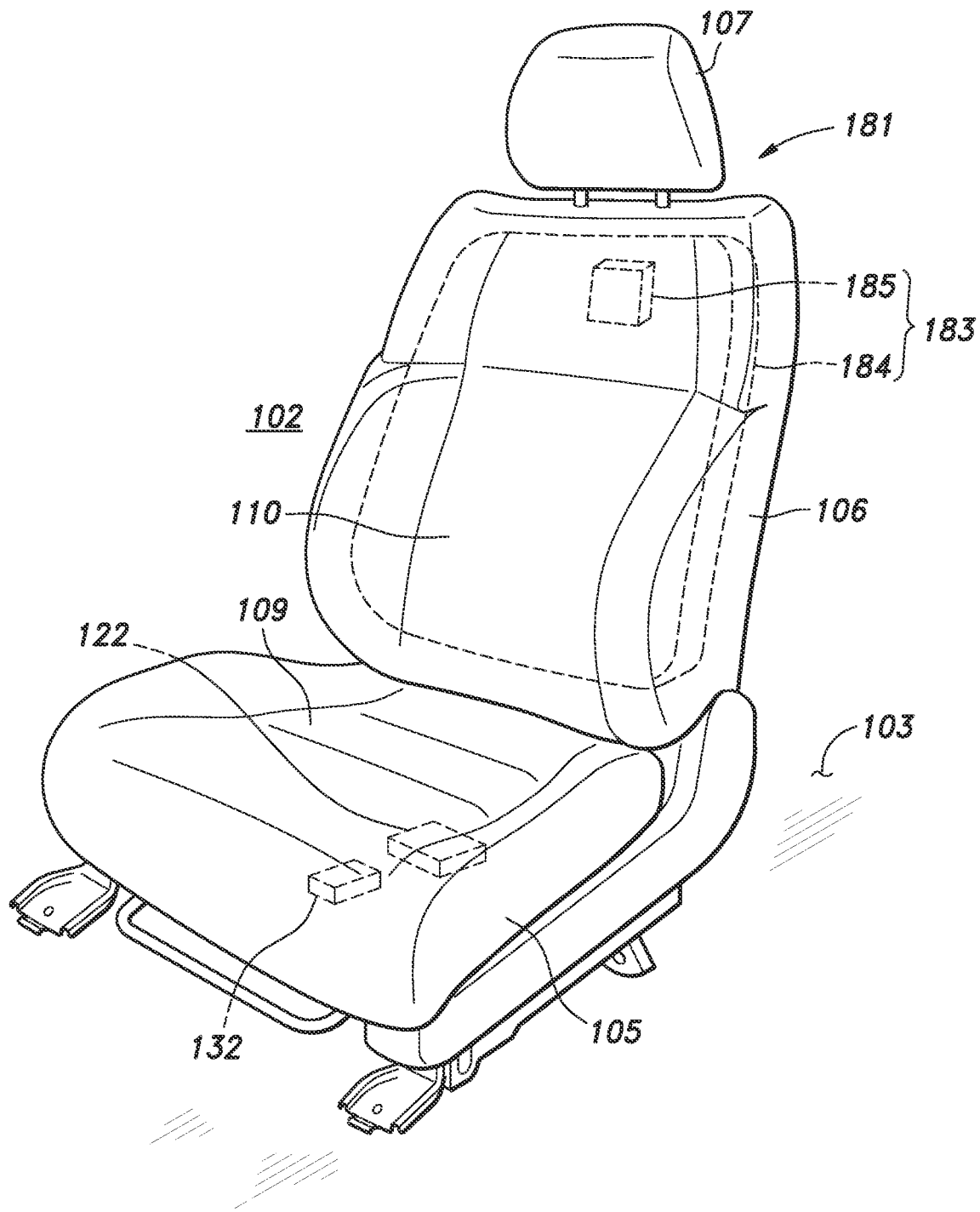
FIG. 19 is a perspective view of a vehicle seat according to the ninth embodiment.

As shown in FIG. 19, the drive unit 183 includes a single bag member 184 and a single air supply and discharge device 185. The bag member 184 is disposed between the back surface of the skin member 117 provided on the front surface of the seat back 106 and the front surface of the pad member 115. The bag member 184 is positioned substantially at a laterally central part and at a substantially vertically central part of the seat back 106 in front view and is disposed behind the back of the seated occupant. The bag member 184 is preferably made of a stretchable resin material with no air permeability, such as rubber.

Figure 20:
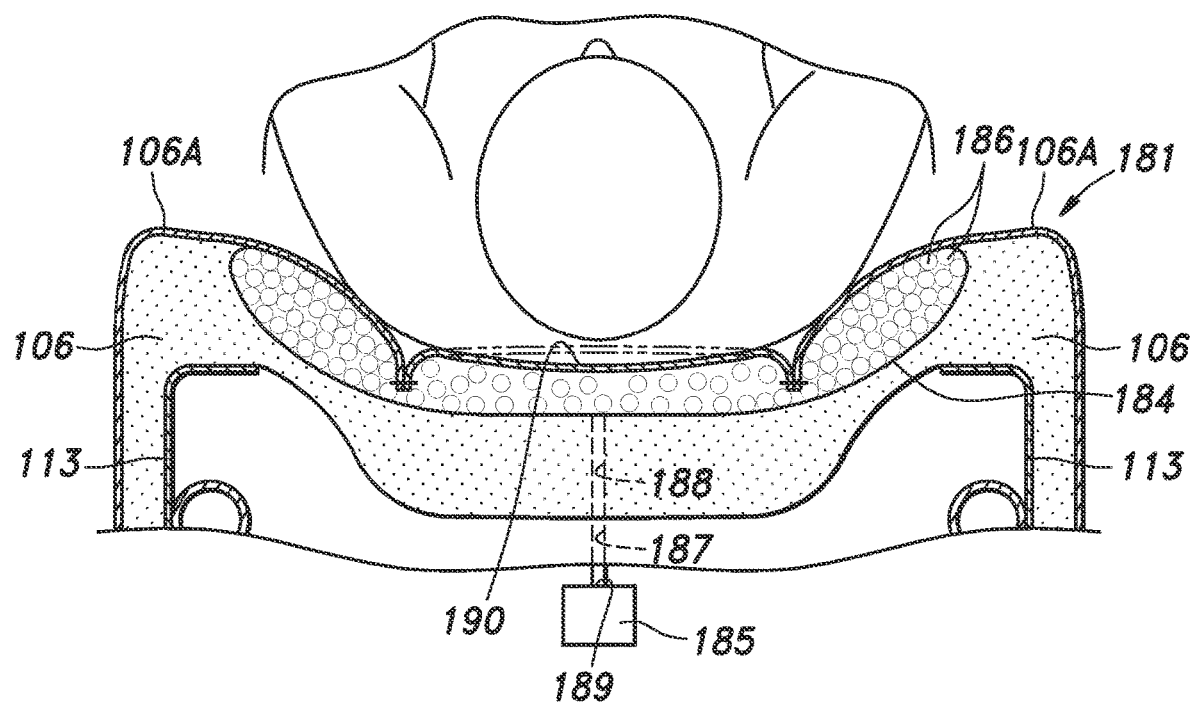
FIG. 20 is a horizontal sectional view of the vehicle seat according to the ninth embodiment when the occupant is seated and air is supplied to a bag member.

As shown in FIG. 20 (A), the interior of the bag member 184 is filled with a number of spherical members 186 made of resin. The bag member 184 is connected with a connecting pipe 187 for supplying air to and discharging air from the interior thereof. The pad member 115 is provided with a through hole 188 extending through the interior thereof in the fore and aft direction, and the connecting pipe 187 extends through the through hole 188 and a hole formed in the rear surface of the seat back 106 to the outside of the seat back 106. The connecting pipe 187 is preferably provided with a prescribed filter to prevent the spherical members 186 from being discharged to the outside of the bag member 184.

As shown in FIG. 19, the air supply and discharge device 185 is fixed to the rear surface upper portion of the seat back 106. The air supply and discharge device 185 of the present embodiment includes a single air supply and discharge port 189, and the connecting pipe 187 is connected to the air supply and discharge port 189 of the air supply and discharge device 185. The air supply and discharge device 185 is connected to the control unit 122 fixed to the lower surface of the seat cushion 105. The air supply and discharge device 185 is capable of supplying air to the interior of the bag member 184 (air supply possible) and discharging air from the interior of the bag member 184 (air discharge possible) via the connecting pipe 187 based on the signal from the control unit 122. In the present embodiment, when the speed of the vehicle S becomes zero, the driving of the vehicle S is stopped, and the power supply for the air supply and discharge device 185 is turned off, the air supply and discharge device 185 seals the bag member 184. Thereby, while the driving of the vehicle S is stopped, the bag member 184 is maintained in the state in which the interior thereof is at the prescribed pressure as a result of air supply.

Figure 21:
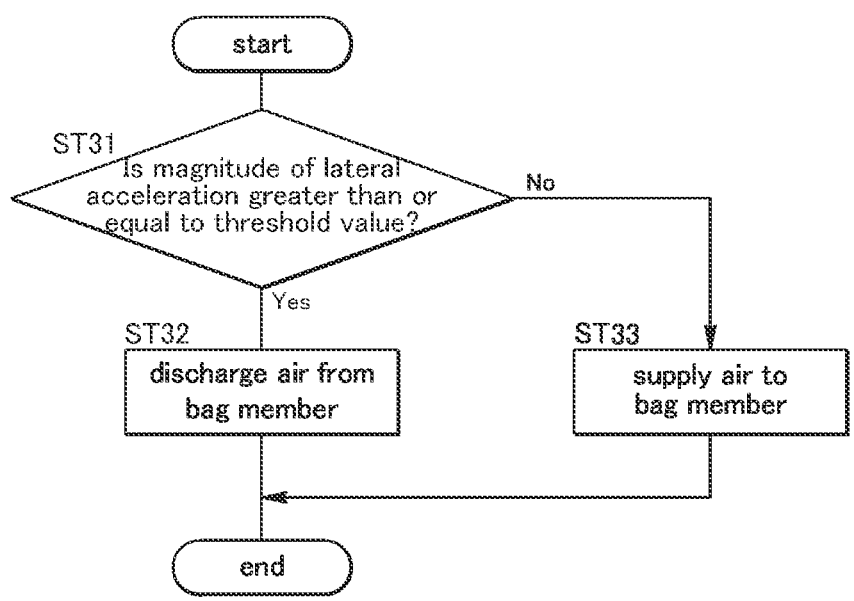
FIG. 21 is a flowchart of a first bag member control process.

As shown in FIG. 19, the lateral acceleration acquisition unit 132 as in the seventh embodiment is fixed to the lower surface of the seat cushion 105. While the vehicle S is driving, the control unit 122 executes a first bag member control process to control the air supply and discharge device 185 based on the lateral acceleration acquired by the lateral acceleration acquisition unit 132. In the following, the first bag member control process will be described in detail with reference to FIG. 21.

In the first step ST31 of the first bag member control process, the control unit 122 receives a signal from the lateral acceleration acquisition unit 132 to acquire the lateral acceleration applied to the vehicle seat 181 and determines whether the magnitude (absolute value) of the lateral acceleration is greater than or equal to the lateral acceleration threshold value. When the magnitude of the lateral acceleration is greater than or equal to the lateral acceleration threshold value, the control unit 122 executes step ST32, and when the magnitude of the lateral acceleration is less than the lateral acceleration threshold value, the control unit 122 executes step ST33.

In step ST32, the control unit 122 makes the air supply and discharge device 185 discharge air from the interior of the bag member 184. Note that when the air supply and discharge device 185 is discharging air, the control unit 122 makes the air supply and discharge device 185 continues discharging air. When the air discharge is completed, the control unit 122 ends the first bag member control process.

In step ST33, the control unit 122 makes the air supply and discharge device 185 supply air to the interior of the bag member 184 so that the interior of the bag member 184 reaches a required pressure. Note that when the air supply and discharge device 185 is supplying air, the control unit 122 makes the air supply and discharge device 185 continue supplying air to the interior of the bag member 184 so that the interior of the bag member 184 reaches the prescribed pressure. When the air supply is completed, the control unit 122 ends the first bag member control process.

Next, the operation and effect of the vehicle seat 181 thus configured will be described. Before the vehicle S is driven, the bag member 184 is maintained in the air-supplied state. At this time, as shown in FIG. 20, the spherical members 186 in the bag member 184 do not closely contact one another, and the spherical members 186 in the bag member 184 can easily move. Namely, the bag member 184 is in a soft state in which it can deform easily with the movement the spherical members 186 in the bag member 184 soft state due to. Therefore, under the load from the seated occupant, the front surface of the seat back 106 easily deforms from the state indicated by the two-dot chain line to the state indicated by the solid line in FIG. 20. At this time, the front surface of the seat back 106 is depressed rearward under a load from the occupant such that a recess 190 conformal to the shape of the upper body of the occupant is formed.

When the travel of the vehicle S is started, while the lateral acceleration of the vehicle S is less than the lateral acceleration threshold value, the air supply and discharge device 185 supplies air to the bag member 184 and the interior of the bag member 184 is at the prescribed pressure. Therefore, the bag member 184 is in the soft state, and similarly to when the vehicle S is driven, the recess 190 is formed under the load from the occupant.

When the lateral acceleration becomes greater than or equal to the lateral acceleration threshold value due to turning of the vehicle S or the like, air is discharged from the bag member 184. Thereby, the volume of the bag member 184 decreases compared to when air is supplied. At this time, the seat back 106 is depressed rearward substantially at a laterally central part thereof and the recess 190 becomes deeper. As the recess 190 becomes deeper, the upper body of the occupant moves rearward, and parts of left and right side portions 106A (bolster portions) of the seat back 106 protrude forward relative to the upper body of the occupant. Therefore, the lateral movement of the occupant is restricted by the left and right side portions 106A of the seat back 106 and the upper body of the occupant is maintained in the state received in the recess 190, whereby the rolling of the occupant is prevented.

When the bag member 184 is discharged, the spherical members 186 in the bag member 184 closely contact one another. Thereby, compared to when air is supplied, the bag member 184 becomes hard and the seat back 106 becomes difficult to deform. Namely, when the lateral acceleration changes from less than the lateral acceleration threshold value to greater than or equal to the lateral acceleration threshold value, the seat back 106 is altered to have higher rigidity. Therefore, the recess 190 formed in the seat back 106 becomes difficult to deform, and a load opposing the inertial force is applied to the upper body of the occupant from the wall surface defining the recess 190. Thereby, the upper body of the occupant is more reliably maintained in the state received in the recess 190, and the rolling of the occupant can be prevented.

Thereafter, when the lateral acceleration becomes less than the lateral acceleration threshold value, air is supplied to the bag member 184, and when the lateral acceleration becomes greater than or equal to the lateral acceleration threshold value again, air is discharged from the bag member 184. When the vehicle S is stopped and the driving of the vehicle S is stopped so that the power supply for the air supply and discharge device 185 is turned off, the bag member 184 is sealed to be maintained in the state in which the internal pressure thereof is at the prescribed pressure.

As described above, in the range where the lateral acceleration is greater than or equal to the lateral acceleration threshold value, in which motion sickness is more likely to occur, the recess 190 becomes deeper so that the lateral movement of the upper body of the occupant is restricted. Also, in the range of the lateral acceleration in which motion sickness is less likely to occur, the occupant can move the upper body in the lateral direction easily than in the range in which motion sickness is more likely to occur. Thereby, the comfort of the vehicle seat 181 is improved.

Tenth Embodiment

A vehicle seat 201 according to the tenth embodiment differs from the vehicle seat 101 according to the seventh embodiment with respect to the configuration of the lateral acceleration acquisition unit 202. The other configuration is the same as in the seventh embodiment, and therefore, the description thereof will be omitted.

As shown in FIG. 22, the lateral acceleration acquisition unit 202 of the vehicle seat 201 according to the tenth embodiment includes a steering angle sensor 205 provided on the steering shaft 203 of the vehicle S to detect the steering angle of the steering wheel 204 of the vehicle S, a vehicle speed sensor 207 provided in the vehicle body 206 to detect the vehicle speed based on the rotation speed the axle, and a calculation unit 208 connected with the steering angle sensor 205, the vehicle speed sensor 207, and the control unit 122 via signal lines.

The calculation unit 208 is a computer including a central processing unit (CPU) and a memory. The calculation unit 208 acquires the steering angle and the vehicle speed from the steering angle sensor 205 and the vehicle speed sensor 207, calculates the direction of the lateral acceleration applied to the vehicle seat 101 based on the steering angle, and calculates the magnitude of the lateral acceleration based on the steering angle and the vehicle speed to output them to the control unit 122. More specifically, the calculation unit 208 obtains the turning direction of the vehicle S based on the steering angle acquired by the steering angle sensor 205 and determines the turning direction as the direction of the acceleration. Further, the calculation unit 208 calculates the turning radius of the vehicle S from the steering angle, and calculates the magnitude of the lateral acceleration applied to the vehicle S by using the calculated turning radius and the vehicle speed acquired by the vehicle speed sensor 207, with an assumption that the motion of the vehicle S is, for example, a constant-speed circular motion. Thereby, the calculation unit 208 calculates the lateral acceleration applied to the vehicle S, namely, the lateral acceleration applied to the vehicle seat 201.

Next, the effect of the vehicle seat 201 thus configured will be discussed. By detecting the steering angle input from the steering angle sensor 205, it is possible to detect that the vehicle S will turn before the vehicle S starts turning in response to the steering, namely, before the inertial force in the lateral direction acts on the occupant. Thereby, it is possible to detect in advance that the inertial force in the lateral direction will act on the occupant, and therefore, it is possible to deform the seat back 106 by driving the air supply and discharge device 126 in accordance with the timing at which the inertial force in the circumferential direction acts. Thus, the movement of the upper body of the occupant can be prevented more reliably and motion sickness can be reduced.

Eleventh Embodiment

Figure 23:
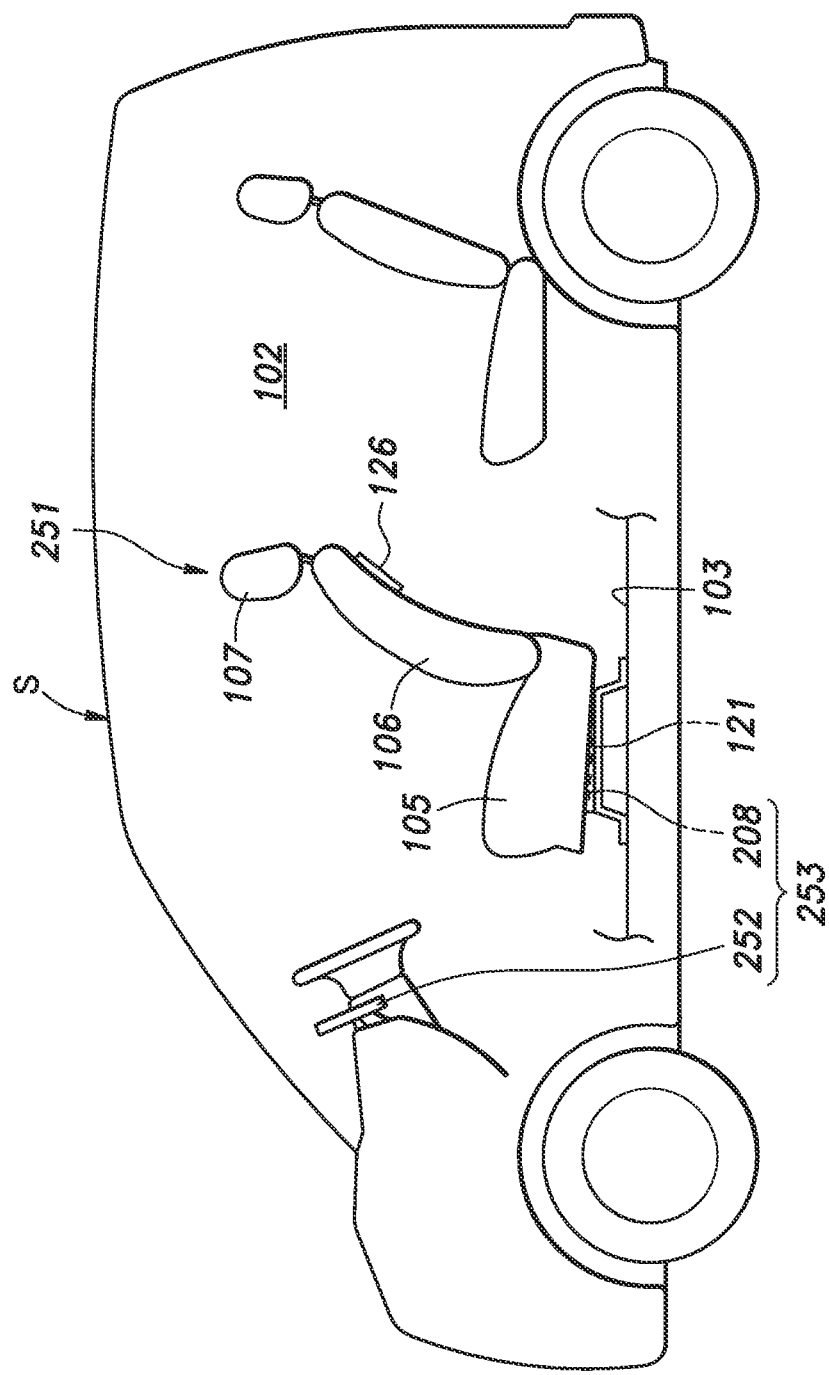
FIG. 23 is a schematic diagram of a vehicle provided with a vehicle seat according to the eleventh embodiment.

As shown in FIG. 23, a vehicle seat 251 according to the eleventh embodiment is installed in the vehicle S provided with a car navigation system 252. The vehicle seat 251 according to the eleventh embodiment differs from the vehicle seat 201 according to the tenth embodiment in that the lateral acceleration acquisition unit 253 includes the car navigation system 252 in place of the steering angle sensor 205 and the vehicle speed sensor 207, and the other configuration is the same as in the tenth embodiment. Therefore, the description of the other configuration will be omitted.

The car navigation system 252 is provided with GPS and storage devices, and holds data including the map information, the current position of the vehicle S, and the travel schedule of the vehicle S. Also, the car navigation system 252 transmits the map information, the position of the vehicle S, and the travel schedule of the vehicle S held thereby to the calculation unit 208. Based on the map information, the position of the vehicle S, and the travel schedule received, the calculation unit 208 calculates a predicted time of the turning of the vehicle S, the travel speed during the turning of the vehicle S, and the direction and magnitude of the lateral acceleration applied to the vehicle seat 251 at that time, and outputs them to the control unit 122. With such a configuration, it is possible to predict the direction and magnitude of the acceleration applied to the occupant and to deform the seat back 106 based on the predicted direction and magnitude of the lateral acceleration. Thus, it is possible to deform the seat back 106 in accordance with the instant (timing) at which the inertial force caused by the turning is applied to the occupant, whereby the rolling of the upper body of the occupant can be prevented.

Twelfth Embodiment

A vehicle seat 301 according to the twelfth embodiment differs from the vehicle seat 181 of the ninth embodiment in that the vehicle seat 301 includes a seating sensor 302 in place of the lateral acceleration acquisition unit 132 and the process (hereinafter, the second bag member control process) executed by the control unit 122 is different, and the other configuration is the same as in the vehicle seat 181 of the ninth embodiment, and therefore, the description of the other configuration will be omitted.

Figure 24:
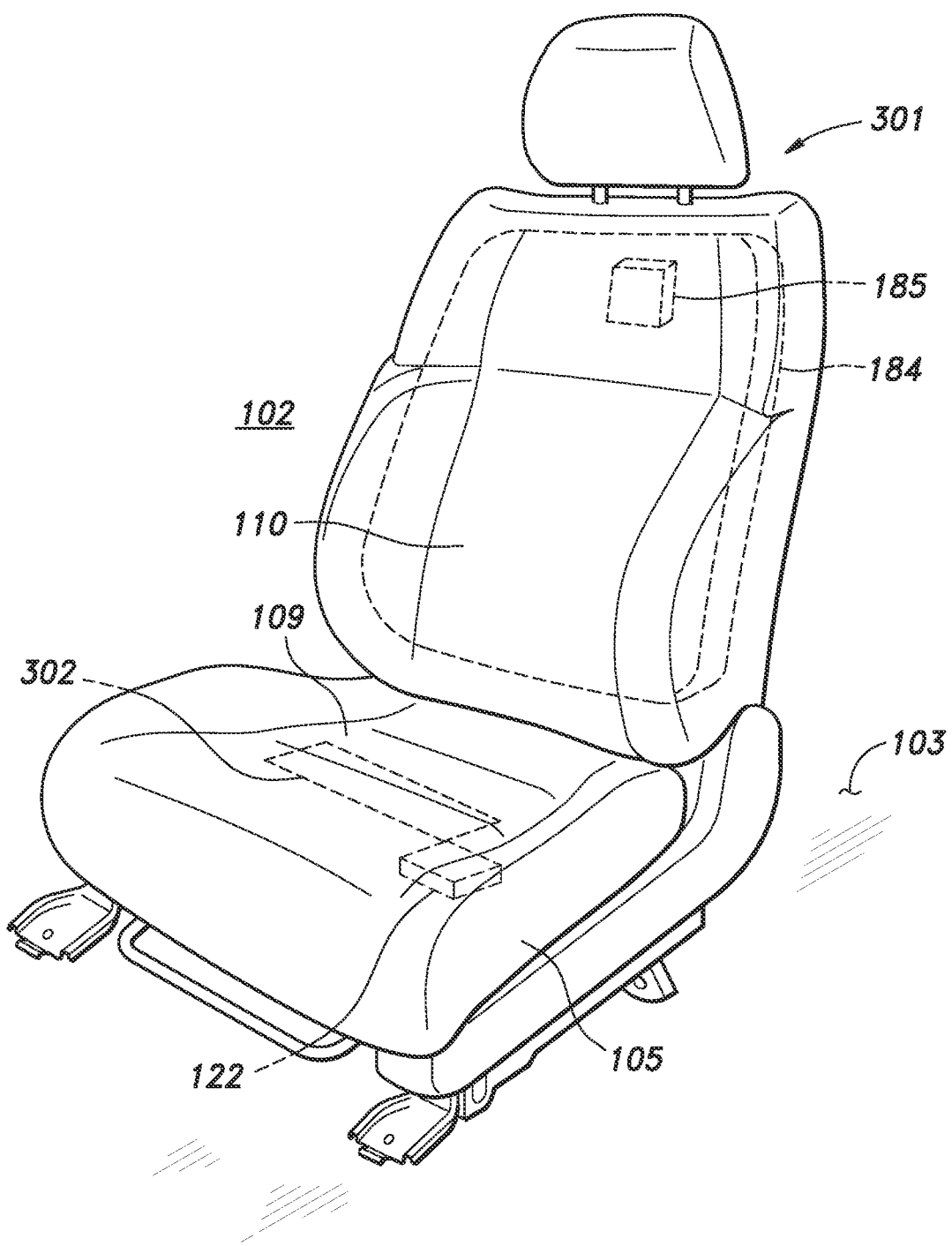
FIG. 24 is a perspective view of a vehicle seat according to the twelfth embodiment.

As shown in FIG. 24, the seating sensor 302 is disposed between the skin member 116 and the pad member 114 of the seat cushion 105 and consists of a sensor configured to turn on in response to seating of the occupant on the seat cushion 105. The seating sensor 302 may be a sensor including known membrane switches each configured to be turned on by a load from above, and may include known capacitance sensors for detecting approach of the occupant to the seat cushion 105.

The seating sensor 302 is connected to the control unit 122, and the control unit 122 detects whether the seating sensor 302 is on or off, so that the information on whether the occupant is seated in the vehicle seat 251 can be acquired.

Figure 25:
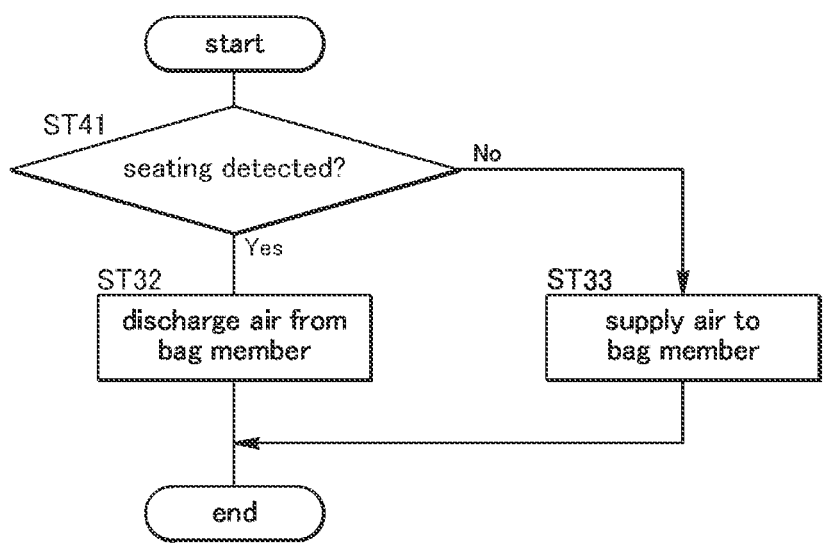
FIG. 25 is a flowchart of a second bag member control process.

Next, the second bag member control process executed by the control unit 122 will be described. As shown in FIG. 25, the second bag member control process differs from the first bag member control process (see FIG. 21) only in that step ST41 is included in place of the first step ST31, and the other part is the same as in the first bag member control process, and therefore, the description of the other part will be omitted.

In step ST41, the control unit 122 determines whether the seating sensor 302 is on, and when the seating sensor 302 is on, executes step ST32, and when the seating sensor 302 is off, executes step ST33.

Next, the effect of the vehicle seat 301 thus configured will be discussed. When the occupant is seated in the vehicle seat 301, the control unit 122 determines that the occupant is seated in step ST41 and executes step ST32. Accordingly, the air supply and discharge device 185 discharges air from the bag member 184. At this time, the front surface of the seat back 106 is deformed due to the load from the occupant such that the upper body of the occupant sinks therein, and the recess 190 that is depressed rearward is formed in the front surface of the seat back 106. In this state, the upper body of the occupant is received in the recess 190 and the movement of the upper body of the occupant is restrained from both the left and right sides, whereby the rolling of the upper body of the occupant can be prevented.

Also, as a result of the air discharge, the spherical members 186 closely contact one another and the bag member 184 becomes difficult to deform or the rigidity of the seat back 106 increases. Thereby, a load opposing the inertial force caused by the lateral acceleration is applied to the upper body of the occupant from the wall surface defining the recess 190. Therefore, the upper body of the occupant is more reliably held in the recess 190 and the rolling of the upper body of the occupant is more reliably prevented.

Thirteenth Embodiment

Figure 26:
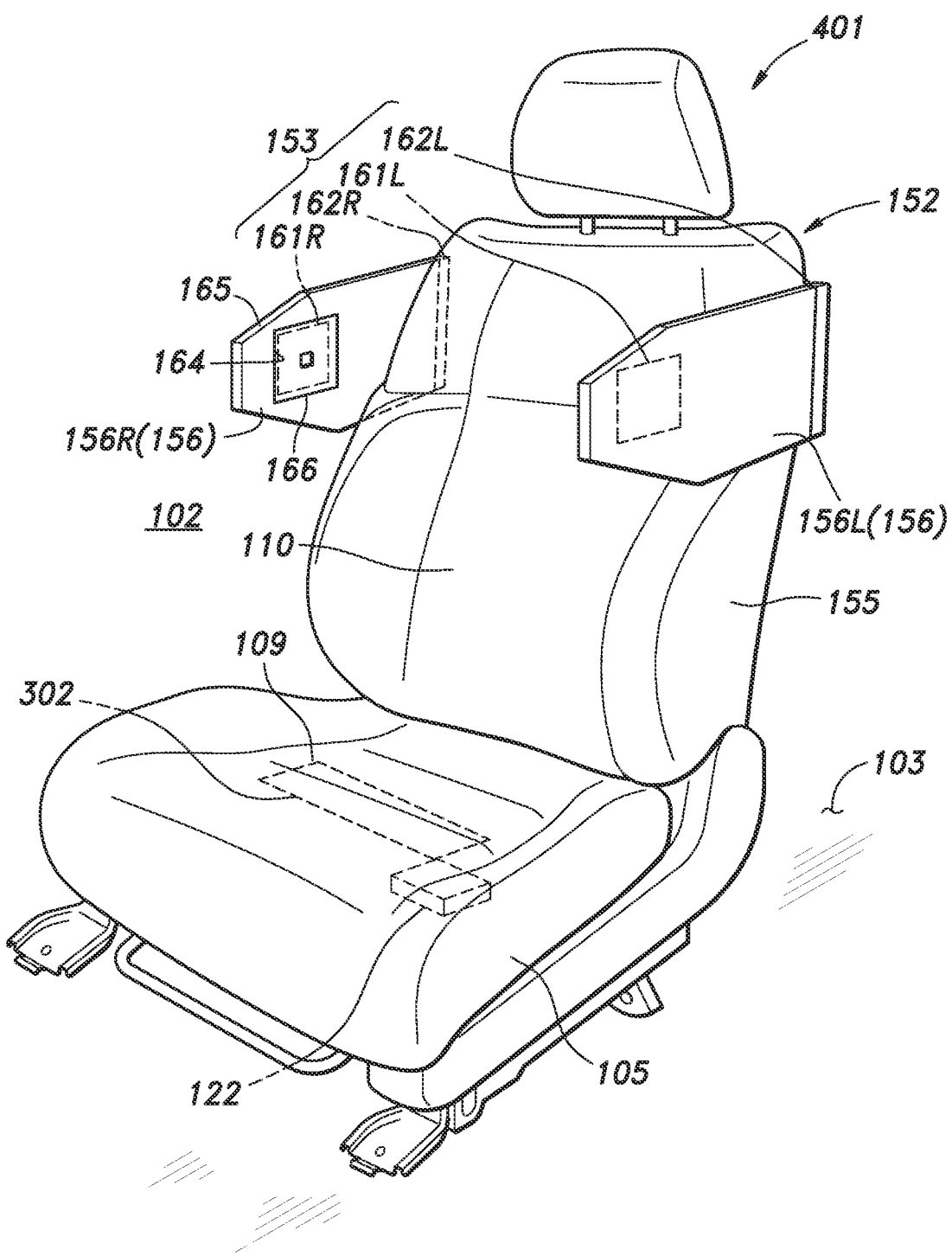
FIG. 26 is a perspective view of a vehicle seat according to the thirteenth embodiment.

As shown in FIG. 26, a vehicle seat 401 according to the thirteenth embodiment differs from the vehicle seat 151 according to the eighth embodiment in that the seating sensor 302 as in the eleventh embodiment is included in place of the lateral acceleration acquisition unit 132 and the process (hereinafter, the third air cell control process) executed by the control unit 122 is different. However, the other configuration is the same, and therefore, the description thereof will be omitted.

Figure 27:
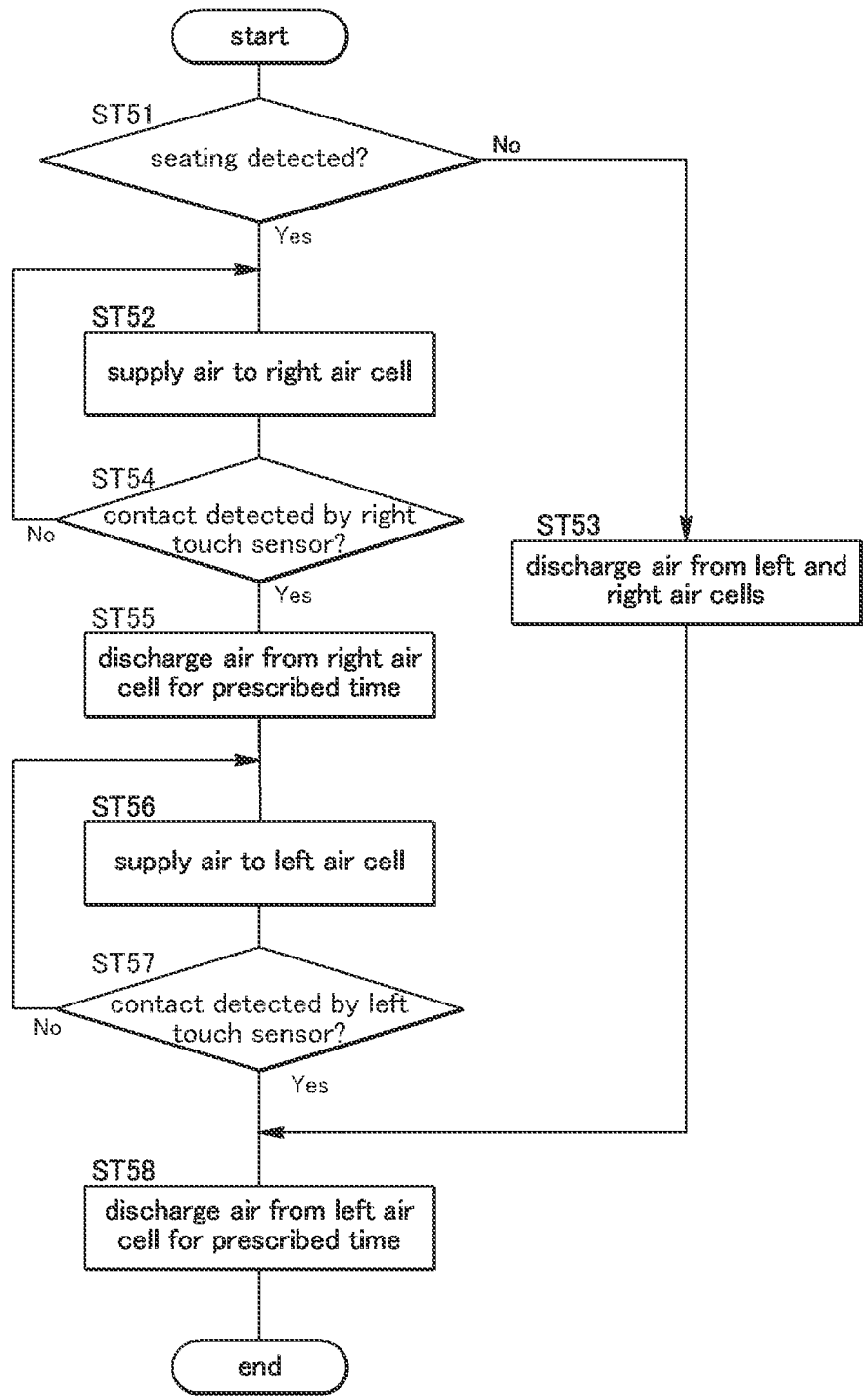
FIG. 27 is a flowchart of a third air cell control process.

As shown in FIG. 27, in the first step ST51, the control unit 122 receives the information on whether the occupant is seated on the seat cushion 105 from the seating sensor 302. The control unit 122 executes step ST52 when the occupant is seated, and executes step ST53 when the occupant is not seated or has left the seat.

In step ST52, the control unit 122 makes the right air supply and discharge device 162R supply air to the right air cell 161R. Thereafter, the control unit 122 executes step ST54 to determine whether the contact with the occupant is detected by the right touch sensor 170R. When the contact is detected, the control unit 122 executes step ST55, and when not detected, the process returns to step ST52.

In step ST55, the control unit 122 makes the right air supply and discharge device 162R discharge air from the right air cell 161R for a prescribed time. Thereafter, the control unit 122 executes step ST56.

In step ST56, the control unit 122 makes the left air supply and discharge device 162L supply air to the left air cell 161L. Thereafter, the control unit 122 executes step ST57 to determine whether the contact with the occupant is detected by the left touch sensor 170L. When the contact is detected, the control unit 122 executes step ST58, and when not, the process returns to step ST55.

In step ST58, the control unit 122 makes the left air supply and discharge device 162L discharge air from the left air cell 161L for a prescribed time. Thereafter, the control unit 122 ends the second bag member control process.

In step ST53, the control unit 122 makes the right air supply and discharge device 162R and the left air supply and discharge device 162L discharge air from the respective air cells 161. When the air discharge is completed, the control unit 122 ends the second bag member control process.

Next, the effect of the vehicle seat 401 thus configured will be discussed. When the seating of the occupant is detected by the seating sensor 302 and the control unit 122 determines that the occupant is seated (ST51), the right air cell 161R expands until it comes into contact with the occupant (ST52, ST54). Thereafter, the air in the right air cell 161R is discharged for a prescribed time so that the seat-inner-side side surface of the right restriction member 156R is slightly spaced from the occupant (ST55). Similarly, the left air cell 161L expands until it comes into contact with the occupant (ST56, ST57), Thereafter, the air in the left air cell 161L is discharged for a prescribed time (ST58) so that the seat-inner-side side surface of the left restriction member 156L is slightly spaced from the occupant.

In this way, the seat-inner-side side surfaces of the left and right restriction members 156 protrude toward the seat inner side and are disposed in the left and right vicinity of the occupant, respectively. Thereby, the upper body of the occupant is restrained from both the left and right sides, and the lateral movement of the upper body of the occupant is restricted. Thus, the rolling of the upper body of the occupant can be prevented. Further, air is discharged from the left and right air cells 161 for a prescribed time after the seat-inner-side side surfaces of the restriction members 156 contact the occupant. Thereby, the seat-inner-side side surface of each restriction member 156 is slightly spaced from the occupant so that a space is created between the seat-inner-side side surface of the restriction member 156 and the occupant. As a result, the restriction member 156 does not continuously contact the occupant and the oppressive feeling imparted to the occupant is reduced. Thus, tension of the occupant can be relieved, whereby motion sickness of the occupant can be reduced.

Fourteenth Embodiment

Figure 28:
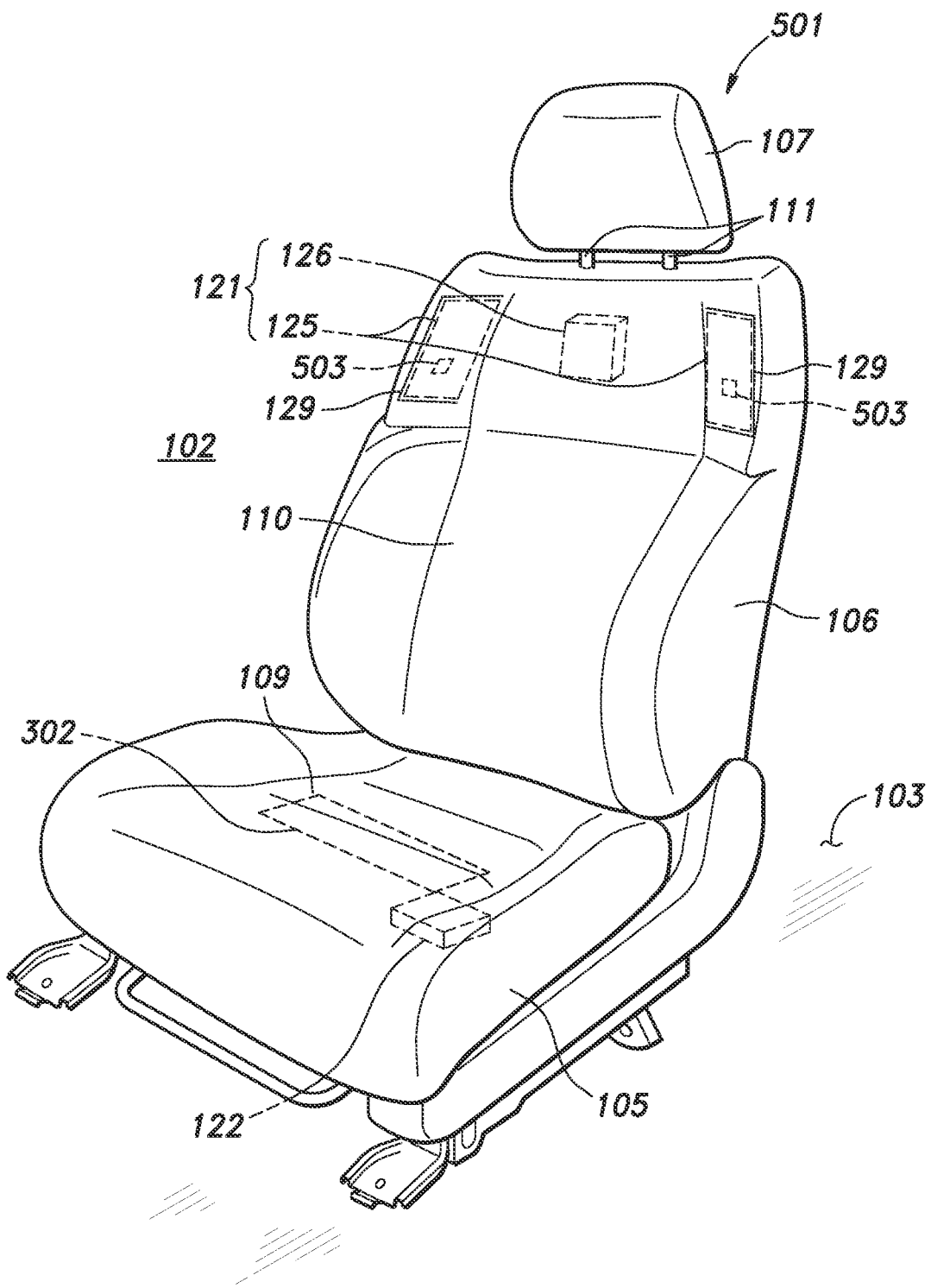
FIG. 28 is a perspective view of a vehicle seat according to the fourteenth embodiment.

A vehicle seat 501 according to the fourteenth embodiment differs from the vehicle seat 101 according to the seventh embodiment in that, as shown in FIG. 28, the vehicle seat 501 is provided with the seating sensor 302 as in the thirteenth embodiment, the skin member 117 covering the front surface of each air cell 125 is provided with the touch sensor 503 as in the thirteenth embodiment, and the control unit 122 performs the second air cell control process as in the thirteenth embodiment, and the other part is the same as in the seventh embodiment, and therefore, the description of the other part will be omitted.

In the second air cell control process, when the seating of the occupant is detected by the seating sensor 302 (ST51), the control unit 122 makes each of the left and right air supply and discharge devices 126 supply air to the corresponding air cell 125 sequentially until the contact with the occupant is detected by the touch sensor 503 (ST52, ST54, ST56, ST57), and thereafter discharge air from the corresponding air cell 125 for a prescribed time (ST55, ST58). As a result, a wall body 128 is formed on each of the left and right outer sides of the shoulders of the occupant so as to oppose the shoulder of the occupant via a space. Thereby, similarly to the thirteenth embodiment, the lateral movement of the upper body of the occupant can be restricted while reducing the oppressive feeling imparted to the occupant.

Fifteenth Embodiment

Figure 30:
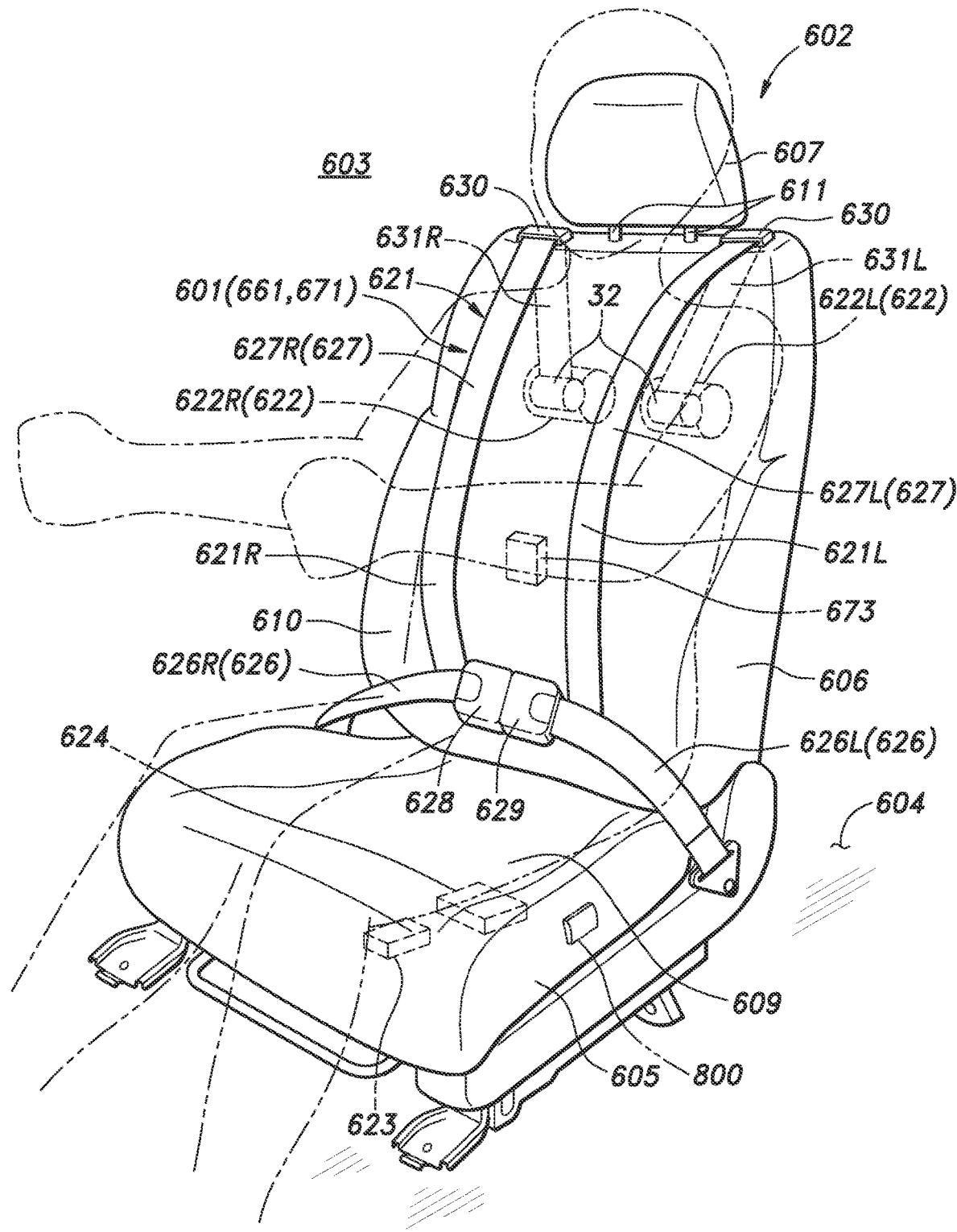
FIG. 30 is a perspective view of a vehicle seat provided with a seat belt device according to the fifteenth embodiment.
Figure 36:
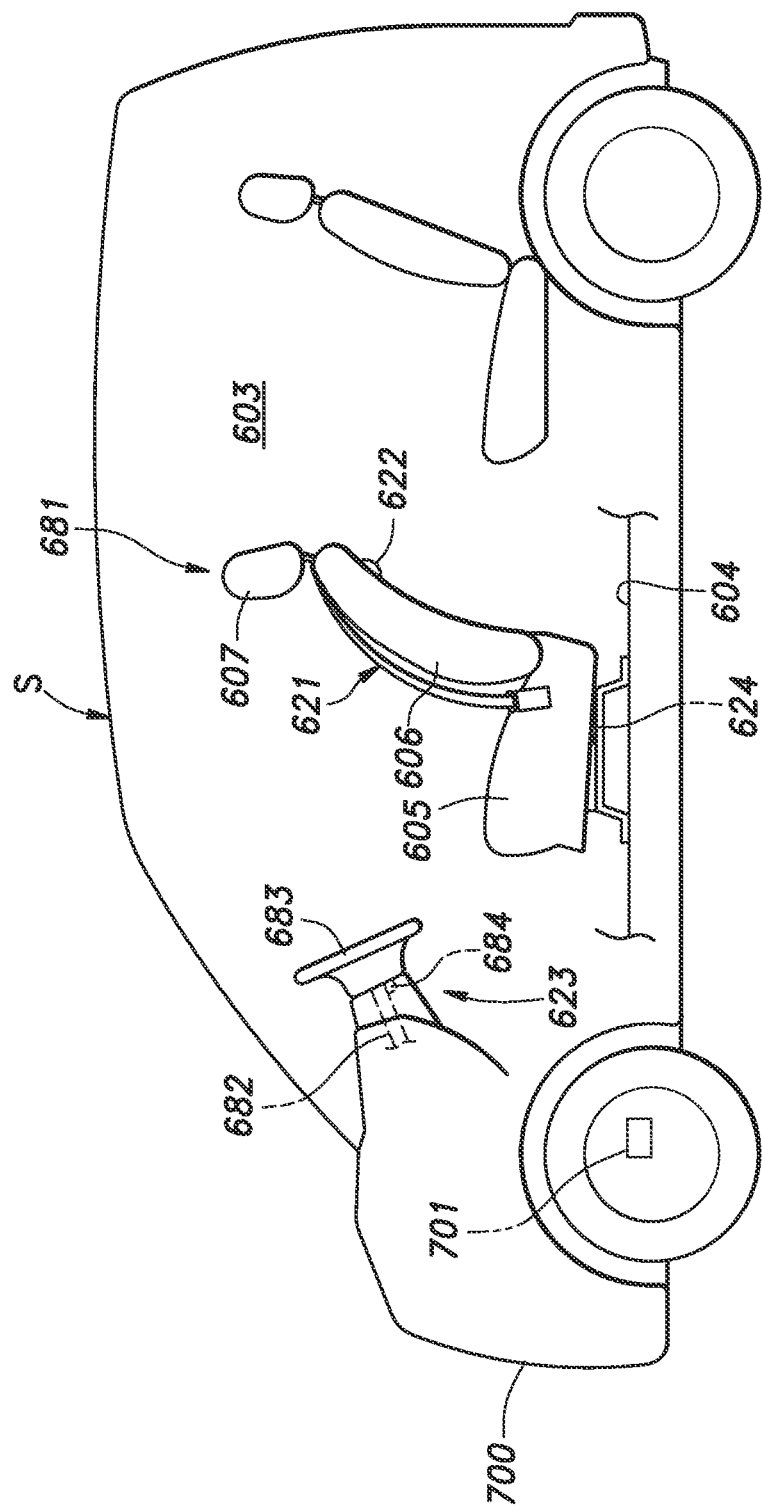
FIG. 36 is a schematic diagram of a vehicle in which a vehicle seat provided with a seat belt device according to the nineteenth embodiment is installed.

As shown in FIG. 30, a seat belt device 601 is applied to a vehicle seat 602 to be installed in a vehicle such as an automobile S (see FIG. 36). In the present embodiment, the vehicle seat 602 is positioned to the side of the driver's seat in the vehicle S (see FIG. 38) to constitute a front passenger seat.

As shown in FIG. 30, the vehicle seat 602 is placed on a floor 604 defining a bottom portion of a cabin 603 so as to face forward of the vehicle S (more specifically, such that the seated occupant faces forward of the vehicle S). The vehicle seat 602 is supported on the floor 604 to be slidably movable in the fore and aft direction. In the following, description will be made with the fore and aft, lateral, and vertical directions being defined with reference to the directions as viewed from the occupant seated in the vehicle seat 602.

In addition to the seat belt device 601, the vehicle seat 602 includes a seat cushion 605 that supports the buttocks of a seated person, a seat back 606 provided at a rear portion of the seat cushion 605 to function as a backrest, and a headrest 607 provided in an upper part of the seat back 606.

The seat cushion 605 has a substantially rectangular parallelepiped shape having a surface that faces substantially vertically. The upper surface of the seat cushion 605 forms a seating surface 609 for a single occupant. The seating surface 609 is recessed downward substantially at a laterally central part thereof, and is slightly inclined downward toward the rear end thereof. Thus, the seating surface 609 has a shape corresponding to the buttocks and thighs of the occupant. When an occupant is seated, the buttocks and thighs of the occupant are positioned on the seating surface 609.

The seat back 606 extends vertically and has a substantially rectangular parallelepiped shape having a surface that faces substantially in the fore and aft direction. The front surface of the seat back 606 forms a support surface 610 for supporting the occupant's back. The support surface 610 is recessed rearward substantially at a laterally central part thereof, and is slightly inclined rearward toward the upper end thereof. Thus, the support surface 610 has a shape corresponding to the back of the occupant, and the back of the seated occupant is supported by the support surface 610.

The lower end of the seat back 606 is pivotally supported by the rear end of the seat cushion 605 via a per se known reclining mechanism. In other words, the seat back 606 is connected to the rear end of the seat cushion 605 at the lower end so as to be pivotable forward and backward.

The headrest 607 is connected to the upper end of the seat back 606 via two pillars 611. The headrest 607 is disposed behind the head of the seated occupant.

Figure 31:
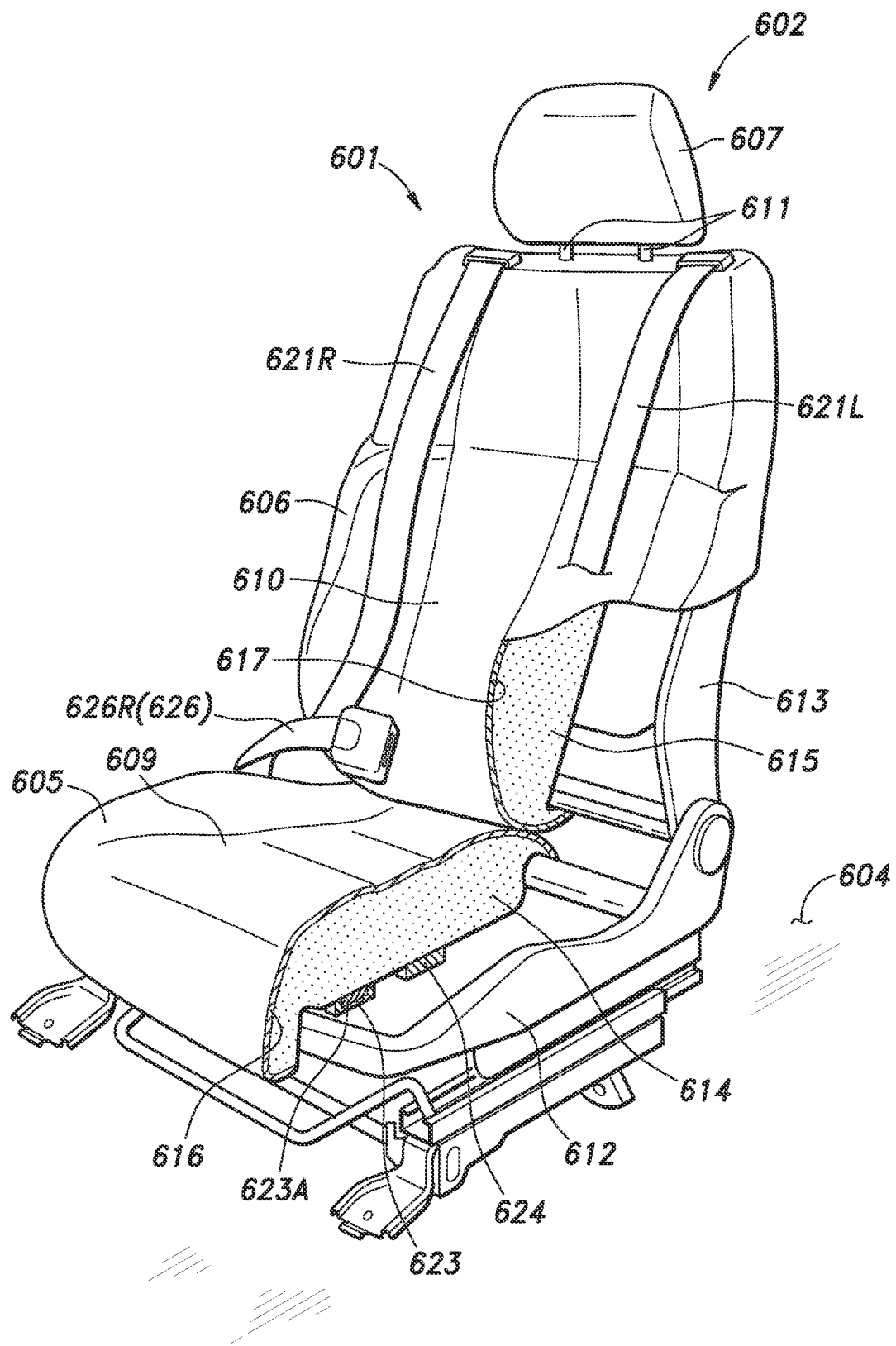
FIG. 31 is a perspective sectional view of the vehicle seat provided with the seat belt device according to the fifteenth embodiment.

As shown in FIG. 31, the seat cushion 605 and the seat back 606 include frames 612, 613 forming skeleton, pad members 614, 615 supported by the frames 612, 613, and skin members 616, 617 covering at least a part of the surfaces of the pad members 614, 615, respectively. The frames 612, 613 of the seat cushion 605 and the seat back 606 are each made of metal and formed in a substantially rectangular frame shape. The pad member 614 of the seat cushion 605 is disposed on the upper side of the corresponding frame 612, and the upper surface thereof is covered by the skin member 616. The pad member 615 of the seat back 606 is disposed on the front surface of the corresponding frame 613, and the front surface thereof is covered by the skin member 617. In this way, the provision of the frames 612, 613 in the seat cushion 605 and the seat back 606, respectively, can make the vehicle seat 602 have sufficient rigidity to support the occupant. Also, the provision of the pad members 614, 615 and the skin members 616, 617 enables the seating surface 609 and the support surface 610 to have favorable elasticity and texture, so that it becomes easy for the occupant to be seated and the comfort of the vehicle seat 602 improves.

As shown in FIG. 30, the seat belt device 601 includes a seat belt 621 for restraining the upper body of the occupant seated in the vehicle seat 602 to the seat back 606, a pair of left and right retractors 622 provided on the rear surface of the seat back 606 to apply tension to the seat belt 621, a lateral acceleration acquisition unit 623 provided on the rear surface of the seat back 606 to acquire a lateral direction acceleration (hereinafter, lateral acceleration) applied to the seat back 606, and a control unit 624 configured to drive the retractors 622 in accordance with the lateral acceleration. In the following, description will be made of the state in which the seat belt 621 restrains the upper body of the seated occupant to the vehicle seat 602.

The seat belt 621 is a four-point seat belt that includes a pair of left and right lap belts 626 extending laterally along the hip of the occupant to restrain the hip of the occupant to the seat cushion 605 and the seat back 606 and a pair of left and right shoulder belts 627 extending vertically along the shoulder portions of the occupant to restrain the shoulder portions of the occupant to the seat back 606, and has an H-shape in front view. In the following, the lap belt 626 on the left side will be referred to as the left lap belt 626L and the lap belt 626 on the right side will be referred to as the right lap belt 626R. Similarly, the shoulder belt 627 on the left side will be referred to as the left shoulder belt 627L and the shoulder belt 627 on the right side will be referred to as the right shoulder belt 627R.

A buckle 628 is provided on one end (hereinafter, the inner end) of the right lap belt 626R, and a tongue plate 629 is provided on one end (hereinafter, the inner end) of the left lap belt 626L to be detachably received in the buckle 628. With the tongue plate 629 detachably received in the buckle 628, the inner end of the right lap belt 626R is detachably joined to the inner end of the left lap belt 626L on the front side of the hip of the occupant. The left lap belt 626L extends leftward from the front side of the hip of the seated occupant and, at the other end (hereinafter, the outer end) thereof, is joined to the left side surface of the seat cushion 605 so as to be rotatable about an axis extending in the lateral direction. The right lap belt 626R extends rightward from the front side of the hip of the seated occupant and, at the other end (hereinafter, the outer end) thereof, is joined to the right side surface of the seat cushion 605 so as to be rotatable about an axis extending in the lateral direction.

A pair of left and right shoulder belt guides 630 are provided on the left and right upper ends of the seat back 606, respectively. The left and right retractors 622 are spaced apart laterally and are secured to the rear surface of the seat back 606. A belt-shaped right extension 631R is connected to the retractor 622 on the right side (hereinafter, the right retractor 622R). The right extension 631R is connected to the right retractor 622R at one end thereof and extends upward to pass the right shoulder belt guide 630. The right shoulder belt 627R is connected to the other end of the right extension 631R at the upper end thereof and extends downward to reach the right shoulder front surface of the occupant. The right shoulder belt 627R is integrally joined to the vicinity of the inner end of the right lap belt 626R at the lower end thereof to form a right belt portion 621R of the seat belt 621. Thus, the right belt portion 621R is joined to the right retractor 622R at one end thereof via the right extension 631R, passes the right shoulder front surface and the hip front surface of the occupant, and extends to the right. The right belt portion 621R is joined to the right side surface of the seat cushion 605 at the right end portion thereof and restrains the right shoulder portion of the occupant to the seat back 606 with priority. Note that restraining the right shoulder portion of the occupant with priority here means restraining the right shoulder portion to the seat back 606 more firmly than the left shoulder portion.

Similarly, a belt-shaped left extension 631L is connected to the retractor 622 on the left side (hereinafter, the left retractor 622L). The left extension 631L extends upward to pass the left shoulder belt guide 630. The left shoulder belt 627L is connected to the left extension 631L at the upper end thereof and extends downward to reach the left shoulder front surface of the occupant. The left shoulder belt 627 is integrally joined to the vicinity of the inner end of the left lap belt 626L at the lower end thereof to form a left belt portion 621L. Thus, the left belt portion 621L is joined to the left retractor 622L at one end thereof via the left extension 631L, passes the left shoulder front surface and the hip front surface of the occupant, and extends to the left. The left belt portion 621L is joined to the left side surface of the seat cushion 605 at the left end portion thereof and restrains the left shoulder portion of the occupant to the seat back 606 with priority.

The right retractor 622R and the left retractor 622L are winding devices for winding the upper end of the right shoulder belt 627R and the upper end of the left shoulder belt 627L, respectively. Each of the right retractor 622R and the left retractor 622L is provided with an electric motor 632 for winding up a shoulder belt 627 connected thereto. When each of the right retractor 622R and the left retractor 622L receives a signal instructing driving thereof, the electric motor 632 provided therein is driven to wind up the corresponding shoulder belt 627. Thereby, the right retractor 622R applies tension to the right belt portion 621R with priority, while the left retractor 622L applies tension to the left belt portion 621L with priority. Note that applying tension to one of the belt portions with priority here means applying greater tension to one of the belt portions than to the other belt portion.

In the present embodiment, each of the right retractor 622R and the left retractor 622L can change the driving amount of the electric motor 632 according to the received signal. Thereby, upon receipt of the signal instructing the respective driving amount, each of the right retractor 622R and the left retractor 622L drives the electric motor 632 in accordance with the instructed driving amount to wind up the corresponding shoulder belt 627. Thereby, the corresponding belt portion 621R, 621L is given a tension in accordance with the driving amount.

As shown in FIG. 31, the lateral acceleration acquisition unit 623 includes an acceleration sensor 623A fixed to the lower surface of the seat cushion 605. The acceleration sensor 623A is configured to acquire a lateral direction acceleration (hereinafter, lateral acceleration) applied to the seat cushion 605, including the magnitude and direction thereof. The lateral acceleration acquisition unit 623 preferably outputs the lateral acceleration as a positive value when it is rightward and as a negative value when it is leftward, for example. In the present embodiment, the acceleration sensor 623A is a semiconductor type sensor using MEMS technology, and a so-called capacitive sensor, which detects the acceleration by reading a displacement of a movable part supported by a beam as a change in the capacitance, is used. Note that the acceleration sensor 623A is not limited to this embodiment, and may be a piezoelectric element sensor that detects an acceleration by using a change in the piezoresistance, for example.

The control unit 624 is a computer provided on the lower surface of the seat cushion 605 and includes a central processing unit (CPU), a storage device (memory), and the like. The control unit 624 is connected to the left and right retractors 622 and the lateral acceleration acquisition unit 623 via a wire harness (not shown in the drawings) serving as signal lines.

Figure 32:
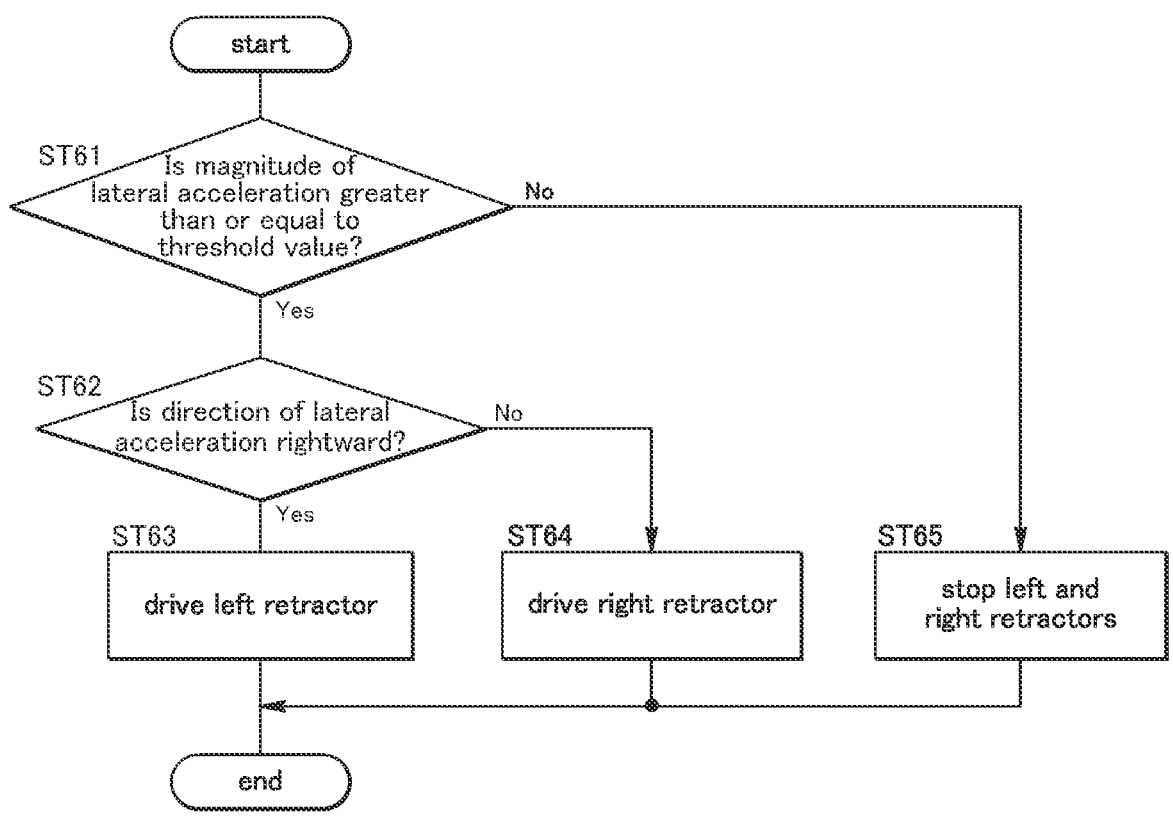
FIG. 32 is a flowchart of a retractor control process executed by a control unit of the seat belt device according to the fifteenth embodiment.

During travel of the vehicle, the control unit 624 executes a retractor control process to control the driving of the left and right retractors 622 based on the signal from the lateral acceleration acquisition unit 623. In the following, the retractor control process will be described in detail with reference to FIG. 32.

In step ST61 of the retractor control process, the control unit 624 receives a signal from the lateral acceleration acquisition unit 623 to acquire the lateral acceleration applied to the seat back 606, and when the magnitude (absolute value) thereof is greater than or equal to a prescribed threshold value (hereinafter, the left-right lateral acceleration threshold value), executes step ST62, while when the magnitude of the lateral acceleration is less than the left-right lateral acceleration threshold value, executes step ST6. The lateral acceleration threshold value is set as a threshold value of the lateral acceleration at or above which motion sickness of the occupant is more likely to occur in general.

In step ST62, the control unit 624 determines the direction of the acquired lateral acceleration. The control unit 624 executes step ST63 when the direction of the lateral acceleration is rightward and executes step ST64 when the direction of the lateral acceleration is leftward. In the case where the lateral acceleration acquisition unit 623 is configured to output the lateral acceleration as a positive value when it is rightward and as a negative value when it is leftward, for example, the control unit 624 may determine the direction of the lateral acceleration based on whether the lateral acceleration is positive or negative.

In step ST63, the control unit 624 transmits a signal instructing driving of the electric motor 632 to the left retractor 622L. Upon receipt of the signal, the left retractor 622L drives the electric motor 632 to wind up the upper end of the left shoulder belt 627L. Thereby, the tension applied to the left belt portion 621L increases.

In the present embodiment, the control unit 624 calculates, based on the magnitude of the acquired lateral acceleration, the length of the belt to be wound up by the electric motor 632 of the left retractor 622L, namely, the driving amount, and drives the electric motor 632 of the left retractor 622L with the calculated driving amount. The control unit 624 is configured to calculate a larger driving amount as the magnitude of the acquired lateral acceleration increases so that a larger tension is applied to the left shoulder belt 627L. The control unit 624 may calculate the driving amount by using a prescribed map stored in the storage device. After transmitting the signal instructing the driving to the left retractor 622L together with the driving amount, the control unit 624 completes step ST63 and ends the retractor control process.

In step ST64, the control unit 624 transmits a signal instructing driving of the electric motor 632 to the right retractor 622R. Upon receipt of the signal, the right retractor 622R drives the electric motor 632 to wind up the upper end of the right shoulder belt 627R. Thereby, the tension applied to the right belt portion 621R increases. In the present embodiment, the control unit 624 calculates, based on the magnitude of the acquired lateral acceleration, the length of the belt to be wound up by the electric motor 632, namely, the driving amount, and drives the electric motor 632 of the right retractor 622R with the calculated driving amount. The control unit 624 is configured to calculate a larger driving amount as the magnitude of the acquired lateral acceleration so that a larger tension is applied to the right shoulder belt 627R. After transmitting the signal instructing the driving to the right retractor 622R together with the driving amount, the control unit 624 completes step ST64 and ends the retractor control process.

In step ST65, when the electric motor 632 of the right retractor 622R is being driven, the control unit 624 transmits a signal for stopping the driving to stop the driving of the electric motor 632. When the electric motor 632 of the right retractor 622R is not being driven, the control unit 624 does not transmit the signal instructing the driving to the right retractor 622R, and the electric motor 632 of the right retractor 622R is kept in the stopped state. Similarly, when the electric motor 632 of the left retractor 622L is being driven the control unit 624 transmits the signal for stopping the driving to stop the driving of the electric motor 632, and when not being driven, the control unit 624 does not transmit the signal instructing the driving to the left retractor 622L so that the electric motor 632 of the left retractor 622L is kept in the stopped state.

During travel of the vehicle, the control unit 624 executes the retractor control process repeatedly and continuously so that the driving amount of the electric motor 632 of each retractor 622 is updated in accordance with the lateral acceleration acquired by the lateral acceleration acquisition unit 623. For example, when a lateral acceleration having a magnitude greater than or equal to the left-right lateral acceleration threshold value is applied in the lateral direction, the control unit 624 drives the electric motor 632 of the corresponding retractor 622 in step ST63 or step ST64. Thereafter, when the magnitude of the acceleration becomes less than or equal to the threshold value, the control unit 624 executes step ST65 to stop the driving of the electric motors 632 of the left and right retractors 622.

Next, the operation of the seat belt device 601 thus configured will be described. Due to turning of the vehicle S or the like, a rightward acceleration may be applied to the vehicle seat 602 and a leftward inertial force may act on the occupant.

When, based on the signal from the lateral acceleration acquisition unit 623, it is determined in step ST61 of the retractor control process that a lateral acceleration greater than or equal to the lateral acceleration threshold value is applied to the seat back 606 and it is determined in step ST62 that the direction of the lateral acceleration is rightward, the control unit 624 drives the electric motor 632 of the left retractor 622L. Due to the driving the electric motor 632 of the left retractor 622L, tension is applied to the left belt portion 621L so that the left shoulder of the occupant is pressed against the seat back 606. As a result of the left shoulder of the occupant being pressed against the seat back 606, the friction force acting on the occupant increases.

With the pressing of the left shoulder of the occupant, the friction force between the left shoulder and the seat back 606 acts to oppose the inertial force. Thereby, the upper body of the occupant is blocked and the movement thereof is prevented.

Similarly, when a lateral acceleration greater than or equal to the lateral acceleration threshold value is applied to the vehicle seat 602 in the leftward direction, the right retractor 622R is driven to apply tension to the right belt portion 621R. As a result, the right shoulder of the occupant is pressed against the seat back 606, whereby the friction force between the right shoulder and the seat back 606 acts to oppose the inertial force. Thereby, the upper body of the occupant is blocked and the movement thereof is prevented.

Next, the effect of the seat belt device 601 thus configured will be discussed. When a lateral acceleration is applied to the occupant, inertial force in the direction opposite to the direction of the lateral acceleration acts on the upper body of the occupant. At this time, if the occupant moves in accordance with the inertial force, the shoulder belt 627 positioned over the shoulder on the side opposite to the direction of the inertial force (for example, the left shoulder in the case where rightward inertial force acts on the occupant due to leftward lateral acceleration) can easily slip out from the shoulder, and the upper body of the occupant moves to the side of the shoulder belt 627 positioned over the shoulder of the occupant on the side of the direction of the inertial force (for example, the right shoulder in the case where rightward inertial force acts on the occupant). In the present embodiment, the retractor 622 for the shoulder on the side of the direction of the inertial force, namely, the shoulder of the occupant on the side opposite to the direction of the lateral acceleration (for example, the right shoulder of the occupant in the case where leftward lateral acceleration is applied to the occupant) is selectively driven so that tension is applied to the corresponding belt portion 621R, 621L. Thereby, it is possible to apply tension to one of the belt portions 621R, 621L that is more reliably positioned over the corresponding shoulder of the occupant, and therefore, the movement of the upper body of the occupant can be prevented more reliably regardless of the direction of the inertial force.

In the present embodiment, tension is applied to one of the left and right belt portions 621L, 621R depending on the direction of the lateral acceleration. With such configuration, compared to when tension is applied to both the left and right belt portions 621L, 621R, it is possible to reduce the load applied to the occupant from the seat belt 621. Thereby, the oppressive feeling applied to the occupant is reduced, and the lateral movement of the upper body of the occupant can be prevented more effectively.

Since the shoulder belts 627 are configured to be positioned over the left and right shoulders of the occupant, respectively, and each shoulder belt 627 is provided with the retractor 622, it is possible to selectively apply tension to the left and right belt portions 621R, 621L by selecting the retractor 622. Also, when inertial force is applied to the occupant in the lateral direction, one of the belt portions 621R, 621L of the seat belt 621 on the side of the occupant opposite to the direction of the lateral acceleration, namely, one of the belt portions 621R, 621L difficult to slip off from the shoulder of the occupant is selected and tension is applied thereto, whereby even when a large lateral acceleration is applied, one of the left and right shoulders of the occupant can be reliably pressed against the seat back 606. Therefore, the lateral movement of the upper body of the occupant can be prevented more reliably and motion sickness of the occupant can be reduced.

In the present embodiment, as the magnitude of the lateral acceleration increases, the control unit 624 changes the driving amount of the corresponding retractor 622 thereby to increase the tension applied to the corresponding belt portion 621R, 621L. Thereby, as the lateral acceleration increases and the inertial force applied to the occupant in the lateral direction increases, the tension applied to the corresponding belt portion 621R, 621L increases so that the occupant is restrained to the seat back 606 more firmly. Therefore, regardless of the magnitude of the lateral acceleration, it is possible to secure the occupant to the seat back 606 more reliably and the lateral movement of the upper body of the occupant can be prevented more reliably.

In this way, in accordance with the direction of the lateral acceleration, the retractor 622 on the side where the upper body of the occupant can be reliably secured is selected, and an appropriate amount of tension is applied to the belt portion 621R, 621L depending on the magnitude of the lateral acceleration. Thereby, the occupant is not restrained to the seat back 606 more than necessary, and therefore, the comfort of the vehicle seat 602 improves.

In the present embodiment, since the seat belt device 601 is configured to include the four-point seat belt 621 having the left and right lap belts 626 and the left and right shoulder belts 627, the occupant can be restrained to the seat back 606 more reliably compared to the case where the seat belt device 601 is configured to include a three-point seat belt.

In the present embodiment, the lateral acceleration acquisition unit 623 is provided on the lower surface of the seat cushion 605. Thereby, the lateral acceleration acquisition unit 623 can be positioned in the vicinity of the occupant, and therefore, the lateral acceleration applied to the body of the occupant can be acquired more accurately and in a simple manner.

Sixteenth Embodiment

A seat belt device 651 according to the sixteenth embodiment differs from the fifteenth embodiment only with respect to the configuration of the seat belt 652, and the other configuration is the same as in the fifteenth embodiment, and therefore, the description of the other configuration will be omitted.

Figure 33:
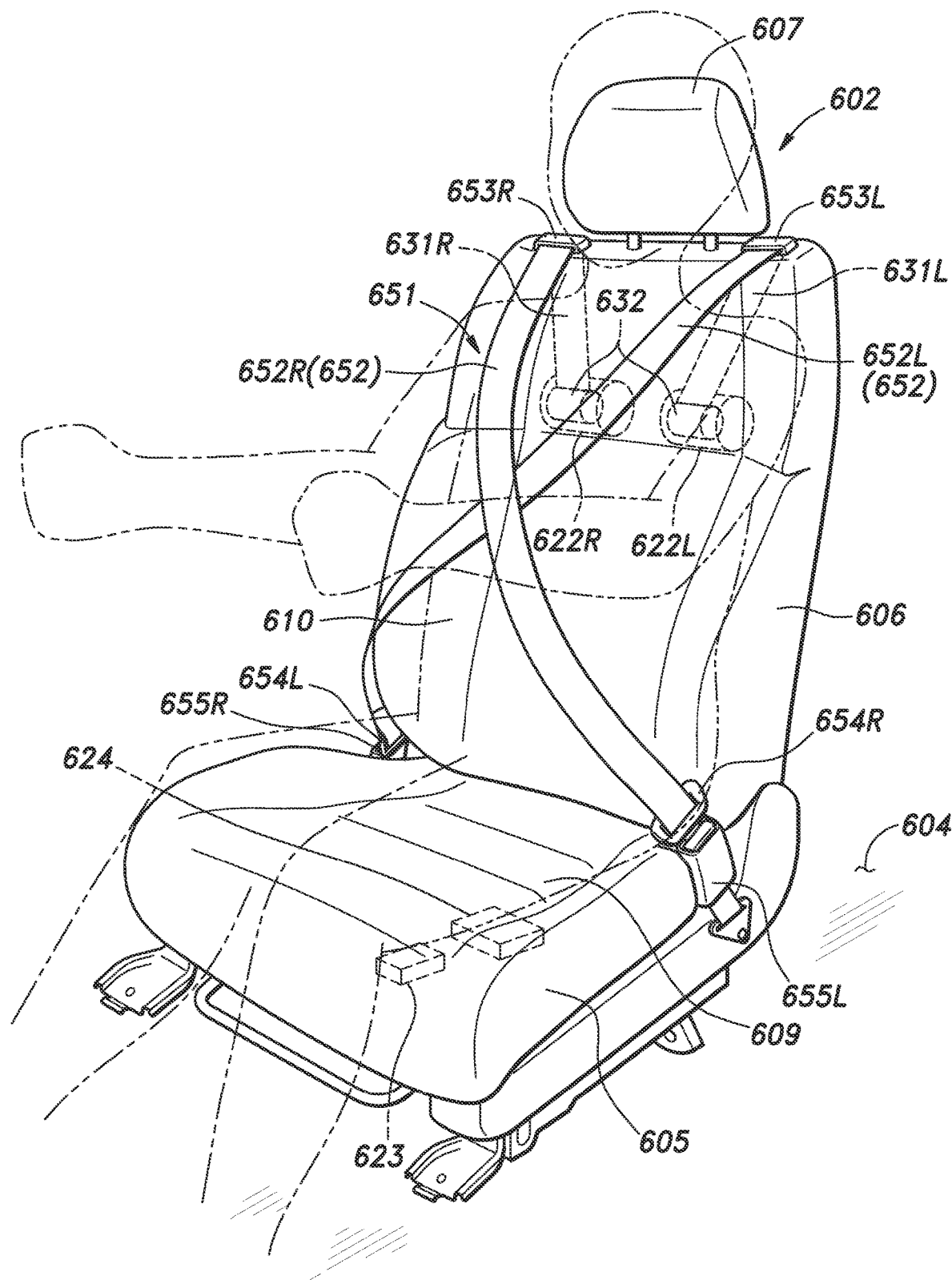
FIG. 33 is a perspective view of a vehicle seat provided with a seat belt device according to the sixteenth embodiment.

As shown in FIG. 33, the seat belt 652 of the seat belt device 651 according to the sixteenth embodiment includes a left belt portion 652L configured to extend diagonally from the left shoulder to the right hip of the seated occupant and a right belt portion 652R configured to extend diagonally from the right shoulder to the left hip of the seated occupant. The left belt portion 652L and the right belt portion 652R cross each other on the front side of the hip of the occupant so that the seat belt 652 has an X shape in front view.

Similarly to the fifteenth embodiment, the upper end of the left belt portion 652L is connected to the left extension 631L. The left extension 631L passes a shoulder belt guide 653L provided on the left upper portion of the seat back 606 and extends to the rear surface of the seat back 606. Similarly to the fifteenth embodiment, the left retractor 622L is provided on the left upper portion of the seat back 606, and the left extension 631L is connected to the left retractor 622L. Thereby, the upper end of the left belt portion 652L is connected to the left retractor 622L via the left extension 631L. A tongue plate 654L is attached to the lower end of the left belt portion 652L, and a buckle 655R is supported on the right side surface of the seat cushion 605 to be rotatable about an axis extending in the vehicle width direction. When the occupant is seated in the vehicle seat 602 and wears the seat belt 652, the tongue plate 654L is inserted into the buckle 655R. Thereby, the lower end of the left belt portion 652L is joined to the right side surface of the seat cushion 605.

Similarly to the fifteenth embodiment, the upper end of the right belt portion 652R is connected to the right extension 631R. The right extension 631R passes the shoulder belt guide 653R provided on the right upper portion of the seat back 606 and extends to the rear surface of the seat back 606 to be connected to the right retractor 622R. Thereby, the upper end of the right belt portion 652R is connected to the right retractor 622R via the right extension 631R. A tongue plate 654R is attached to the lower end of the right belt portion 652R, and a buckle 655L is supported on the left side surface of the seat cushion 605 to be rotatable about an axis extending in the vehicle width direction. With the tongue plate 654R inserted into buckle 655L, the lower end of the right belt portion 652R is joined to the left side surface of the seat cushion 605.

When the left retractor 622L is driven, the upper end of the left belt portion 652L is wound up so that tension is applied mainly to the upper portion of the left belt portion 652L. Thereby, the left shoulder portion of the occupant is secured to the seat back 606 with priority compared to other portions. Similarly, when the right retractor 622R is driven, the upper end of the right belt portion 652R is wound up so that tension is applied mainly to the upper portion of the right belt portion 652R. Thereby, the right shoulder portion of the occupant is fixed to the seat back 606 with priority compared to other portions.

Next, the effect of the seat belt device 651 thus configured will be discussed. Since the seat belt 652 of the seat belt device 651 is a so-called four-point type in which the seat belt 652 is fixed to the vehicle seat 602 at four points, compared to the three-point type, it is possible to restrain the upper body of the occupant to the seat back 606 more reliably. Also, since the right belt portion 652R and the left belt portion 652L are configured to be positioned over the left and right shoulders, respectively, by individually applying tension to each of the right belt portion 652R and the left belt portion 652L, it is possible to press each of the left and right shoulders of the occupant against the seat back 606 with priority. Thereby, even when the occupant is moved by inertial force, it is possible to apply tension to one of the belt portions 652R, 652L of the seat belt 652 that is difficult to slip off from the shoulder of the occupant. Therefore, the lateral movement of the upper body of the occupant can be prevented more reliably, and motion sickness of the occupant can be reduced.

Seventeenth Embodiment

A seat belt device 661 according to the seventeenth embodiment differs from the fifteenth embodiment with respect to the retractor driving process executed by the control unit 624, and the other configuration is the same as in the fifteenth embodiment, and therefore, the description of the other configuration will be omitted.

Figure 34:
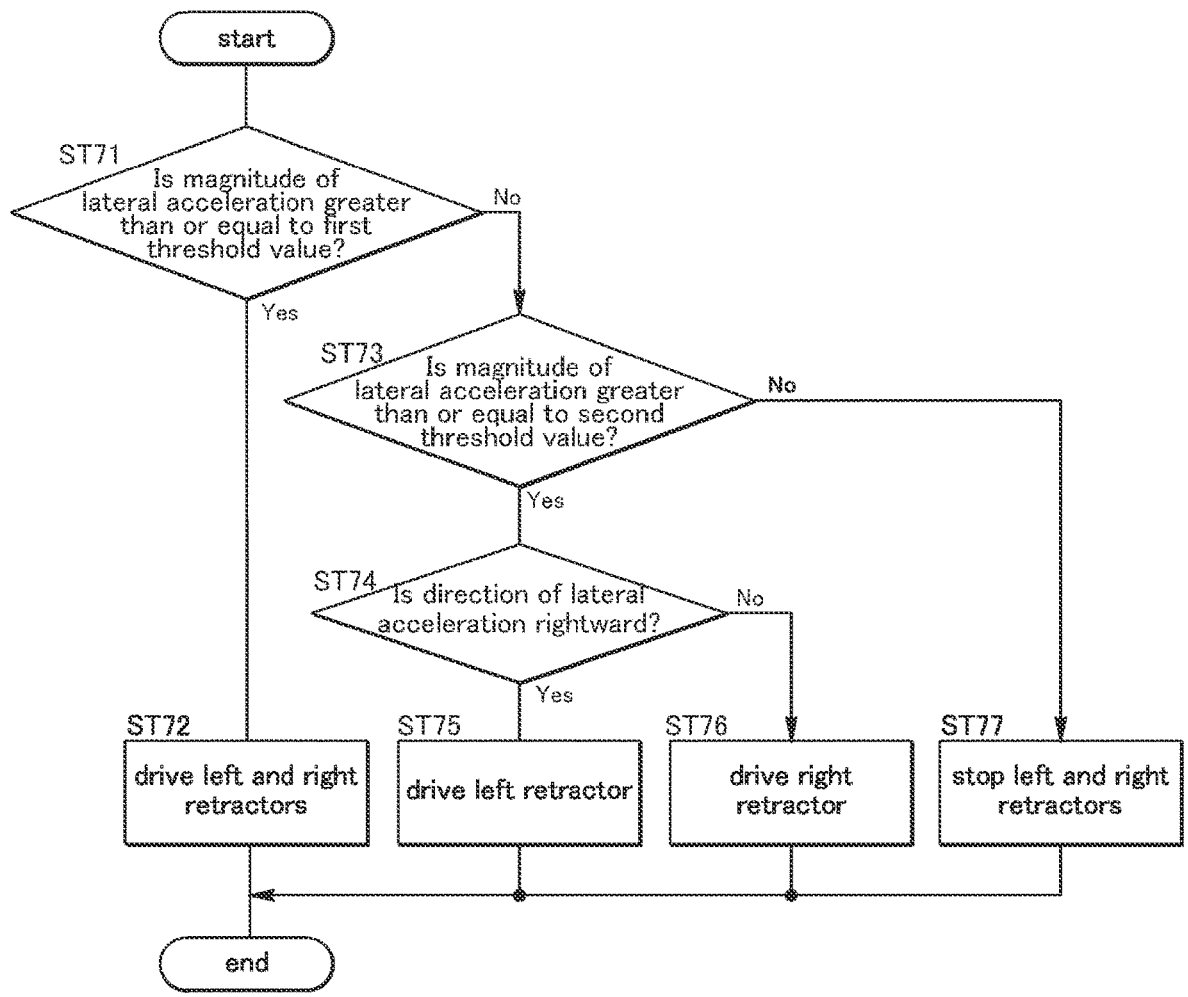
FIG. 34 is a flowchart of a retractor control process executed by a control unit of a seat belt device according to the seventeenth embodiment.

FIG. 34 shows a retractor driving process executed by the control unit 624 of the seat belt device 661 according to the seventeenth embodiment. In the first step (ST71) of the retractor driving process, the control unit 624 acquires the magnitude and direction of the lateral acceleration from the lateral acceleration acquisition unit 623, and determines whether the magnitude of the lateral acceleration is greater than or equal to a first threshold value, which is a prescribed value. When the magnitude of the lateral acceleration is greater than or equal to the first threshold value, the control unit 624 executes step ST72, and when the magnitude of the lateral acceleration is less than the first threshold value, the control unit 624 executes step ST73. The first threshold value is set to a value of the lateral acceleration at or above which it is considered desirable in view of safety to press the both shoulders of the occupant against the seat back 606 to firmly restrain the body of the occupant to the seat back 606 and prevent the movement thereof.

In step ST72, the control unit 624 transmits signals to the left and right retractors 622 to drive both the left and right retractors 622. The control unit 624 preferably sets the driving amount of the electric motor 632 of each of the left and right retractors 622 so as to increase as the magnitude of the acquired lateral acceleration increases. When step ST72 is completed, the control unit 624 ends the retractor driving process.

In step ST73, the control unit 624 determines whether the magnitude of the lateral acceleration acquired in step ST71 is greater than or equal to a second threshold value. The second threshold value is set to a prescribed positive value smaller than the first threshold value. The control unit 624 executes step ST74 when the magnitude of the lateral acceleration is greater than or equal to the second threshold value, and executes step ST77 when the magnitude of the lateral acceleration is less than the second threshold value. The second threshold value is set to a value of the lateral acceleration at or above which it is considered desirable in view of motion sickness prevention to press one of the shoulders of the occupant against the seat back 606 to maintain the posture of the occupant, and is substantially the equal to the lateral acceleration threshold value in the fifteenth embodiment. The second threshold value is set to be smaller than the first threshold value.

In step ST74, the control unit 624 determines whether the direction of the lateral acceleration acquired in step ST71 is rightward. When rightward, the control unit 624 executes step ST75, and when not rightward, namely, when leftward, the control unit 624 executes step ST76.

In step ST75, the control unit 624 transmits a signal instructing driving to the left retractor 622L, thereby to drive the left retractor 622L. As in step ST63 of the fifteenth embodiment, the control unit 624 preferably sets the driving amount of the electric motor 632 of the left retractor 622L so as to increase as the magnitude of the acquired lateral acceleration increases. When step ST75 is completed, the control unit 624 ends the retractor driving process.

In step ST76, the control unit 624 transmits a signal instructing driving to the right retractor 622R, thereby to drive the right retractor 622R. As in step ST64 of the fifteenth embodiment, the control unit 624 preferably sets the driving amount of the electric motor 632 of the right retractor 622R so as to increase as the magnitude of the lateral acceleration increases. When step ST76 is completed, the control unit 624 ends the retractor driving process.

Next, the effect of the seat belt device 661 thus configured will be discussed. When the lateral acceleration applied to the vehicle seat 602 is quite large, such as at the time of side collision of the vehicle S, for example, it is desirable to firmly restrain the occupant to the seat back 606 to prevent the movement of the body of the occupant. In the present embodiment, when a lateral acceleration greater than or equal to the first threshold value is applied to the vehicle seat 602, the left and right retractors 622 are both driven so that the left and right shoulders of the occupant are pressed against the seat back 606. Thereby, compared to the case where only one of the left and right retractors 622 is driven, the body of the occupant can be firmly restrained to the seat back 606. Thus, the lateral movement of the upper body of the occupant is prevented, and the safety of the vehicle seat 602 equipped with the seat belt device 661 can be improved.

Also, when the magnitude of the lateral acceleration is greater than or equal to the second threshold value and less than the first threshold value, similarly to the fifteenth embodiment, one of the shoulders of the occupant is secured based on the lateral direction acceleration, whereby the lateral movement of the upper body of the occupant is prevented. Thus, motion sickness of the occupant can be reduced.

Eighteenth Embodiment

Figure 35:
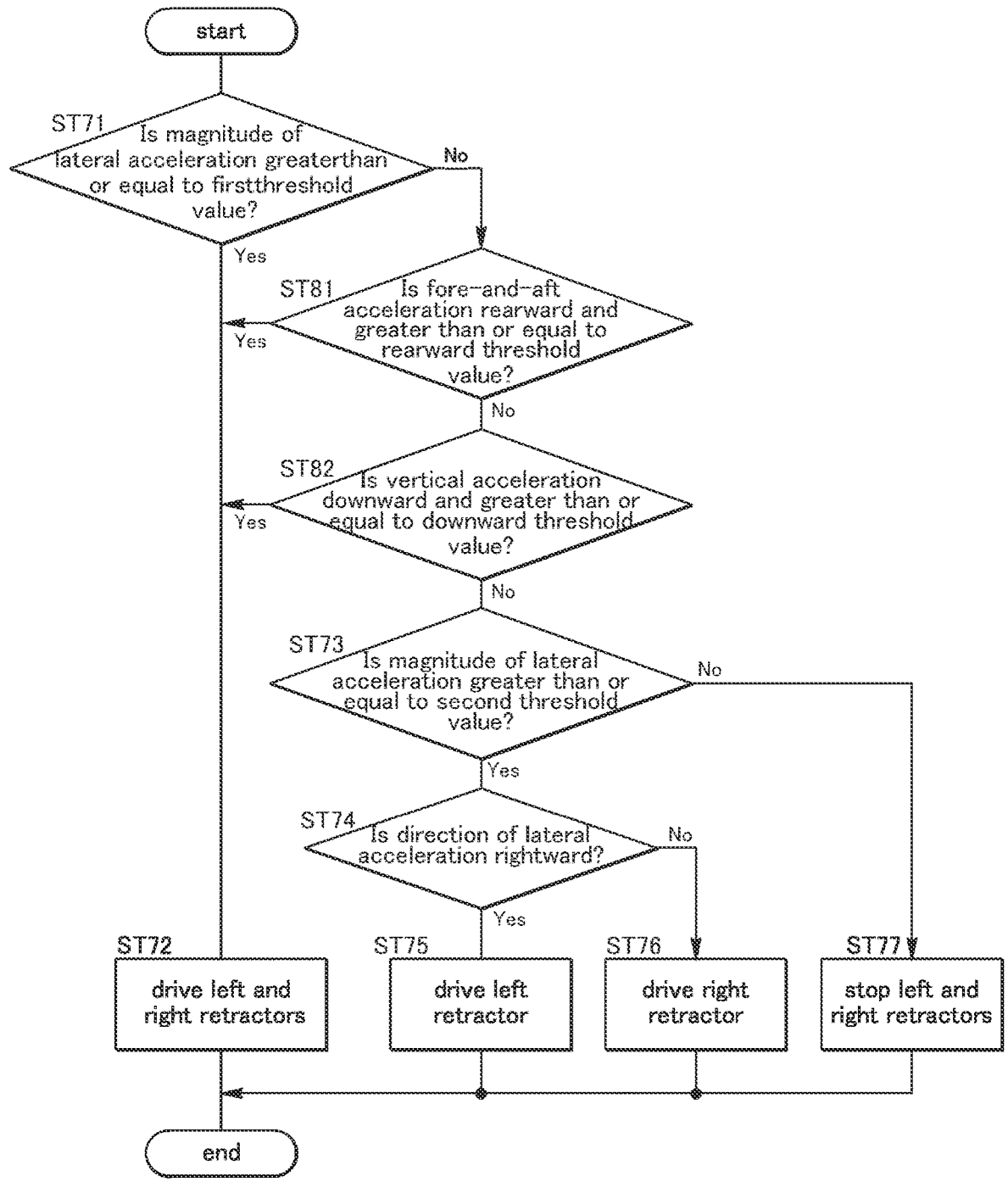
FIG. 35 is a flowchart of a retractor control process executed by a control unit of a seat belt device according to the eighteenth embodiment.

A seat belt device 671 according to the eighteenth embodiment differs from the seventeenth embodiment only in that the seat belt device 671 includes an auxiliary acceleration acquisition unit 673 configured to detect a fore-and-aft direction acceleration (hereinafter, longitudinal acceleration) and a vertical direction acceleration (hereinafter, vertical acceleration) that are applied to the vehicle seat 602 and the retractor control process is different as shown in FIG. 35, and the other part is the same as in the seventeenth embodiment, and therefore, the description of the other part will be omitted.

The auxiliary acceleration acquisition unit 673 is provided on/in the seat back 606 or the seat cushion 605. As shown in FIG. 30, in the present embodiment, the auxiliary acceleration acquisition unit 673 is provided on the rear surface of the seat back 606. The auxiliary acceleration acquisition unit 673 acquires and outputs a longitudinal acceleration including the direction and magnitude, and acquires and outputs a vertical acceleration including the direction and magnitude. In the present embodiment, the auxiliary acceleration acquisition unit 673 includes semiconductor acceleration sensors respectively acquiring the vertical direction acceleration and the fore-and-aft direction acceleration. The acceleration sensors may be similar to the lateral acceleration acquisition unit 623 of the fifteenth embodiment.

As shown in FIG. 35, in the retractor control process executed by the control unit 624 of the seat belt device 671, step ST81 and step ST82 are executed in addition to steps ST71 to ST77 of the retractor control process executed by the control unit 624 of the seat belt device 651 of the seventeenth embodiment. Also, the configuration of step ST72 differs from the seventeenth embodiment.

As the first step of the retractor control process, the control unit 624 executes step ST71 which is the same as in the seventeenth embodiment. Namely, the control unit 624 determines in step ST71 whether the lateral acceleration is greater than or equal to the first threshold value, and if the lateral acceleration is greater than or equal to the first threshold value, executes step ST72 as in the seventeenth embodiment, while if the lateral acceleration is less than the first threshold value, executes step ST81.

In step ST72, the control unit 624 drives the left and right retractors 622. It is to be noted that the driving amount of the left and right retractors 622 is set based on three quantities; namely, the magnitude of the lateral acceleration, the magnitude of the longitudinal acceleration, and the magnitude of the vertical acceleration. In the present embodiment, the driving amount of the left and right retractors 622 is set to be proportional to the sum of the magnitude of the lateral acceleration, the magnitude of the longitudinal acceleration, and the magnitude of the vertical acceleration.

In step ST81, the control unit 624 acquires the magnitude and direction of the fore-and-aft direction acceleration from the auxiliary acceleration acquisition unit 673. When the direction of the fore-and-aft direction acceleration is rearward and the magnitude of the fore-and-aft direction acceleration is greater than or equal to a prescribed rearward threshold value, the control unit 624 executes step ST72 which is the same as in the seventeenth embodiment, and otherwise executes step ST82. The rearward threshold value is set as a threshold value for the rearward acceleration at or above which the occupant is more likely to suffer from motion sickness in general.

In step ST82, the control unit 624 acquires the magnitude and direction of the vertical acceleration from the auxiliary acceleration acquisition unit 673. When the direction of the vertical acceleration is downward and the magnitude of the vertical acceleration is greater than or equal to a prescribed downward threshold value, the control unit 624 executes step ST72 which is the same as in the seventeenth embodiment, and otherwise executes step ST73. The steps after step ST73 are the same as in the seventeenth embodiment, and therefore, the description thereof is omitted. The downward threshold value also is set as a threshold value for the downward acceleration at or above which the occupant is more likely to suffer from motion sickness in general.

Next, the effect of the seat belt device 671 thus configured will be discussed. When an acceleration is applied to the vehicle seat 602 rearward or downward, inertial force is applied to the occupant forward or upward, respectively. The forward or upward inertial force acts to bias the occupant away from the vehicle seat 602.

In the present embodiment, when an acceleration greater than or equal to the rearward threshold value is applied to the vehicle seat 602 rearward, the control unit 624 determines that the direction of the longitudinal acceleration is rearward and the magnitude of the longitudinal acceleration is greater than or equal to the rearward threshold value (ST81). When an acceleration greater than or equal to the downward threshold value is applied to the vehicle seat 602 downward, the control unit 624 determines that the direction of the vertical acceleration is downward and the magnitude of the vertical acceleration is greater than or equal to the downward threshold value (ST82). In each of the case where an acceleration greater than or equal to the rearward threshold value is applied rearward and the case where an acceleration greater than or equal to the downward threshold value is applied downward, the control unit 624 drives both the left and right retractors 622 (ST72).

The forward or upward inertial force gives the occupant a feeling that the upper body is leaving the seat back 606, and thus can cause motion sickness. In the present embodiment, in the case where an acceleration greater than or equal to the downward threshold value is applied downward or the case where an acceleration greater than or equal to the rearward threshold value is applied rearward, namely, when a large inertial force is applied forward or upward, the retractors 622 are activated so that a load is applied to the occupant to oppose the inertial force. Thereby, it is possible to give a sense of stability to the occupant, and thus, motion sickness can be reduced.

Nineteenth Embodiment

A seat belt device 681 according to the nineteenth embodiment differs from the seat belt device 601 according to the fifteenth embodiment with respect to the configuration of the lateral acceleration acquisition unit 623 and the retractor control process. The other configuration is the same as in the fifteenth embodiment, and therefore, the description of the other configuration will be omitted.

As shown in FIG. 36, the lateral acceleration acquisition unit 623 includes a steering angle sensor 684 provided on the steering shaft 682 of the vehicle S to detect the steering angle of the steering wheel 683 of the vehicle S.

Figure 37:
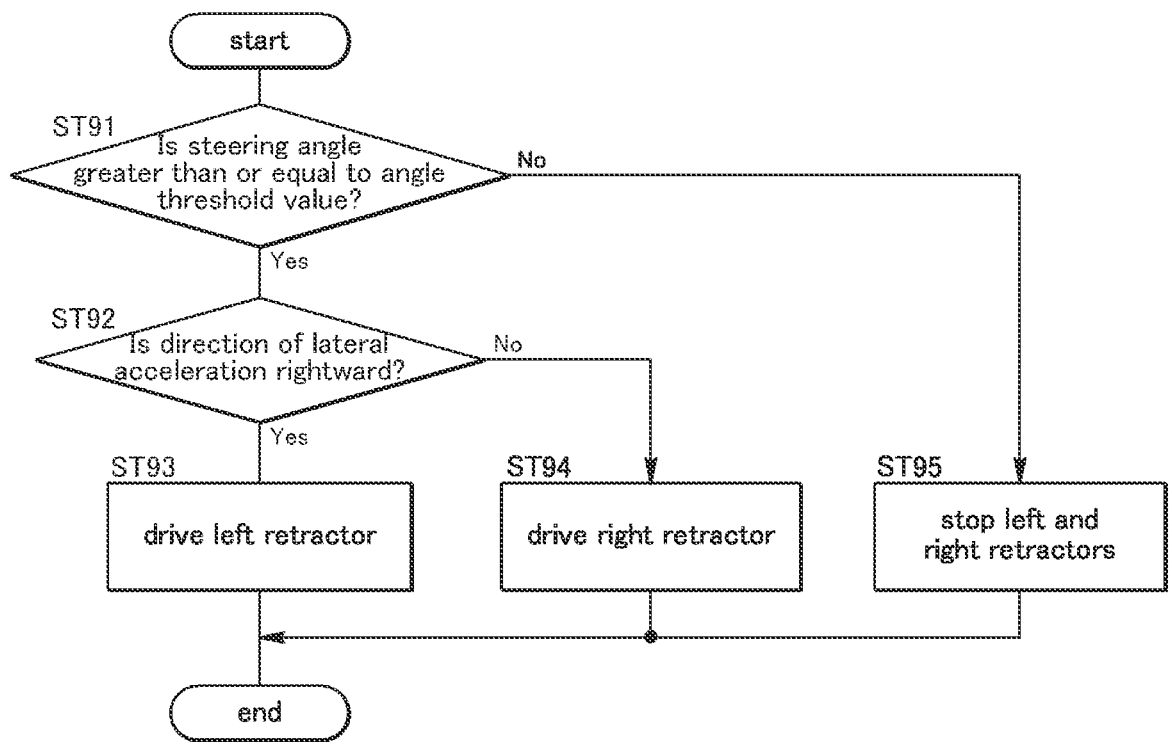
FIG. 37 is a flowchart of a retractor control process executed by a control device of the seat belt device according to the nineteenth embodiment.

Next, the retractor control process executed by the control unit 624 will be described with reference to FIG. 37. In step ST91, the control unit 624 determines whether the magnitude of the steering angle is greater than or equal to a prescribed threshold value. When the magnitude of the steering angle is greater than or equal to the prescribed value, the control unit 624 executes step ST92, and otherwise executes step ST95.

In step ST92, the control unit 624 calculates the turning direction of the vehicle S based on the steering angle acquired by the lateral acceleration acquisition unit 623 and determines whether the direction of the lateral acceleration applied to the occupant is rightward. More specifically, when the vehicle S turns right the control unit 624 determines that a rightward lateral acceleration is applied to the occupant, and when the vehicle S turns left the control unit 624 determines that a leftward lateral acceleration is applied to the occupant. When the lateral acceleration is rightward, the control unit 624 executes step ST93, and otherwise, namely, when the lateral acceleration is leftward, the control unit 624 executes step ST94.

In step ST93, the control unit 624 transmits a signal for driving the electric motor 632 of the left retractor 622L with a prescribed driving amount to the left retractor 622L. Thereby, the electric motor 632 of the left retractor 622L is driven so that the left shoulder of the occupant is restrained to the seat back 606 more firmly. When step ST93 is completed, the control unit 624 ends the retractor control process.

In step ST94, the control unit 624 transmits a signal for driving the electric motor 632 of the right retractor 622R with a prescribed driving amount to the right retractor 622R. Thereby, the electric motor 632 of the right retractor 622R is driven so that the right shoulder of the occupant is restrained to the seat back 606 more firmly. When step ST94 is completed, the control unit 624 ends the retractor control process.

In step ST95, if the electric motors 632 of the left and right retractors 622 are being driven, the control unit 624 stops them, and if not, the control unit 624 maintains them in the undriven state. When step ST95 is completed, the control unit 624 ends the retractor control process.

Next, the effect of the seat belt device 681 thus configured will be discussed. Since the control unit 624 can acquire the timing at which the vehicle S starts turning based on the steering angle input from the steering angle sensor 684, it is possible to drive the left and right retractors 622 in accordance with the instant (timing) at which the inertial force acts on the occupant. In addition, since the turning direction of the vehicle S can be acquired from the steering angle, it is possible to select and drive the retractor 622 positioned on the side of the direction in which the upper body of the occupant moves due to the inertial force caused by the turn, thereby to apply tension to the belt portion 621L, 621R for the corresponding shoulder. Thus, the occupant can be restrained to the seat back 606 reliably.

Twentieth Embodiment

Figure 38:
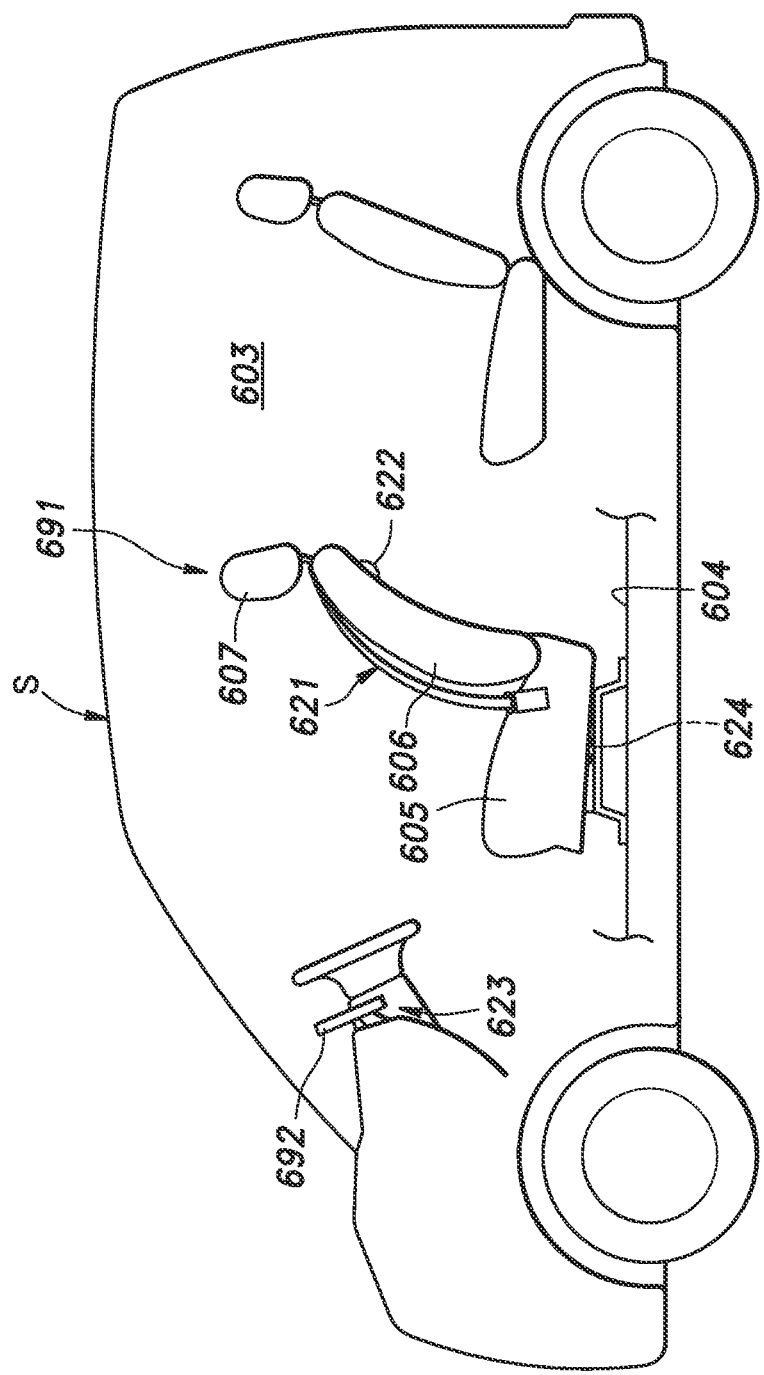
FIG. 38 is a schematic diagram of a vehicle in which a vehicle seat provided with a seat belt device according to the twentieth embodiment is installed.

A seat belt device 691 according to the twentieth embodiment differs from the seat belt device according to the nineteenth embodiment only with respect to the configuration of the lateral acceleration acquisition unit 623. The other part is the same, and therefore, the description thereof will be omitted. As shown in FIG. 38, the lateral acceleration acquisition unit 623 includes a car navigation system 692. The car navigation system 692 includes GPS and storage devices, and holds data including the map information, the current position of the vehicle S, and the travel schedule of the vehicle S. In step ST91, the control unit 624 receives data including the map information, the current position of the vehicle S, and the travel schedule of the vehicle S from the lateral acceleration acquisition unit 623, and based on the receive data, determines whether the vehicle S will turn within a prescribed time (for example, a time required to restrain the occupant by driving the retractors 622). Thereafter, when the turn will be made, the control unit 624 calculates the steering angle and the turning direction of the vehicle S predicted from the travel direction of the vehicle S. Thereafter, the control unit 624 determines whether the steering angle is greater than or equal to the angle threshold value.

Next, the control unit 624 calculates the direction of the lateral acceleration applied to the occupant from the turning direction calculated in step ST92, and determines whether the lateral acceleration is rightward.

With such a configuration, it is possible to predict the timing of turning of the vehicle S based on the map information, the position of the vehicle S, and the travel schedule, and to acquire the direction of the acceleration applied to the occupant and the time at which the acceleration is applied. Therefore, it is possible to drive the retractors 622 in accordance with the instant at which the inertial force caused by the turning is applied to the occupant, whereby the movement of the upper body of the occupant can be prevented more reliably.

Figure 39:
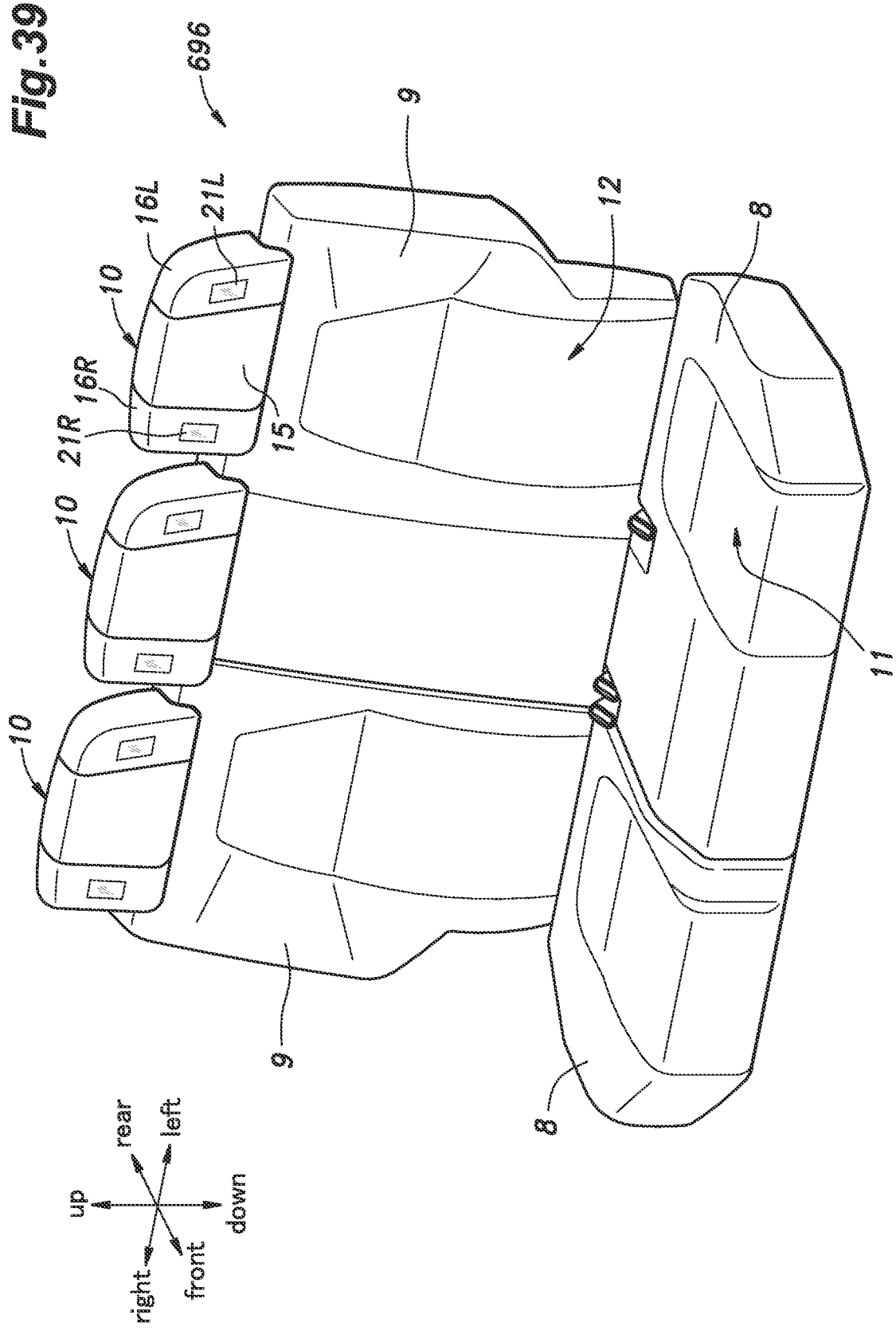
FIG. 39 is a perspective view showing a case where the vehicle seat according to the first embodiment is applied to a rear seat.

Concrete embodiments of the present invention have been described in the foregoing, but the present invention is not limited to the above embodiments and may be modified or altered in various ways. In the above embodiments, description was made of examples in which the vehicle seat 1, 51, 61, 71, 81 was applied to the assistant seat, but the present invention is not limited to such embodiments. For example, as shown in FIG. 39, a vehicle seat 696 may be applied to a rear seat in the second or more rearward row. In the sixth embodiment, the grip 83 was provided on the front end portion of the left armrest 82L, but the grip 83 may be provided on the front end of each of the left and right armrests 82L, 82R. The grip 83 may also be provided on a door trim 697 (see FIG. 1) joined to the vehicle interior-side surface of the door 4. In this case, the grip preferably has a rod shape protruding toward the vehicle interior. Also, the acceleration sensor 22 may be provided on the seat back 9 or the seat cushion 8.

In the first embodiment described above, configuration was made such that when the right side part 16R is in the support position, the angle formed between the right contact surface 19R and the main contact surface 17 is substantially 90 degrees, but the present invention is not limited to this embodiment. For example, configuration may be made such that the angle formed between the right contact surface 19R and the main contact surface 17 has a prescribed value greater than or equal to 60 degrees and less than or equal to 80 degrees so that when the right drive device 20R moves the right side part 16R to the support position in step ST6, the head of the occupant is pressed to the left and is tilted leftward. Similarly, configuration may be made such that when the left side part 16L is in the support position, the angle formed between the left contact surface 19L and the main contact surface 17 has a prescribed value greater than or equal to 60 degrees and less than or equal to 80 degrees so that when the left drive device 20L moves the left side part 16L to the support position in step ST9, the head of the occupant is pressed to the right and is tilted rightward. Thereby, the head of the occupant is tilted in the turning direction, and therefore, motion sickness of the occupant can be reduced.

Figure 40:
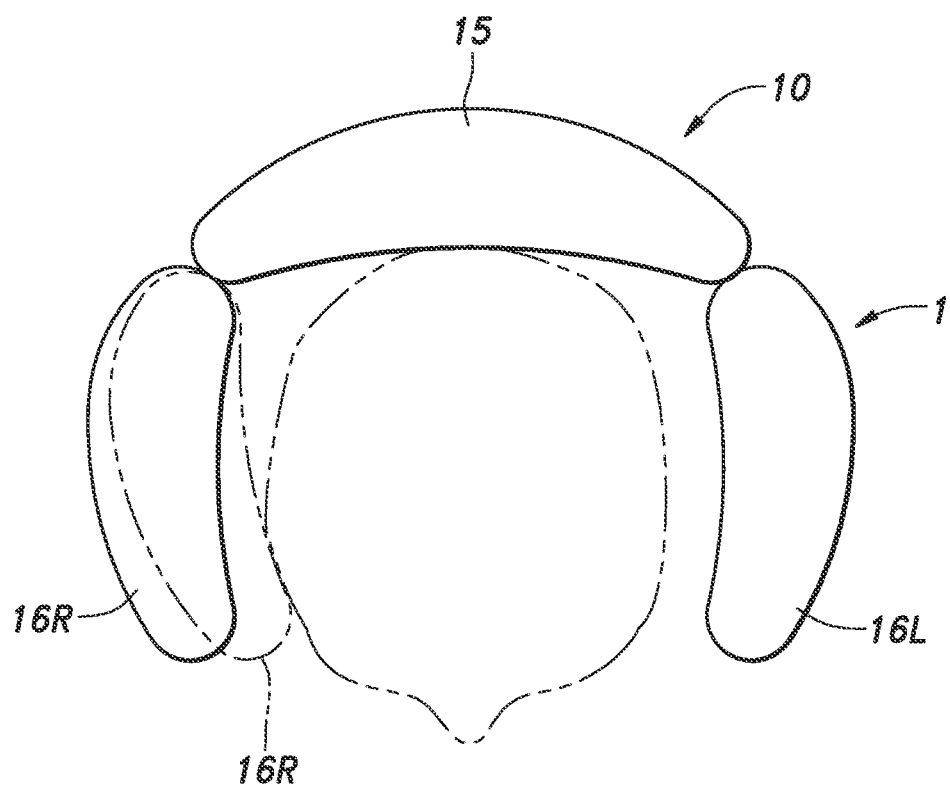
FIG. 40 is a top view of a modification of the vehicle seat according to the first embodiment.

In the above embodiment, the right contact surface 19R and the left contact surface 19L were both disposed to face forward when in the use position, but they are not limited to this embodiment. For example, as shown in FIG. 40, the right side part 16R and the left side part 16L may be configured to be provided at positions spaced from the head of the occupant when in the use position, in which when an acceleration is applied in the rightward direction, the right side part 16R is rotated to the support position to contact the right side surface of the head of the occupant, and when an acceleration is applied in the leftward direction, the left side part 16L is rotated to the support position to contact the left side surface of the head of the occupant. At this time, the left display 21L and the right display 21R may always display the optical flow calculated from the images acquired by the left camera 6L and the right camera, respectively. Also, configuration may be made such that as the acceleration acquired by the acceleration sensor 22 increases, the rotation angle of the right side part 16R and the left side part 16L becomes larger. It is to be noted, however, that as shown in FIG. 2, if the configuration is made such that the right contact surface 19R and the left contact surface 19L both face forward when the acceleration applied to the occupant is zero, the head of the occupant is not sandwiched by the right side part 16R and the left side part 16L when the acceleration applied to the occupant is zero. Thereby, it is possible to give the occupant an open feeling so that the tension of the occupant is relieved, and thus, effect of preventing motion sickness can be obtained.

In the seventh embodiment described above, the lateral acceleration acquisition unit 132 was provided on the lower surface of the seat cushion 105, but it is not limited to this embodiment. For example, the lateral acceleration acquisition unit 132 may be provided in the interior, on the upper surface, on the left or right side surface, or on the front or rear surface of the seat cushion 105, or may be provided on the outer surface or in the interior of the seat back 106. With such a configuration, the lateral acceleration acquisition unit 132 is provided in the vicinity of the occupant, whereby the acceleration applied to the occupant can be acquired more accurately and in a simple manner.

In the tenth embodiment and the eleventh embodiment described above, the calculation unit 208 was configured as a separate member from the control unit 122, but the calculation unit 208 may be configured as software executed by the control unit 122.

Also, the lateral acceleration acquisition unit 202, 253 of the vehicle seat 201, 251 according to the tenth embodiment and the eleventh embodiment described above may be replaced with the lateral acceleration acquisition unit 132 of the vehicle seat 151 according to the eighth embodiment or the lateral acceleration acquisition unit 132 of the vehicle seat 181 according to the ninth embodiment. Thereby, it is possible to drive the air supply and discharge device 162, 185 and thereby to deform the seat back 106, 152 in accordance with the timing at which the inertial force acts on the occupant. Therefore, the movement of the upper body of the occupant can be prevented more reliably and motion sickness can be reduced.

In the vehicle seat 201 according to the tenth embodiment described above, the lateral acceleration acquisition unit 202 was provided with the vehicle speed sensor 207 but this is not indispensable, and for example, the control unit 122 may be configured to execute ST13 when, in ST11 of the first air cell control process, the steering angle acquired by the steering angle sensor 205 is less than the prescribed threshold value, and to execute ST12 when the steering angle is greater than or equal to the prescribed threshold value.

In the above embodiment, the vehicle seat 101 was supported on the floor 103 to be slidably movable in the fore and aft direction, but it is not limited to this embodiment. In the above embodiment, the vehicle seat 101 may be provided to be rotatable about a vertical axis on the floor 103 defining the bottom portion of the cabin 102, for example. With such a configuration, when the vehicle seat 101 is installed in the vehicle S that can be driven automatically, for example, it is possible to freely change the orientation of the vehicle seat 101, and therefore, the comfort of the vehicle seat 101 improves. In this case, when the control unit 122 is configured to acquire the lateral acceleration of the vehicle S based on the information from the sensor fixed to the vehicle S, more specifically, the steering angle sensor 205, and the car navigation system 252, it is preferred that the vehicle S is provided with a rotation angle sensor for acquiring a rotation angle of the vehicle seat 101 relative to the floor 103, and the control unit 122 converts the lateral acceleration applied to the vehicle S based on the rotation angle acquired by the rotation angle sensor to calculate the lateral acceleration applied to the occupant.

In the eighth embodiment described above, the left and right restriction members 156 were respectively fixed on the corresponding left and right side surfaces of the seat back body 155, but they may be detachable from the left and right side surfaces of the seat back body 155, respectively.

In the eighth embodiment described above, the left and right restriction members 156 were configured such that the seat-inner-side side surfaces thereof protrude toward the seat inner side, but they are not limited to this embodiment. For example, the left and right restriction members 156 may be configured to be joined to the left and right side surfaces of the seat back body 155, respectively, so as to be rotatable about a lateral axis such that when the lateral acceleration becomes greater than or equal to the lateral acceleration threshold value, the restriction member 156 positioned on the side toward which the upper body of the occupant moves is rotated forward, and when the lateral acceleration becomes less than the lateral acceleration threshold value, the restriction member 156 is rotated to the position where the restriction member 156 extends vertically along the seat back body 155.

In the seventh embodiment described above, configuration was made such that the front surface of the seat back 106 protrudes forward by expansion of the air cells 125, but the present invention is not limited to this, and any mechanism may be used so long as it can make the front surface of the seat back 106 protrude forward to support the upper body of the occupant. In the eighth embodiment also, the mechanism for making the seat-inner-side side surfaces of the left and right restriction members 156 protrude toward the seat inner side is not limited to the air cells 161, any mechanism that can make the seat-inner-side side surfaces of the left and right restriction members 156 protrude toward the seat inner side to support the upper body of the occupant may be adopted.

Figure 29:
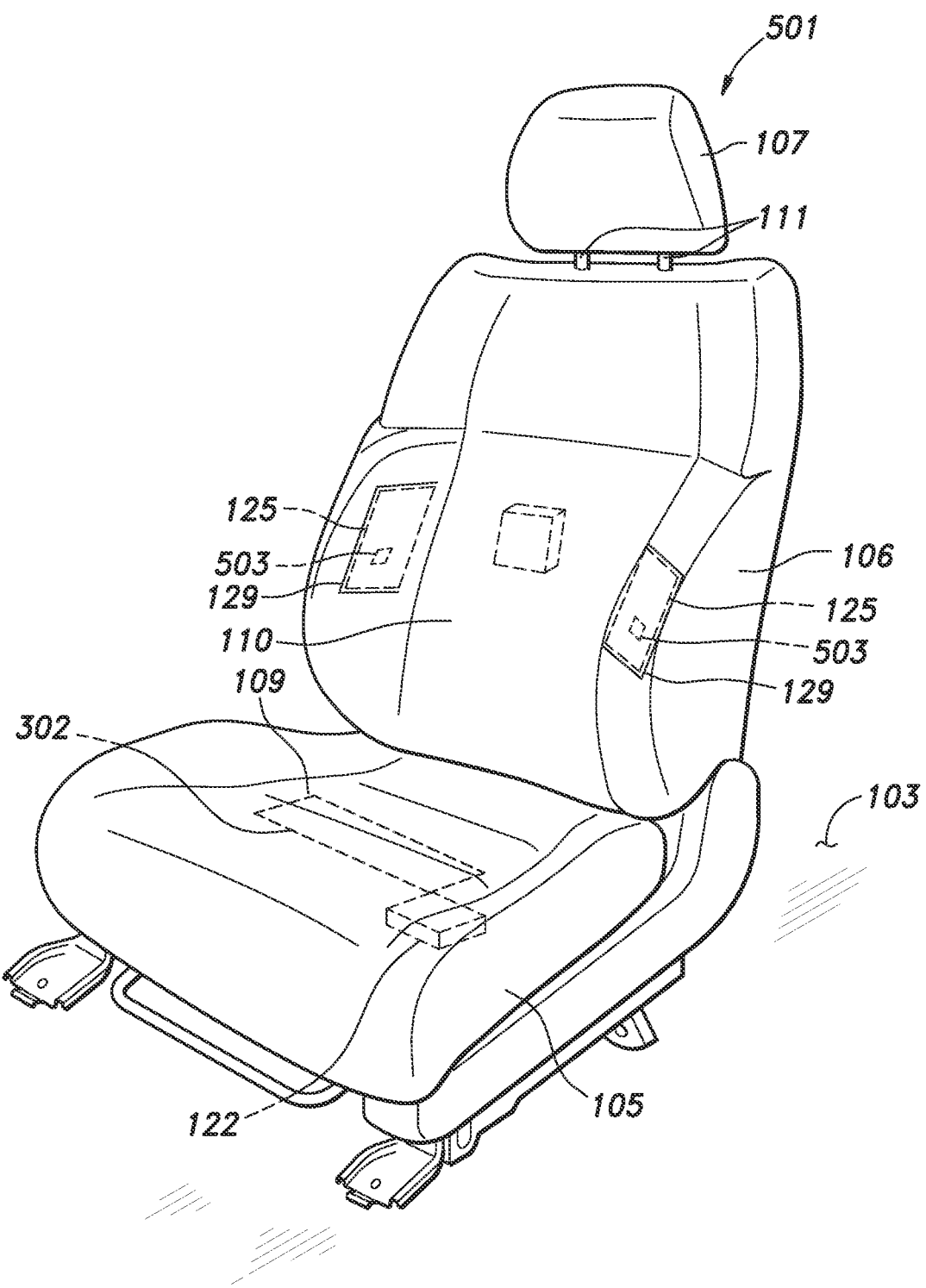
FIG. 29 is a modification of the vehicle seat according to the fourteenth embodiment.

In the seventh embodiment described above, the air cells 125 were provided on the left and right outer sides of the shoulders of the occupant, they are not limited to this embodiment, The air cells 125 may be provided on the left and right outer sides of the parts from the shoulders to the upper arms of the occupant, or as shown in FIG. 29, the air cells 125 may be provided on the left and right outer sides of the hip of the occupant. Also, the air cell 125 may be provided on the left and right outer sides of the shoulders of the occupant and on the left and right outer sides of the hip of the occupant.

In the fourteenth embodiment, configuration may be made such that the skin member 117 covering the front surfaces of the air cells 125 is provided with pressure sensors each being configured to detect the pressure from the occupant so that the pressure applied to the occupant from the skin member 117 is measured and the pressure in the air cell 125 is adjusted.

In the fifteenth to the nineteenth embodiments described above, the vehicle seat 602 was supported on the floor 604 to be slidably movable in the fore and aft direction, but it is not limited to these embodiments. For example, the vehicle seat 602 may be provided to be rotatable about a vertical axis on the floor 604 defining the bottom portion of the cabin 603. With such a configuration, when the vehicle seat 602 is installed in the vehicle S that can be driven automatically, for example, it is possible to freely change the orientation of the vehicle seat 602, and therefore, the comfort of the vehicle seat 602 improves. In this case, when the control unit 624 is configured to control the retractors 622 based on the information from the sensor fixed to the vehicle S, more specifically, the steering angle sensor 684, and the car navigation system 692, it is preferred that the vehicle S is provided with a rotation angle sensor for acquiring a rotation angle of the vehicle seat 602 relative to the floor 604, and the control unit 624 acquires this rotation angle. Accordingly, the control unit 624 may correct the acquired turning direction of the vehicle S based on the rotation angle of the vehicle seat 602 to calculate the lateral acceleration applied to the occupant. Also, because the vehicle seat 602 is provided with the seat belt 621, 652, the seat belt device 601, 651, 661, 681, 691 can prevent the movement of the upper body of the occupant regardless of the position and direction in the cabin 603 of the vehicle seat 602.

In the fifteenth embodiment described above, the lateral acceleration acquisition unit 623 was provided on the lower surface of the seat cushion 605, but it is not limited to this embodiment. For example, the lateral acceleration acquisition unit 623 may be provided in the interior, on the upper surface, on the left or right side surface, or on the front or rear surface of the seat cushion 605, or may be provided on the outer surface or in the interior of the seat back 606. With such a configuration, the lateral acceleration acquisition unit 623 is provided in the vicinity of the body of the occupant, and therefore, the acceleration applied to the body of the occupant can be acquired more accurately and in a simple manner. Similarly, the auxiliary acceleration acquisition unit 673 of the eighteenth embodiment may be provided at any position of the seat cushion 605 or the seat back 606.

In the fifteenth to the nineteenth embodiments described above, the seat belt 621, 652 was a four-point type, but the seat belt is not limited to this embodiment so long as it is a four or more-point type seat belt and includes the shoulder belts 627 configured to be positioned over the left and right shoulders of the occupant. For example, the seat belt may be a five-point type or six-point type including a crotch belt.

In the nineteenth embodiment described above, the lateral acceleration acquisition unit 623 included the steering angle sensor 684, but it may further include a vehicle speed sensor 701 (see FIG. 36) supported by the vehicle body 700 and configured to detect the speed of the vehicle S (vehicle speed) based on the rotation of the wheels, and the control unit 624 may be configured to calculate the direction and magnitude of the lateral acceleration of the vehicle S in step ST91 based on the steering angle sensor 684 and the vehicle speed sensor 701. The control unit 624 may predict the turning radius of the vehicle in step ST91 based on the steering angle, and approximate the motion of the vehicle S as a constant-speed rotational motion based on the predicted turning radius and the vehicle speed detected by the vehicle speed sensor 701 to calculate the lateral acceleration applied to the occupant.

Figure 41:
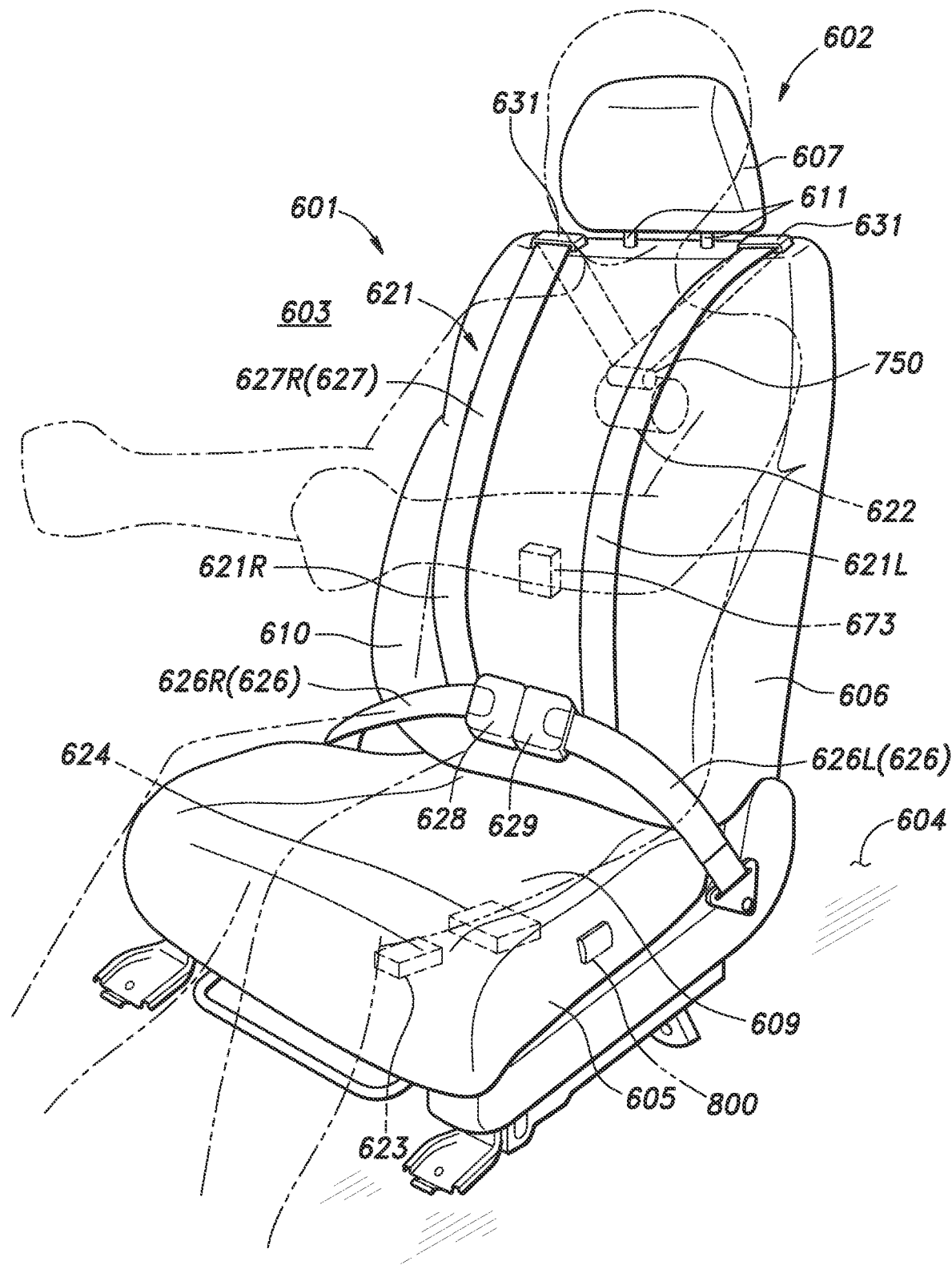
FIG. 41 shows another embodiment of the vehicle seat provided with the seat belt device according to the fifteenth embodiment.

In the fifteenth embodiment described above, the seat belt device 601 was provided with a pair of left and right retractors 622R, 622L, but it is not limited to this embodiment. For example, as shown in FIG. 41, the seat belt device 601 may include a single retractor 622 and a switching device 750 configured to switch the state of the retractor 622 between a state in which the retractor 622 can wind up the right shoulder belt 627R and a state in which the retractor 622 can wind up the left shoulder belt 627L.

In the fifteenth to the nineteenth embodiments described above, the control unit 624 was configured to continuously repeat the retractor control process during travel of the vehicle, but the present invention is not limited to this embodiment. For example, a pressable button 800 (see FIG. 30) may be provided on the left or right side surface of the seat cushion 605 and configuration may be made such that, when the button 800 is pressed while the control unit 624 is executing the retractor control process, the execution of the retractor control process is stopped, and when the button 800 is pressed again, the control unit 624 resumes the retractor control process.

LIST OF REFERENCE NUMERALS

1: vehicle seat according to the first embodiment
5: side window
8: seat cushion
9: seat back
10: headrest
15: main part
16L: left side part
16R: right side part
19L: left contact surface
19R: right contact surface
20L: left drive device
20R: right drive device
21L: left display
21R: right display
22: acceleration sensor (acceleration acquisition device)
23: control device
41: vehicle seat according to the second embodiment
43L: left light emitting device
43R: right light emitting device
44L: LED element
44R: LED element
51: vehicle seat according to the third embodiment
52: car navigation system
53: vehicle
54: acceleration acquisition device
61: vehicle seat according to the fourth embodiment
62: seat back
63: frame
64: skin member
65: beads
66: recess
71: vehicle seat according to the fifth embodiment
72L: armrest
72R: armrest
73L: air cell
73R: air cell
81: vehicle seat according to the sixth embodiment
82L: armrest
83: grip
101: vehicle seat according to the seventh embodiment
105: seat cushion
106: seat back
112, 113: frame
114, 115: pad member
116, 117: skin member
121: drive unit
122: control unit
125: air cell
126: air supply and discharge device
132: lateral acceleration acquisition unit
151: vehicle seat according to the eighth embodiment
152: seat back
153: drive unit
155: seat back body
156: restriction member
161: air cell
162: air supply and discharge device
170: touch sensor
181: vehicle seat according to the ninth embodiment
183: drive unit
184: bag member
185: air supply and discharge device
186: spherical member
201: vehicle seat according to the tenth embodiment
202: lateral acceleration acquisition unit
205: steering angle sensor
251: vehicle seat according to the eleventh embodiment
252: car navigation system
253: lateral acceleration acquisition unit
301: vehicle seat according to the twelfth embodiment
302: seating sensor
401: vehicle seat according to the thirteenth embodiment
501: vehicle seat according to the fourteenth embodiment
503: touch sensor

601: seat belt device according to the fifteenth embodiment
602: vehicle seat
603: cabin
604: floor
605: seat cushion
606: seat back
612, 613: frame
614, 615: pad member
616, 617: skin member
621: seat belt
621L: left belt portion
621R: right belt portion
622: retractor
622L: left retractor
622R: right retractor
623: lateral acceleration acquisition unit
624: control unit
626L: left lap belt
626R: right lap belt
627L: left shoulder belt
627R: right shoulder belt
651: seat belt device according to the sixteenth embodiment
652: seat belt
652L: left belt portion
652R: right belt portion
661: seat belt device according to the seventeenth embodiment
671: seat belt device
673: auxiliary acceleration acquisition unit
681: seat belt device according to the eighteenth embodiment
684: steering angle sensor
691: seat belt device according to the nineteenth embodiment
692: car navigation system
S: vehicle

The invention claimed is:

1. A vehicle seat configured to be installed in a vehicle, comprising:
a seat cushion;
a seat back provided at a rear portion of the seat cushion;
a headrest including a main part connected to an upper end of the seat back to support a back of a head of an occupant, a left side part connected to a left edge of the main part and displaceable at a left side of the head of the occupant including a left contact surface that can oppose the head of the occupant when displaced, and a right side part connected to a right edge of the main part and displaceable at a right side of the head of the occupant including a right contact surface that can oppose the head of the occupant when displaced; and
an acceleration acquisition device configured to acquire an acceleration applied in a lateral direction;
wherein the right contact surface and the left contact surface are provided with respective light emitting devices,
each light emitting device includes multiple light emitting elements arranged substantially horizontally,
the light emitting device provided on the right side part emits light to correspond to optical flow of a view from a right side window of the vehicle when a rightward acceleration is acquired by the acceleration acquisition device, and
the light emitting device provided on the left side part emits light to correspond to optical flow of a view from a left side window of the vehicle when a leftward acceleration is acquired by the acceleration acquisition device.

2. The vehicle seat according to claim 1, wherein the left side part is connected to the left edge of the main part to be rotatable about a vertical axis and the right side part is connected to a right edge of the main part to be rotatable about a vertical axis, and
wherein the headrest includes a left drive device for rotating the left side part forward relative to the main part and a right drive device for rotating the right side part forward relative to the main part.

3. The vehicle seat according to claim 2, further comprising a control device which makes the right drive device rotate the right side part until the right contact surface contacts a right side surface of the head when a rightward acceleration is acquired by the acceleration acquisition device and makes the left drive device rotate the left side part until the left contact surface contacts a left side surface of the head when a leftward acceleration is acquired by the acceleration acquisition device.

4. The vehicle seat according to claim 3, comprising a pair of left and right armrests respectively joined to a left side surface and a right side surface of the seat back and extending forward,
wherein the armrests are provided with respective swelling parts configured to selectively swell in mutually opposing directions, and
the control device causes the swelling parts to swell to sandwich an upper body of the occupant therebetween when the acceleration in the lateral direction is acquired by the acceleration acquisition device.

5. The vehicle seat according to claim 1, wherein the acceleration acquisition device is an acceleration sensor supported by one of the seat cushion, the seat back, and the headrest.

6. The vehicle seat according to claim 1, wherein a car navigation system capable of acquiring map information and a position of the vehicle is installed in the vehicle, and the acceleration acquisition device is configured to receive the map information and the position of the vehicle from the car navigation system and to calculate the acceleration.

7. The vehicle seat according to claim 1, wherein the seat back is constituted of a frame forming a skeleton, a bag-shaped skin member covering the frame, and beads contained in the skin member such that when the occupant is seated, the seat back is depressed rearward under a load from the occupant to form a recess corresponding to an upper body of the occupant and a shape of the recess is held for a prescribed time.

8. A vehicle seat configured to be installed in a vehicle, comprising:
a seat cushion;
a seat back provided at a rear portion of the seat cushion;
a headrest including a main part connected to an upper end of the seat back to support a back of a head of an occupant, a left side part connected to a left edge of the main part and displaceable at a left side of the head of the occupant including a left contact surface that can oppose the head of the occupant when displaced, and a right side part connected to a right edge of the main part and displaceable at a right side of the head of the occupant including a right contact surface that can oppose the head of the occupant when displaced; and
an acceleration acquisition device configured to acquire an acceleration applied in a lateral direction, wherein the right contact surface and the left contact surface are provided with respective displays, the display of the right side part displays optical flow of a view from a side window of the vehicle when a rightward acceleration is acquired by the acceleration acquisition device, and the display of the left side part displays optical flow of a view from a side window of the vehicle when a leftward acceleration is acquired by the acceleration acquisition device.

9. The vehicle seat according to claim 8, wherein the left side part is connected to the left edge of the main part to be rotatable about a vertical axis and the right side part is connected to a right edge of the main part to be rotatable about a vertical axis, and wherein the headrest includes a left drive device for rotating the left side part forward relative to the main part, and a right drive device for rotating the right side part forward relative to the main part.

10. The vehicle seat according to claim 9, further comprises a control device which makes the right drive device rotate the right side part until the right contact surface contacts a right side surface of the head when a rightward acceleration is acquired by the acceleration acquisition device and makes the left drive device rotate the left side part until the left contact surface contacts a left side surface of the head when a leftward acceleration is acquired by the acceleration acquisition device.

* * * * *